US012581268B2

(12) United States Patent
Schoenberg et al.

(10) Patent No.: US 12,581,268 B2
(45) Date of Patent: Mar. 17, 2026

(54) LOCATION DATA HARVESTING AND PRUNING FOR WIRELESS ACCESSORY DEVICES

(71) Applicant: Apple Inc., Cupertino, CA (US)

(72) Inventors: Jonathan R. Schoenberg, Fishers, IN (US); Adam M. Driscoll, Atherton, CA (US); E. Thomas Erdmann, IV, San Francisco, CA (US); Emmanuel Lalande, San Francisco, CA (US); Michael C. Laster, Santa Clara, CA (US); Scott Lopatin, San Francisco, CA (US); Robert W. Mayor, Half Moon Bay, CA (US); Siva Ganesh Movva, Cupertino, CA (US); Munish K. Poonia, San Jose, CA (US); Tommy Rochette, San Jose, CA (US); Christina Selle, Los Altos, CA (US); Langford M. Wasada, San Francisco, CA (US); Swadesh Bhattacharya, Sunnyvale, CA (US); Raghunandan K. Pai, Saratoga, CA (US); Brent M. Ledvina, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 729 days.

(21) Appl. No.: 17/603,892

(22) PCT Filed: Apr. 15, 2020

(86) PCT No.: PCT/US2020/028327
§ 371 (c)(1),
(2) Date: Oct. 14, 2021

(87) PCT Pub. No.: WO2020/214709
PCT Pub. Date: Oct. 22, 2020

(65) Prior Publication Data
US 2022/0201429 A1     Jun. 23, 2022

Related U.S. Application Data

(60) Provisional application No. 62/897,789, filed on Sep. 9, 2019, provisional application No. 62/855,975, filed
(Continued)

(51) Int. Cl.
*H04W 4/20*          (2018.01)
*H04W 4/02*          (2018.01)
(Continued)

(52) U.S. Cl.
CPC ........... *H04W 4/023* (2013.01); *H04W 4/029* (2018.02); *H04W 4/20* (2013.01); *H04W 52/0229* (2013.01); *H04W 52/0254* (2013.01)

(58) Field of Classification Search
CPC ......... H04W 4/023; H04W 4/00; H04W 4/02; H04W 52/0229; H04W 52/0254; H04W 4/029
See application file for complete search history.

(56) References Cited

U.S. PATENT DOCUMENTS 4,918,425 A     4/1990  Greenberg et al.
5,910,776 A     6/1999  Black
(Continued)

FOREIGN PATENT DOCUMENTS

CN          101682508         3/2010
CN          102325324 A       1/2012
(Continued)

OTHER PUBLICATIONS

PCT/US2021/046786, "PCT Notification of Transmittal of the International Search Report and the Written Opinion of the International Searching Authority, or the Declaration", Mailed Dec. 13, 2021, 14 pages.
(Continued)

Primary Examiner — Jinsong Hu
Assistant Examiner — Farideh Madani
(74) Attorney, Agent, or Firm — Kilpatrick Townsend & Stockton LLP

(57)                    ABSTRACT

Embodiments described herein provide for an electronic device comprising a wireless processor coupled with a wireless radio, memory to store instructions, and one or more processors to execute the instructions. The one or more processors, based on the instructions, are to scan for a beacon advertisement using the wireless processor, store the beacon and a timestamp in a beacon advertisement buffer in response to detection of the beacon via the wireless processor, correlate a beacon advertisement with stored location data to determine a location estimate for a device associated with the beacon advertisement, encrypt the location estimate for the beacon advertisement using a beacon identifier broadcast with the beacon identifier, and transmit a hash of the beacon identifier and an encrypted location estimate for the beacon advertisement to a device locator server. Embodiments also provide techniques to enable known device matching and horizontal accuracy adjustment during location data harvesting for wireless accessory devices.

20 Claims, 33 Drawing Sheets

Related U.S. Application Data on Jun. 1, 2019, provisional application No. 62/835,494, filed on Apr. 17, 2019.

(51) Int. Cl.
       *H04W 4/029*          (2018.01)
       *H04W 52/02*          (2009.01)

(56)                References Cited

U.S. PATENT DOCUMENTS

| | | | |
|---|---|---|---|
| 6,292,660 | B1 | 9/2001 | Hartless et al. |
| 6,345,098 | B1 | 2/2002 | Matyas, Jr et al. |
| 6,369,706 | B1 | 4/2002 | Anderson et al. |
| 6,754,349 | B1 | 6/2004 | Arthan |
| 6,993,350 | B2 | 1/2006 | Katoh |
| 7,039,427 | B2 | 5/2006 | Tachikawa |
| 7,059,182 | B1 | 6/2006 | Ragner |
| 7,224,987 | B1 | 5/2007 | Bhela et al. |
| 7,274,761 | B2 | 9/2007 | Muller et al. |
| 7,342,497 | B2 | 3/2008 | Chung et al. |
| 7,376,393 | B2 | 5/2008 | Ono et al. |
| 7,388,491 | B2 | 6/2008 | Chand et al. |
| 7,519,377 | B2 | 4/2009 | Tsukamoto |
| 7,558,529 | B2 | 7/2009 | Seshadri et al. |
| 7,657,248 | B2 | 2/2010 | Hodoshima |
| 8,213,389 | B2 | 7/2012 | Bush et al. |
| 8,224,355 | B2 | 7/2012 | Beydler et al. |
| 8,351,937 | B2 | 1/2013 | Lee |
| 8,457,617 | B2 | 6/2013 | Sweeney et al. |
| 8,499,337 | B1 | 7/2013 | Kenny et al. |
| 8,538,401 | B2 | 9/2013 | Kim et al. |
| 8,583,915 | B1 | 11/2013 | Huang |
| 8,873,758 | B2 | 10/2014 | Bradley |
| 8,971,924 | B2 | 3/2015 | Pai et al. |
| 9,009,794 | B2 | 4/2015 | Dykeman et al. |
| 9,077,521 | B2 | 7/2015 | Machani |
| 9,104,896 | B2 | 8/2015 | Pai et al. |
| 9,277,353 | B2 | 3/2016 | Merriam |
| 9,277,386 | B1 | 3/2016 | Masiero et al. |

| | | | |
|---|---|---|---|
| 9,316,717 | B2 | 4/2016 | Gicklhorn et al. |
| 9,323,916 | B1 | 4/2016 | Wu et al. |
| 9,357,348 | B2 | 5/2016 | Evans et al. |
| 9,420,423 | B1 | 8/2016 | Mendelson |
| 9,426,749 | B2 | 8/2016 | Cordeiro et al. |
| 9,432,802 | B2 | 8/2016 | Matsushita et al. |
| 9,439,056 | B2 | 9/2016 | Chukka et al. |
| 9,443,366 | B2 | 9/2016 | Rayner |
| 9,445,220 | B2 | 9/2016 | Granbery |
| 9,456,298 | B2 | 9/2016 | Lee et al. |
| 9,462,109 | B1 | 10/2016 | Frazier Fields et al. |
| 9,516,620 | B1 | 12/2016 | Upp et al. |
| 9,520,045 | B2 | 12/2016 | Hawkins |
| 9,544,075 | B2 | 1/2017 | Altman et al. |
| 9,557,185 | B2 | 1/2017 | Kimes |
| 9,565,255 | B2 | 2/2017 | Kapoor et al. |
| 9,641,622 | B2 | 5/2017 | Kapoor et al. |
| 9,706,032 | B2 | 7/2017 | Pai et al. |
| 9,762,316 | B2 | 9/2017 | Kukuiski et al. |
| 9,769,601 | B2 | 9/2017 | Zelinka |
| 9,779,596 | B2 | 10/2017 | Ingrassia et al. |
| 9,781,106 | B1 | 10/2017 | Vitus et al. |
| 9,801,059 | B2 | 10/2017 | Ziv et al. |
| 9,820,093 | B2 | 11/2017 | Mayor et al. |
| 9,848,075 | B1 | 12/2017 | Ahmad et al. |
| 9,860,932 | B2 | 1/2018 | Kapoor et al. |
| 9,922,531 | B1 | 3/2018 | Doxey et al. |
| 9,942,379 | B2 | 4/2018 | Huang et al. |
| 9,961,507 | B1 | 5/2018 | Mendelson |
| 10,015,836 | B2 | 7/2018 | Kapoor et al. |
| 10,022,066 | B2 | 7/2018 | Tomiha |
| 10,022,086 | B1 | 7/2018 | Kahn et al. |
| 10,042,595 | B2 | 8/2018 | Behzadi et al. |
| 10,110,642 | B2 | 10/2018 | Numakami |
| 10,366,692 | B1 | 7/2019 | Adams et al. |
| 10,368,378 | B2 | 7/2019 | Foster et al. |
| 10,410,485 | B2 | 9/2019 | Ingrassia et al. |
| 10,448,211 | B1 | 10/2019 | Shen et al. |
| 10,506,517 | B2 | 12/2019 | Dai Javad et al. |
| 10,600,310 | B2 | 3/2020 | Hawkins |
| 10,667,313 | B2 | 5/2020 | Maguire et al. |
| 10,701,203 | B2 | 6/2020 | Fiorini et al. |
| 10,771,898 | B2 | 9/2020 | Dusan et al. |
| 10,841,736 | B2 | 11/2020 | De La Broise |
| 10,855,483 | B1 | 12/2020 | Ramesh et al. |
| 10,862,684 | B2 | 12/2020 | Hong et al. |
| 10,956,975 | B1 | 3/2021 | Abdul Gaffar et al. |
| 10,970,989 | B1 | 4/2021 | Quibelan et al. |
| 10,992,755 | B1 | 4/2021 | Tran |
| 11,051,105 | B2 | 6/2021 | Dusan et al. |
| 11,088,830 | B2 | 8/2021 | Gu et al. |
| 11,107,088 | B2 | 8/2021 | Radocchia et al. |
| 11,202,168 | B2 | 12/2021 | Evans et al. |
| 11,265,716 | B2 | 3/2022 | Klinkner et al. |
| 11,282,351 | B2 | 3/2022 | Ingrassia, Jr. et al. |
| 11,288,562 | B2 | 3/2022 | Purba |
| 11,310,652 | B2 | 4/2022 | Norp et al. |
| 11,356,799 | B2 | 6/2022 | Haney |
| 11,595,784 | B2 | 2/2023 | Mohalik |
| 11,606,669 | B2 | 3/2023 | Lopatin et al. |
| 11,622,237 | B2 | 4/2023 | Diem |
| 11,641,563 | B2 | 5/2023 | Lopatin et al. |
| 11,716,603 | B2 | 8/2023 | Lee et al. |
| 11,768,578 | B2 | 9/2023 | Behzadi et al. |
| 11,863,671 | B1 | 1/2024 | Sierra et al. |
| 11,889,302 | B2 | 1/2024 | Victa et al. |
| 12,262,278 | B2 | 3/2025 | Ertan et al. |
| 2002/0144215 | A1 | 10/2002 | Hoskote et al. |
| 2003/0065918 | A1 | 4/2003 | Willey |
| 2003/0092437 | A1 | 5/2003 | Nowlin et al. |
| 2003/0182584 | A1 | 9/2003 | Banes et al. |
| 2004/0162027 | A1 | 8/2004 | Chang |
| 2004/0249817 | A1 | 12/2004 | Liu et al. |
| 2005/0021767 | A1 | 1/2005 | Cai |
| 2005/0154896 | A1 | 7/2005 | Widman et al. |
| 2005/0190098 | A1 | 9/2005 | Bridgelall et al. |
| 2005/0285739 | A1 | 12/2005 | Velhal et al. |
| 2006/0039337 | A1 | 2/2006 | Hodoshima |
| 2006/0111835 | A1 | 5/2006 | Baker et al. |

(56) References Cited

U.S. PATENT DOCUMENTS

| 2007/0139199 A1 | 6/2007 | Hanlon |
| 2007/0249374 A1 | 10/2007 | Hu et al. |
| 2007/0283151 A1 | 12/2007 | Nakano et al. |
| 2007/0283395 A1 | 12/2007 | Wezowski |
| 2008/0004798 A1 | 1/2008 | Troxler et al. |
| 2008/0119953 A1 | 5/2008 | Reed et al. |
| 2008/0120196 A1 | 5/2008 | Reed et al. |
| 2009/0058670 A1 | 3/2009 | Sweeney et al. |
| 2009/0150674 A1 | 6/2009 | Richardson et al. |
| 2009/0315767 A1 | 12/2009 | Scalisi et al. |
| 2009/0323972 A1 | 12/2009 | Kohno et al. |
| 2009/0325599 A1 | 12/2009 | Vuori |
| 2010/0079249 A1 | 4/2010 | Pan |
| 2010/0159833 A1 | 6/2010 | Lewis et al. |
| 2010/0184378 A1 | 7/2010 | Wakefield |
| 2010/0245054 A1 | 9/2010 | Kim |
| 2010/0289620 A1 | 11/2010 | Aminger et al. |
| 2011/0124326 A1 | 5/2011 | Kudo |
| 2012/0054493 A1 | 3/2012 | Bradley |
| 2012/0083209 A1 | 4/2012 | Giles et al. |
| 2012/0100868 A1 | 4/2012 | Kim et al. |
| 2012/0275361 A1 | 11/2012 | Berenberg et al. |
| 2012/0310391 A1 | 12/2012 | Sanders |
| 2012/0311643 A1 | 12/2012 | Aguirre et al. |
| 2012/0328061 A1 | 12/2012 | Chow |
| 2013/0023238 A1 | 1/2013 | Kaplan et al. |
| 2013/0034004 A1* | 2/2013 | Mannemala ...... H04W 52/0216 |
| | | 370/252 |
| 2013/0070925 A1 | 3/2013 | Yamada et al. |
| 2013/0104035 A1 | 4/2013 | Wagner et al. |
| 2013/0111555 A1 | 5/2013 | Leneel |
| 2013/0171986 A1 | 7/2013 | Shimizu |
| 2013/0217332 A1 | 8/2013 | Altman et al. |
| 2013/0271902 A1 | 10/2013 | Lai et al. |
| 2013/0275873 A1 | 10/2013 | Shaw et al. |
| 2013/0290191 A1 | 10/2013 | Dischamp et al. |
| 2013/0290522 A1 | 10/2013 | Behm, Jr. |
| 2013/0343542 A1 | 12/2013 | Rosati et al. |
| 2014/0111307 A1 | 4/2014 | Ingrassia et al. |
| 2014/0213301 A1 | 7/2014 | Evans et al. |
| 2014/0222685 A1 | 8/2014 | Middleton et al. |
| 2014/0379584 A1 | 12/2014 | Ward |
| 2015/0019124 A1 | 1/2015 | Bandyopadhyay et al. |
| 2015/0072618 A1 | 3/2015 | Granbery |
| 2015/0126234 A1 | 5/2015 | Rodriguez |
| 2015/0189596 A1 | 7/2015 | Stephens |
| 2015/0222517 A1 | 8/2015 | McLaughlin et al. |
| 2015/0277852 A1 | 10/2015 | Burgis |
| 2015/0289207 A1* | 10/2015 | Kubo .................. H04W 4/029 |
| | | 370/311 |
| 2015/0334569 A1 | 11/2015 | Rangarajan et al. |
| 2015/0350140 A1 | 12/2015 | Garcia et al. |
| 2015/0350167 A1* | 12/2015 | Djakovic ............ H04L 61/5092 |
| | | 713/163 |
| 2015/0350820 A1 | 12/2015 | Son et al. |
| 2015/0356030 A1 | 12/2015 | Zahand et al. |
| 2015/0382140 A1 | 12/2015 | Cho et al. |
| 2016/0006577 A1 | 1/2016 | Logan |
| 2016/0017402 A1 | 1/2016 | Roth et al. |
| 2016/0037439 A1 | 2/2016 | Shamis et al. |
| 2016/0057572 A1 | 2/2016 | Bojorquez Alfaro et al. |
| 2016/0057625 A1 | 2/2016 | Andrada et al. |
| 2016/0069991 A1 | 3/2016 | Das et al. |
| 2016/0080591 A1 | 3/2016 | Asakura |
| 2016/0087959 A1 | 3/2016 | Park |
| 2016/0088143 A1 | 3/2016 | Cohn et al. |
| 2016/0094947 A1 | 3/2016 | Shen et al. |
| 2016/0140335 A1 | 5/2016 | Proulx et al. |
| 2016/0142856 A1 | 5/2016 | Worrall et al. |
| 2016/0164973 A1 | 6/2016 | Kapoor et al. |
| 2016/0167153 A1 | 6/2016 | Denis et al. |
| 2016/0174023 A1 | 6/2016 | Cavallaro et al. |
| 2016/0180392 A1 | 6/2016 | Liu et al. |
| 2016/0189507 A1 | 6/2016 | Rayner |
| 2016/0205556 A1 | 7/2016 | Borghei |
| 2016/0212538 A1 | 7/2016 | Fullam et al. |
| 2016/0234213 A1 | 8/2016 | Kim et al. |
| 2016/0242192 A1 | 8/2016 | Llosa et al. |
| 2016/0248564 A1 | 8/2016 | Qi et al. |
| 2016/0302137 A1 | 10/2016 | Escott et al. |
| 2016/0330095 A1 | 11/2016 | Numakami |
| 2016/0344712 A1 | 11/2016 | Ding et al. |
| 2016/0352518 A1 | 12/2016 | Ford et al. |
| 2016/0357385 A1 | 12/2016 | Dan et al. |
| 2016/0359629 A1 | 12/2016 | Nadathur et al. |
| 2016/0360350 A1 | 12/2016 | Watson et al. |
| 2016/0371507 A1 | 12/2016 | Jakobsson |
| 2017/0006417 A1* | 1/2017 | Canoy ............... H04B 7/18506 |
| 2017/0078408 A1* | 3/2017 | Lepp .................... H04L 67/561 |
| 2017/0126818 A1 | 5/2017 | Kang |
| 2017/0127340 A1 | 5/2017 | Dooley et al. |
| 2017/0134898 A1 | 5/2017 | Vega et al. |
| 2017/0171181 A1 | 6/2017 | Britt |
| 2017/0228935 A1 | 8/2017 | Foster et al. |
| 2017/0272415 A1 | 9/2017 | Zhao et al. |
| 2017/0325065 A1 | 11/2017 | Azam et al. |
| 2017/0330031 A1 | 11/2017 | Wilson et al. |
| 2018/0013815 A1 | 1/2018 | Gold |
| 2018/0025595 A1 | 1/2018 | Ingrassia et al. |
| 2018/0035374 A1 | 2/2018 | Borden et al. |
| 2018/0124558 A1* | 5/2018 | Stampfl .................. H04W 4/80 |
| 2018/0176748 A1 | 6/2018 | Kim et al. |
| 2018/0183591 A1 | 6/2018 | De Laat et al. |
| 2018/0183596 A1 | 6/2018 | Deshpande et al. |
| 2018/0184286 A1 | 6/2018 | Patterson |
| 2018/0199138 A1 | 7/2018 | Dusan et al. |
| 2018/0219872 A1 | 8/2018 | Sugashima et al. |
| 2018/0227284 A1 | 8/2018 | Sugano et al. |
| 2018/0262907 A1 | 9/2018 | Alanis et al. |
| 2018/0288208 A1 | 10/2018 | Lee et al. |
| 2018/0288599 A1 | 10/2018 | Zhao et al. |
| 2018/0317266 A1* | 11/2018 | Britt ........................ H04W 4/80 |
| 2018/0343561 A1 | 11/2018 | Patterson |
| 2018/0348718 A1 | 12/2018 | Richardson et al. |
| 2019/0028281 A1 | 1/2019 | Turissini et al. |
| 2019/0028445 A1 | 1/2019 | McLaughlin et al. |
| 2019/0034920 A1 | 1/2019 | Nolan et al. |
| 2019/0037469 A1 | 1/2019 | Krishnan et al. |
| 2019/0058966 A1 | 2/2019 | Puppala et al. |
| 2019/0069243 A1 | 2/2019 | Bean et al. |
| 2019/0073735 A1 | 3/2019 | Conlon |
| 2019/0082274 A1 | 3/2019 | Dickmann et al. |
| 2019/0116173 A1 | 4/2019 | Robison et al. |
| 2019/0124469 A1* | 4/2019 | Roy ........................ G08B 21/02 |
| 2019/0191301 A1 | 6/2019 | Fang et al. |
| 2019/0213528 A1 | 7/2019 | Gupta et al. |
| 2019/0246253 A1 | 8/2019 | Ryu et al. |
| 2019/0289059 A1 | 9/2019 | Vanahalli et al. |
| 2020/0034835 A1 | 1/2020 | Kim |
| 2020/0074822 A1 | 3/2020 | Ingrassia, Jr. et al. |
| 2020/0107164 A1 | 4/2020 | Lopatin et al. |
| 2020/0145244 A1 | 5/2020 | Hollinger et al. |
| 2020/0177595 A1 | 6/2020 | Rakshit et al. |
| 2020/0187001 A1 | 6/2020 | Ard et al. |
| 2020/0213133 A1 | 7/2020 | Schaap et al. |
| 2020/0226908 A1 | 7/2020 | Doxey et al. |
| 2020/0242662 A1 | 7/2020 | Middleton et al. |
| 2020/0344549 A1 | 10/2020 | Wegener |
| 2021/0044957 A1 | 2/2021 | Norp et al. |
| 2021/0136846 A1 | 5/2021 | Ponnusamy et al. |
| 2021/0203747 A1 | 7/2021 | Gorsica, IV et al. |
| 2021/0204115 A1 | 7/2021 | Gorsica, IV et al. |
| 2021/0250355 A1 | 8/2021 | Galdo et al. |
| 2021/0256833 A1 | 8/2021 | Daoura et al. |
| 2021/0334851 A1 | 10/2021 | Proctor, Jr. et al. |
| 2021/0336775 A1 | 10/2021 | Gu et al. |
| 2021/0400045 A1 | 12/2021 | Kondeti |
| 2022/0021684 A1 | 1/2022 | Mensah et al. |
| 2022/0052847 A1 | 2/2022 | Gonzalez Cervantes et al. |
| 2022/0070667 A1 | 3/2022 | Victa et al. |
| 2022/0078029 A1 | 3/2022 | Galdo et al. |
| 2022/0165139 A1 | 5/2022 | Ingrassia et al. |
| 2022/0200789 A1 | 6/2022 | Lalande et al. |
| 2022/0201428 A1 | 6/2022 | Ertan et al. |

(56)                References Cited

U.S. PATENT DOCUMENTS

| | | |
|---|---|---|
| 2022/0224300 A1 | 7/2022 | Knode |
| 2022/0256633 A1 | 8/2022 | Gu et al. |
| 2022/0301410 A1 | 9/2022 | Erdmann, IV et al. |
| 2022/0327196 A1 | 10/2022 | Trapani |
| 2022/0369022 A1 | 11/2022 | Jorgovanovic et al. |
| 2022/0386076 A1 | 12/2022 | Lopatin et al. |
| 2022/0394431 A1 | 12/2022 | Lopatin et al. |
| 2022/0394660 A1 | 12/2022 | Werner et al. |

FOREIGN PATENT DOCUMENTS

| | | |
|---|---|---|
| CN | 104833945 | 8/2015 |
| CN | 106412816 | 2/2017 |
| CN | 106792501 A | 5/2017 |
| CN | 107328424 | 11/2017 |
| CN | 108223229 A | 6/2018 |
| CN | 108520552 | 9/2018 |
| CN | 108604129 A | 9/2018 |
| CN | 109596118 | 4/2019 |
| CN | 111436040 | 7/2020 |
| CN | 112068512 | 12/2020 |
| CN | 114071357 | 2/2022 |
| EP | 1296155 | 3/2003 |
| EP | 2020784 | 2/2009 |
| GB | 2472192 A | 2/2011 |
| JP | 11262065 A | 9/1999 |
| JP | 2007150904 A | 6/2007 |
| JP | 2018056773 A | 4/2018 |
| JP | 2018124258 A | 8/2018 |
| JP | 2018191522 | 12/2018 |
| JP | 2021025798 | 2/2021 |
| KR | 20140044916 | 4/2014 |
| KR | 20170013833 | 2/2017 |
| KR | 20180086118 A | 7/2018 |
| KR | 2019-0141998 A | 12/2019 |
| WO | 2010126846 A1 | 11/2010 |
| WO | 2012030733 | 3/2012 |
| WO | 2013036488 | 3/2013 |
| WO | 2013163334 | 10/2013 |
| WO | 2014005004 A1 | 3/2014 |
| WO | 2014042507 A1 | 3/2014 |
| WO | 2014160372 A1 | 10/2014 |
| WO | 2016019064 A1 | 2/2016 |
| WO | 2016032610 | 3/2016 |
| WO | 2016036453 A1 | 3/2016 |
| WO | 2017107077 | 6/2017 |
| WO | 2018001518 A1 | 1/2018 |
| WO | 2018118026 A1 | 6/2018 |
| WO | 2018135919 | 7/2018 |
| WO | 2018156555 A1 | 8/2018 |
| WO | 2018160863 A1 | 9/2018 |
| WO | 2019232420 A2 | 12/2019 |
| WO | 2020214701 A1 | 10/2020 |
| WO | 2020214708 A1 | 10/2020 |
| WO | 2020214709 A1 | 10/2020 |
| WO | 2020214711 A1 | 10/2020 |
| WO | 2022046527 | 3/2022 |
| WO | 2022256438 | 12/2022 |

OTHER PUBLICATIONS

PCT/US2019/048899, "Notification of Transmittal of the International Search Report and the Written Opinion of the International Searching Authority, or The Declaration" mailed Dec. 2, 2019, 5 pgs.

EP22172663.1, "Extended European Search Report" mailed Jan. 25, 2023, 18 pages.

PCT/US2020/028318, "PCT Notification of Transmittal of the International Search Report and the Written Opinion of the International Searching Authority, or the Declaration", Mailed Jul. 8, 2020, 16 pages.

PCT/US2020/028326, "PCT Notification of Transmittal of the International Search Report and the Written Opinion of the International Searching Authority, or the Declaration", Mailed Jul. 3, 2020, 12 pages.

PCT/US2020/028327, "PCT Notification of Transmittal of the International Search Report and the Written Opinion of the International Searching Authority, or the Declaration", Mailed Sep. 14, 2020, 17 pages.

PCT/US2020/028329, "PCT Notification of Transmittal of the International Search Report and the Written Opinion of the International Searching Authority, or the Declaration", Mailed Jul. 15, 2020, 13 pages.

A. Korolova et al., "Cross-App Tracking via Nearby Bluetooth Low Energy Devices", a presentation proposal for PrivacyCon 2017, Published Mar. 13, 2018, 12 pgs.

Mannan, Mohammad, et al. "Mercury: Recovering forgotten passwords using personal devices." International Conference on Financial Cryptography and Data Security. Springer, Berlin, Heidelberg, 2011 (Year: 2011).

Lopez, Mareo, "The Importance of a Speaker's Resonant Frequency", proaudioland.com, 3 pages, Aug. 2015 (Year: 2015).

Thetileapp.com [online], "Learn How Tile's Tracking Device Helps You Find Your Lost Things," Dec. 9, 2016, retrieved from URL <https://www.thetileapp.com/how-it-works>, 9 pages.

PCT/US2023/017975, "PCT Notification of Transmittal of the International Search Report and the Written Opinion of the International Searching Authority, or the Declaration", mailed Jun. 29, 2023, 12 pages.

FOFA, "Find One, Find All Key Finder & Remote Control Locators", received from The Wayback Machine—https://web.archive.org/web/20200715080402/http://www.findonefindall.com:80/index.htm, 3 pages.

Kim et al., "In/Out Status Monitoring in Mobile Asset Tracking with Wireless Sensor Networks", received from www.mdpi.com/journal/sensors, published Mar. 26, 2010, 22 pages.

Fuemmeler et al., "Energy Efficient Multi-Object Tracking in Sensor Networks", received from https://ieeexplore.ieee.org/document/5439914, published Mar. 29, 2010, 9 pages.

Cocchi et al., "Subband Neural Networks Prediction for On-Line Audio Signal Recovery", received from https://ieeexplore.ieee.org/document/1021887, Published Jul. 2002, 10 pages.

PCT/US2022/027681, "PCT Notification of transmittal of the International Search Report and the Written Opinion of the International Searching Authority, or the Declaration", mailed Jul. 28, 2022, 9 pages.

Chinese Patent Application No. CN202080028897.2 , Office Action, Mailed on Nov. 15, 2024, 6 pages (3 pages of English translation and 3 pages of official language copy).

European Patent Application No. EP23196053.5 , Office Action, Mailed on Jan. 15, 2025, 6 pages.

U.S. Appl. No. 16/848,453, "Ex Parte Quayle Action", Jun. 8, 2021, 9 pages.

U.S. Appl. No. 17/603,562, "Corrected Notice of Allowability", Aug. 13, 2024, 31 pages.

U.S. Appl. No. 17/603,562, "Corrected Notice of Allowability", Oct. 20, 2023, 31 pages.

U.S. Appl. No. 17/603,562, "Corrected Notice of Allowability", Feb. 26, 2025, 35 pages.

U.S. Appl. No. 17/603,562, Notice of Allowance, Mailed on Oct. 5, 2023, 33 pages.

U.S. Appl. No. 17/603,562, Notice of Allowance, Mailed on Jun. 5, 2024, 34 pages.

U.S. Appl. No. 17/603,562, Notice of Allowance, Mailed on Feb. 15, 2024, 35 pages.

U.S. Appl. No. 17/603,562, Notice of Allowance, Mailed on Sep. 11, 2024, 36 pages.

U.S. Appl. No. 17/603,562, Notice of Allowance, Mailed on Jan. 10, 2025, 37 pages.

U.S. Appl. No. 17/603,562, Notice of Allowance, Mailed on May 20, 2025, 39 pages.

U.S. Appl. No. 17/603,580, Non-Final Office Action, Mailed on Dec. 5, 2023, 12 pages.

(56) References Cited

OTHER PUBLICATIONS

U.S. Appl. No. 17/603,580, Notice of Allowance, Mailed on Apr. 23, 2024, 8 pages.

U.S. Appl. No. 17/603,580, Notice of Allowance, Mailed on Aug. 12, 2024, 9 pages.

U.S. Appl. No. 17/603,580, Notice of Allowance, Mailed on Nov. 26, 2024, 9 pages.

U.S. Appl. No. 17/603,923, Non-Final Office Action, Mailed on Mar. 4, 2024, 17 pages.

U.S. Appl. No. 17/603,923, Non-Final Office Action, Mailed on Sep. 14, 2023, 7 pages.

U.S. Appl. No. 17/603,923, Notice of Allowance, Mailed on Feb. 6, 2025, 7 pages.

U.S. Appl. No. 17/603,923, Notice of Allowance, Mailed on Jun. 6, 2025, 7 pages.

U.S. Appl. No. 17/603,562, Corrected Notice of Allowance, Mailed on Jul. 2, 2025, 30 pages.

U.S. Appl. No. 17/603,923, Notice of Allowance, Mailed on Oct. 15, 2024, 7 pages.

Chinese Patent Application No. CN202080028758.X, Office Action, Mailed on Nov. 16, 2024, 5 pages (English translation).

Chinese Patent Application No. CN202080028758.X, Office Action, Mailed on Jan. 13, 2024, 15 pages (9 pages of English translation and 6 pages of official language copy).

Chinese Patent Application No. CN202080028758.X, Office Action, Mailed on Aug. 31, 2024, 17 pages (10 pages of English translation and 7 pages of official language copy).

Chinese Patent Application No. CN202080028897.2, Notice of Decision to Grant, Mailed on Apr. 3, 2025, 4 pages (2 pages of English translation and 2 pages of official language copy).

Chinese Patent Application No. CN202080028897.2 , Office Action, Mailed on Feb. 20, 2024, 10 pages (6 pages of English translation and 4 pages of official language copy).

Chinese Patent Application No. CN202080028950.9 , Notice of Decision to Grant, Mailed on Oct. 1, 2024, 3 pages (2 pages of English translation and 1 page of official language copy).

Chinese Patent Application No. CN202080028950.9 , Office Action, Mailed on Feb. 24, 2024, 16 pages (8 pages of English translation and 8 page of official language copy).

Chinese Patent Application No. CN202080028953.2 , Office Action, Mailed on May 6, 2025, 14 pages (6 pages of English translation and 8 pages of official language copy).

Chinese Patent Application No. CN202080028953.2 , Office Action, Mailed on Dec. 13, 2024, 20 pages (11 pages of English translation and 9 pages of official language copy).

Chinese Patent Application No. CN202080028953.2 , Office Action, Mailed on Feb. 9, 2024, 9 pages (English translation).

European Patent Application No. EP20724311.4 , "Intention to Grant", Feb. 27, 2024, 10 pages.

European Patent Application No. EP20724311.4 , Office Action, Mailed on Feb. 16, 2023, 8 pages.

European Patent Application No. EP20724624.0 , "Intention to Grant", Nov. 5, 2024, 9 pages.

European Patent Application No. EP20724624.0 , Office Action, Mailed on Sep. 29, 2023, 6 pages.

European Patent Application No. EP20724624.0 , Office Action, Mailed on Feb. 27, 2023, 7 pages.

European Patent Application No. EP20724625.7 , Office Action, Mailed on Nov. 14, 2023, 6 pages.

European Patent Application No. EP20724978.0 , "Intention to Grant", Apr. 28, 2025, 10 pages.

European Patent Application No. EP20724978.0 , Office Action, Mailed on Jan. 11, 2024, 5 pages.

European Patent Application No. EP20724978.0 , Office Action, Mailed on Mar. 13, 2023, 7 pages.

European Patent Application No. EP23196053.5 , Extended European Search Report, Mailed on Sep. 26, 2023, 7 pages.

European Patent Application No. EP24186298.6 , Extended European Search Report, Mailed on Jul. 23, 2024, 9 pages.

European Patent Application No. EP25160790.9 , "Partial European Search Report", May 15, 2025, 6 pages.

Indian Patent Application No. IN202318008855 , "First Examination Report", Mar. 19, 2025, 6 pages.

International Application No. PCT/US2020/028318, International Preliminary Report on Patentability, Mailed on Oct. 28, 2021, 10 pages.

International Application No. PCT/US2020/028326, International Preliminary Report on Patentability, Mailed on Oct. 28, 2021, 9 pages.

International Application No. PCT/US2020/028327, International Preliminary Report on Patentability, Mailed on Oct. 28, 2021, 12 pages.

International Application No. PCT/US2020/028327, "Invitation to Pay Additional Fees and, Where Applicable, Protest Fee", Jul. 15, 2020, 11 pages.

International Application No. PCT/US2020/028329, International Preliminary Report on Patentability, Mailed on Oct. 28, 2021, 10 pages.

International Application No. PCT/US2023/031897, International Search Report and Written Opinion, Mailed on Dec. 12, 2023, 16 pages.

European Patent Application No. EP25160790.9 , Extended European Search Report, Mailed on Aug. 5, 2025, 18 pages.

U.S. Appl. No. 17/603,923, "Notice of Allowability", Aug. 19, 2025, 2 pages.

U.S. Appl. No. 17/603,562, "Corrected Notice of Allowability", Aug. 27, 2025, 31 pages.

European Patent Application No. EP20724625.7, Office Action, Mailed on Sep. 5, 2025, 8 pages.

European Patent Application No. EP24186298.6, Office Action, Mailed on Aug. 27, 2025, 5 pages.

* cited by examiner

400

Perform initial pairing with wireless accessory ~ 401

Generate public/private key pair and one or more additional shared secrets ~ 402

Send public key to the wireless accessory ~ 403

Store public/private key pair to keystore ~ 404

Register the wireless accessory with a device management server ~ 405

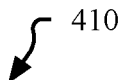

410

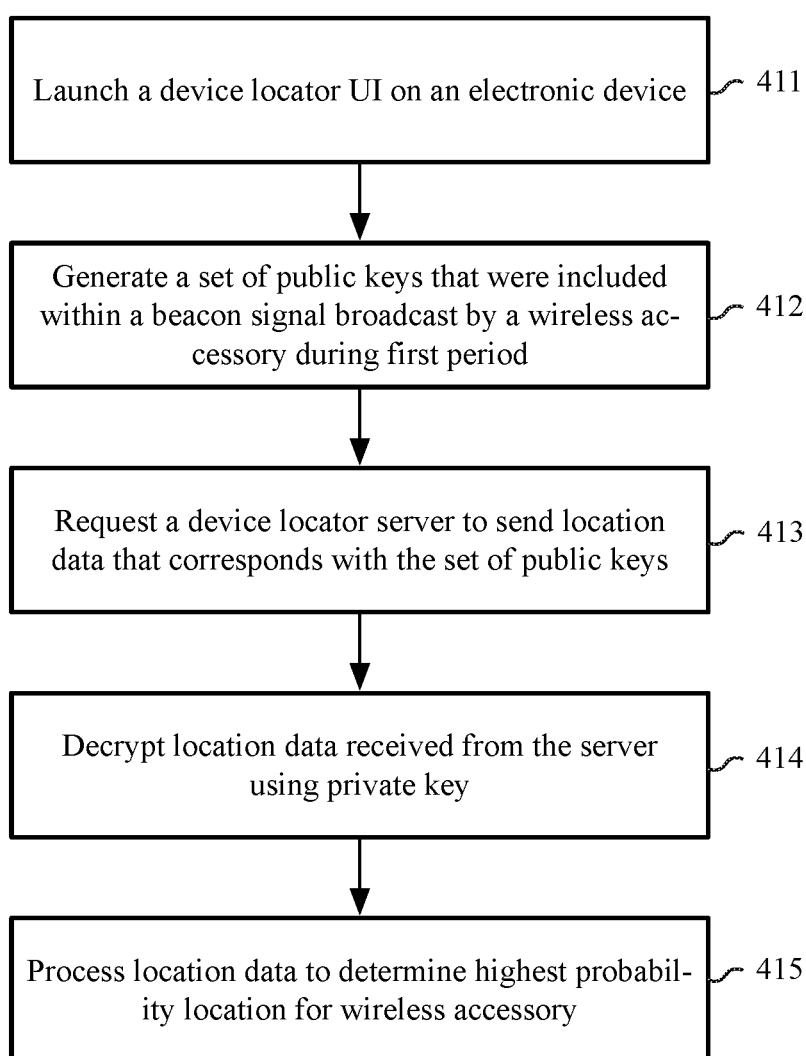

Launch a device locator UI on an electronic device — 411

Generate a set of public keys that were included within a beacon signal broadcast by a wireless accessory during first period — 412

Request a device locator server to send location data that corresponds with the set of public keys — 413

Decrypt location data received from the server using private key — 414

Process location data to determine highest probability location for wireless accessory — 415

*FIG. 4B*

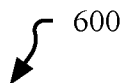

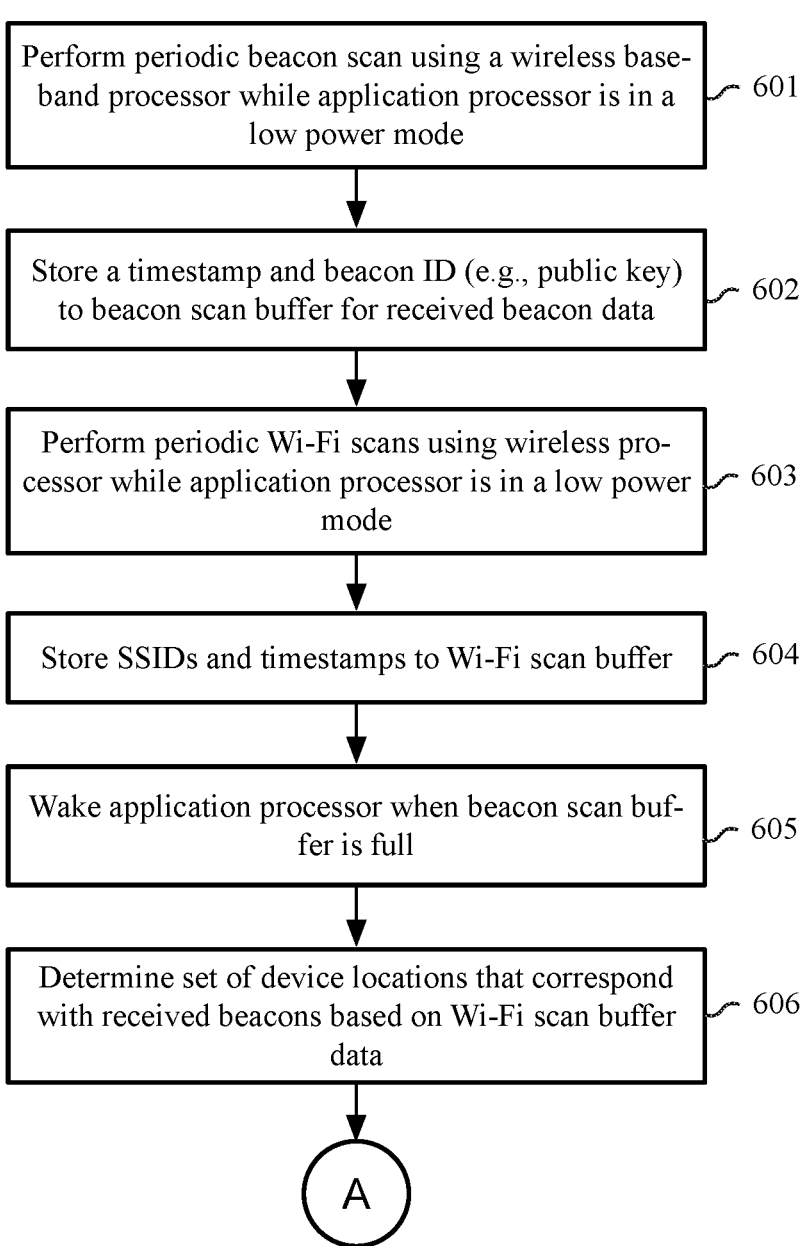

Perform periodic beacon scan using a wireless base-band processor while application processor is in a low power mode ⟿ 601

Store a timestamp and beacon ID (e.g., public key) to beacon scan buffer for received beacon data ⟿ 602

Perform periodic Wi-Fi scans using wireless processor while application processor is in a low power mode ⟿ 603

Store SSIDs and timestamps to Wi-Fi scan buffer ⟿ 604

Wake application processor when beacon scan buffer is full ⟿ 605

Determine set of device locations that correspond with received beacons based on Wi-Fi scan buffer data ⟿ 606

Accessory
Pairing UI
302

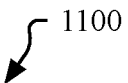
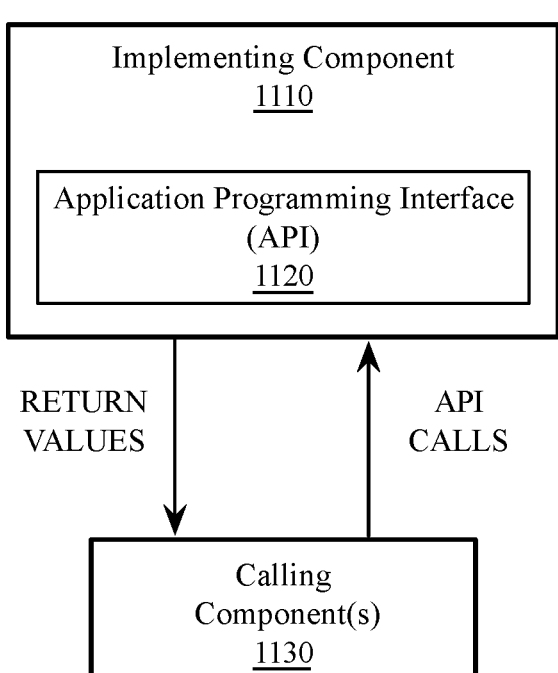
*Fig. 11*

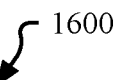

1600

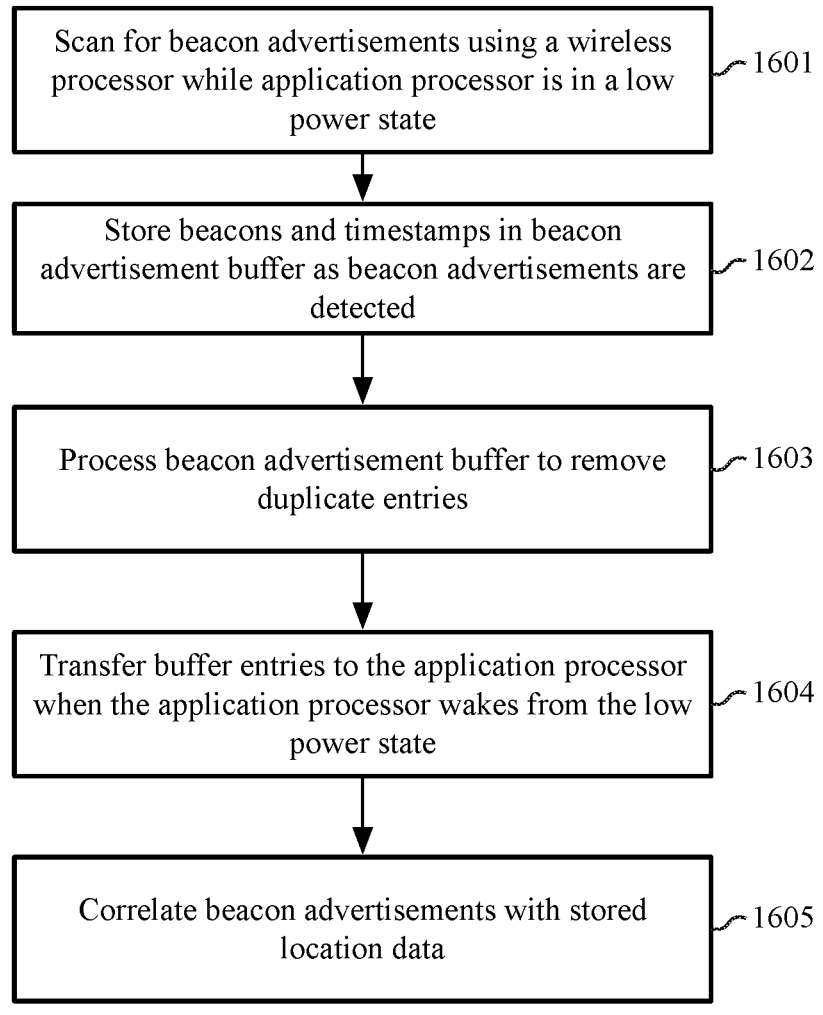

Scan for beacon advertisements using a wireless processor while application processor is in a low power state    1601

Store beacons and timestamps in beacon advertisement buffer as beacon advertisements are detected    1602

Process beacon advertisement buffer to remove duplicate entries    1603

Transfer buffer entries to the application processor when the application processor wakes from the low power state    1604

Correlate beacon advertisements with stored location data    1605

Review set of locations submitted for a device —1801

Analyze confidence scores for locations —1802

1803
Active location query for the device?

YES     NO

Send current location data —1804

1806
Device in motion?

NO

YES

Refine location data based on confidence scores —1805

Send constant feed of location data as new locations are received —1808

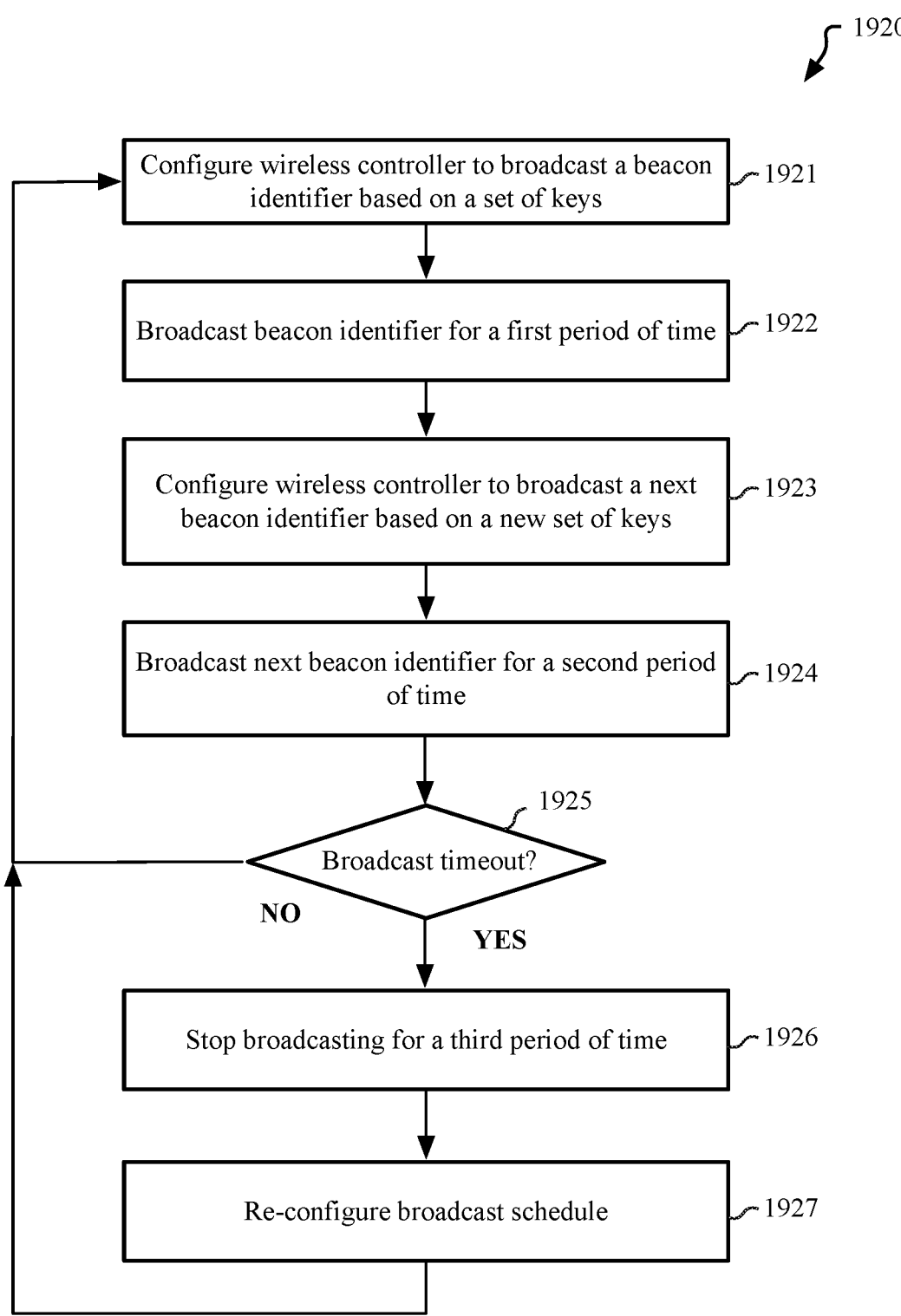

1920

Configure wireless controller to broadcast a beacon identifier based on a set of keys — 1921

Broadcast beacon identifier for a first period of time — 1922

Configure wireless controller to broadcast a next beacon identifier based on a new set of keys — 1923

Broadcast next beacon identifier for a second period of time — 1924

1925
Broadcast timeout?

NO　　　YES

Stop broadcasting for a third period of time — 1926

Re-configure broadcast schedule — 1927

*FIG. 19C*

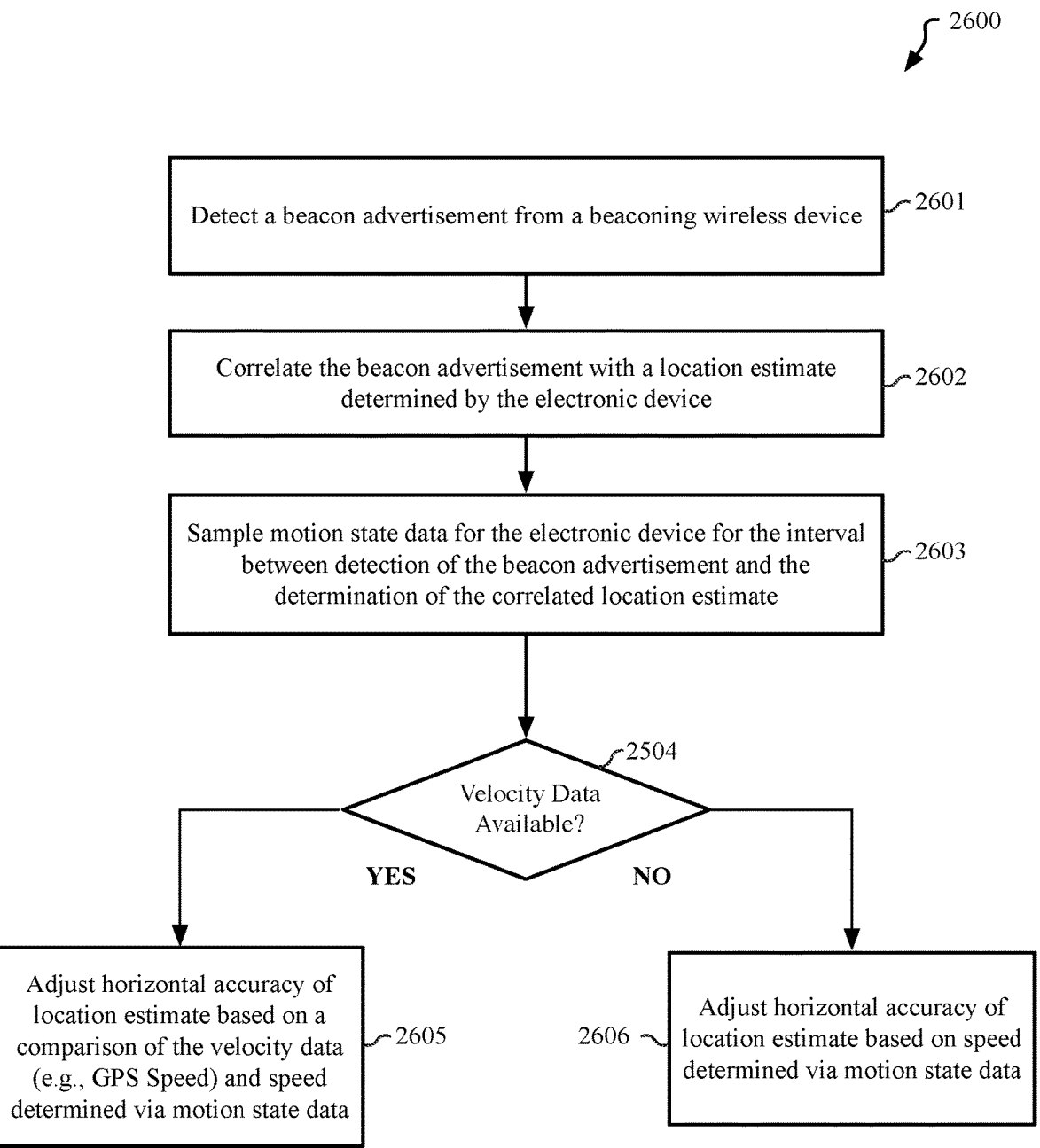

2600

Detect a beacon advertisement from a beaconing wireless device    2601

Correlate the beacon advertisement with a location estimate determined by the electronic device    2602

Sample motion state data for the electronic device for the interval between detection of the beacon advertisement and the determination of the correlated location estimate    2603

2504
Velocity Data Available?

YES      NO

Adjust horizontal accuracy of location estimate based on a comparison of the velocity data (e.g., GPS Speed) and speed determined via motion state data    2605

2606    Adjust horizontal accuracy of location estimate based on speed determined via motion state data

*FIG. 26*

LOCATION DATA HARVESTING AND PRUNING FOR WIRELESS ACCESSORY DEVICES

CROSS-REFERENCE

This patent application is a U.S. National Phase Application under 35 U.S.C. § 371 of International Application No. PCT/US2020/028327, filed Apr. 15, 2020, entitled "Location Data Harvesting and Pruning for Wireless Accessory Devices," which claims priority to U.S. Provisional Application Ser. No. 62/835,494, filed on Apr. 17, 2019, U.S. Provisional Patent Application Ser. No. 62/855,975 filed Jun. 1, 2019, and U.S. Provisional Patent Application Ser. No. 62/897,789 filed Sep. 9, 2019, each of which are hereby incorporated herein by reference.

FIELD

Embodiments described herein relate generally to a system and method of locating wireless devices and accessories. More specifically, embodiments relate to an infrastructure to enable the harvesting and pruning of location data for a wireless accessory.

BACKGROUND OF THE DESCRIPTION

Current security features in handheld and portable products allow the location of the product to be identified when requested by the user, such as in instances where the product is lost or stolen. If the wireless device includes positioning technology, the device can be configured to report its last location to the server computer, which is displayed by the service on a map presented to the user. Often wireless devices are used with wireless accessory devices that cannot determine their location and cannot communicate with a remote tracking services over a wide area network. These accessory devices can include, for example, wireless earbuds, headphones, headsets and other wearable devices (e.g., smartwatches, fitness bands, optical head-mounted displays) that communicate directly with the wireless device using peer-to-peer communications. For wireless accessory devices that cannot determine their location and cannot communicate with the remote tracking service, those devices cannot be tracked by the service when lost or stolen.

SUMMARY OF THE DESCRIPTION

Embodiments described herein provide for an electronic device comprising a wireless processor coupled with a wireless radio, memory to store instructions, and one or more processors to execute the instructions. When executed by the one or more processors, the instructions cause the one or more processors to scan for an beacon advertisement using the wireless processor, store the beacon and a timestamp in a beacon advertisement buffer in response to detection of the beacon via the wireless processor, correlate a beacon advertisement with stored location data to determine a location estimate for a device associated with the beacon advertisement, encrypt the location estimate for the beacon advertisement using a beacon identifier broadcast with the beacon identifier, and transmit a hash of the beacon identifier and an encrypted location estimate for the beacon advertisement to a device locator server. In one embodiment the one or more processors can scan for a beacon advertisement using the wireless processor while an application processor of the one or more processors is in a low power state.

One embodiment provides for a non-transitory machine-readable medium storing instructions to cause one or more processors of an electronic device to perform operations comprising scanning for a beacon advertisement using a wireless processor of the electronic device while an application processor of the electronic device is in a low power state, storing the beacon advertisement and a timestamp as an entry in a beacon advertisement buffer in response to detecting the beacon advertisement via the wireless processor, transferring buffer entries to the application processor when the application processor wakes from the low power state, and correlating beacon advertisements with stored location data to determine a location estimate for a device associated with the beacon advertisement.

One embodiment provides for a method comprising, on an electronic device having a wireless processor coupled with a wireless radio, scanning for a beacon advertisement using a wireless processor of the electronic device while an application processor of the electronic device is in a low power state, storing the beacon advertisement and a timestamp as an entry in a beacon advertisement buffer in response to detecting the beacon advertisement via the wireless processor, processing the beacon advertisement buffer to remove duplicate entries, transferring buffer entries to the application processor when the application processor wakes from the low power state, and correlating beacon advertisements with stored location data to determine a location estimate for a device associated with the beacon advertisement.

Embodiments described herein also provide techniques for known device matching and horizontal accuracy adjustment during location data harvesting for wireless accessory devices. One embodiment provides for a method comprising, on an electronic device having a wireless processor coupled with a wireless radio, scanning for a beacon advertisement using a wireless processor of the electronic device and detecting a beacon advertisement and having a beacon advertisement packet. The beacon advertisement packet can be an advertisement packet of a first type or an advertisement packet of a second type. The advertisement packet of the first type is broadcast by a device that has connected with a companion device within a threshold period of time and the advertisement packet of the second type is broadcast by a device that has not connected with a companion device within a threshold period of time. The method additionally comprises determining whether the beacon advertisement packet is an advertisement packet of the first type based on the structure of the beacon advertisement packet and in response to determining that the beacon advertisement packet is an advertisement packet of the first type, performing a first key matching operation on the beacon advertisement packet to determine if the beacon advertisement is associated with a known device. The first key matching operation can include comparing keys in a set of keys with an advertisement address in the beacon advertisement packet and determining that the beacon advertisement is associated with a known device when a set of bits in the advertisement addresses matches a corresponding set of bits in a key in the set of keys. The method additionally includes, in response to determining that the beacon advertisement packet is an advertisement packet of the second type, storing the beacon advertisement and an observation timestamp to a beacon advertisement datastore for deferred processing.

One embodiment provides a data processing system on an electronic device, the system comprising a memory device, a wireless radio coupled with the memory device, and one or more processors coupled with the wireless radio. The one or more processors include a wireless processor and an application processor. The one or more processors are configured to execute instructions stored in the memory device. The instructions, when executed, cause the one or more processors to detect a beacon advertisement from a beaconing wireless device, correlate the beacon advertisement with a location estimate determined by the electronic device, sample motion state data for the electronic device for an interval between detection of the beacon advertisement and determination of the location estimate correlated with the beacon advertisement, and adjust a horizontal accuracy of the location estimate based on a speed determined via the motion state data.

The above summary does not include an exhaustive list of all embodiments in this disclosure. All systems and methods can be practiced from all suitable combinations of the various aspects and embodiments summarized above, and also those disclosed in the Detailed Description below.

BRIEF DESCRIPTION OF THE DRAWINGS

The present invention is illustrated by way of example and not limitation in the figures of the accompanying drawings in which like references indicate similar elements, and in which:

FIG. 4A-4C are flow diagrams illustrating methods for use with the device locator systems described herein;

FIG. 6A-6B illustrate operations of a method that can be performed by a finder device, according to embodiments described herein;

FIG. 11 is a block diagram illustrating an exemplary API architecture, which may be used in some embodiments of the invention;

FIG. 16 illustrates a method to gather beacon advertisements while a finder device is in a low power state;

FIG. 19A-19C illustrate a system and methods of advertisement beaconing on a laptop device;

FIG. 26 illustrates a method of horizontal accuracy adjustment for detected beaconing devices.

DETAILED DESCRIPTION

Embodiments described herein provide techniques to enable secure crowdsourced locator services for lost or misplaced devices that cannot communicate with a wide area network. Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

The terminology used in this description is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the discussion that follows, a computing device that includes a touch-sensitive display is described. It should be understood, however, that the computing device may include one or more other physical user-interface devices. The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent.

Some processes are described below in terms of some sequential operations. However, it should be appreciated that some of the operations described may be performed in a different order. Moreover, some operations may be performed in parallel rather than sequentially.

Figure 1:
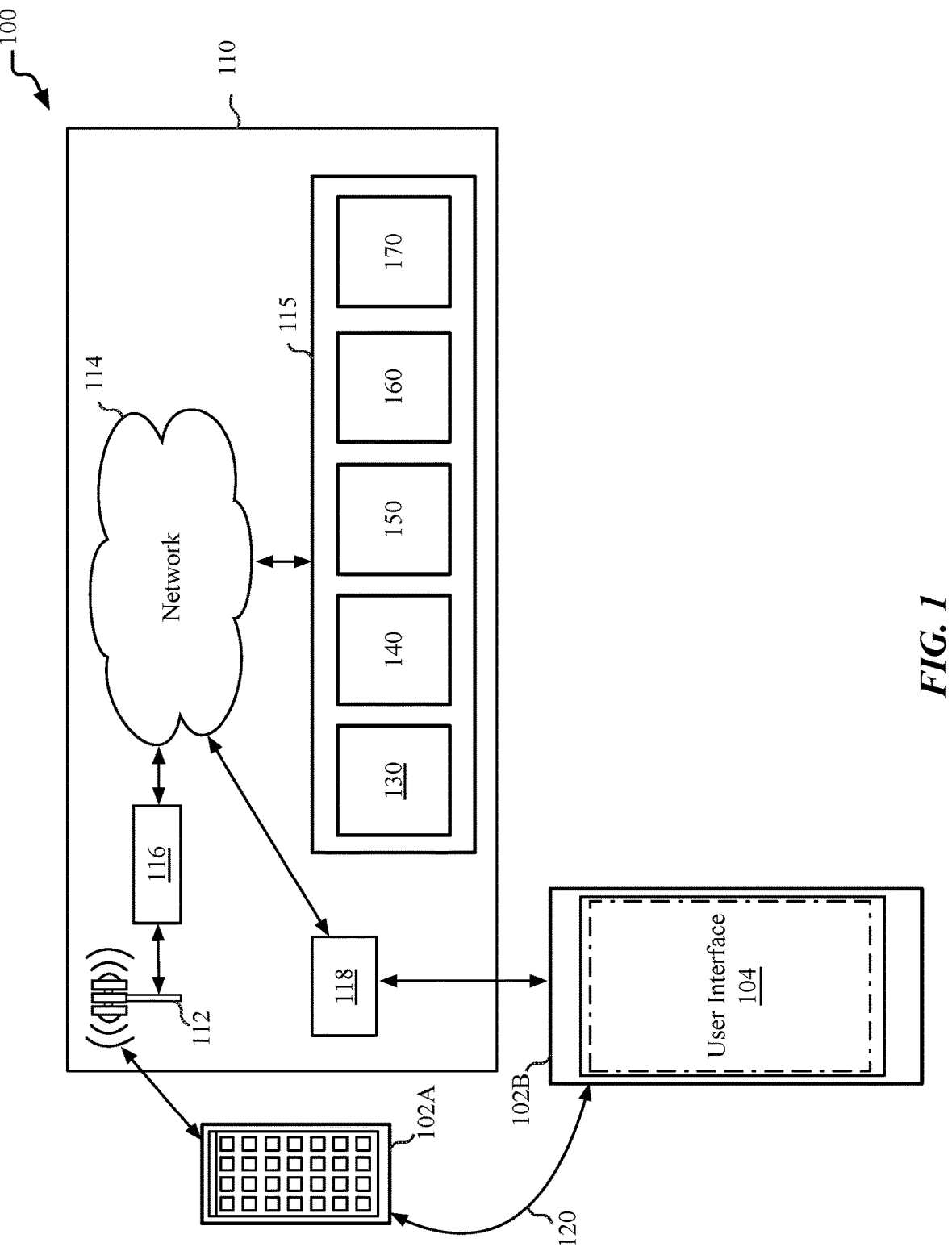
FIG. 1 is a block diagram of a network operating environment for mobile devices, according to an embodiment.

FIG. 1 is a block diagram of a network operating environment 100 for mobile devices, according to an embodiment. The network operating environment 100 includes multiple mobile devices, such as mobile device 102A and mobile device 102B. The mobile devices 102A-102B can each be any electronic device capable of communicating with a wireless network and one or more wireless accessory devices. Some example mobile devices include but are not limited to a smartphone, a tablet computer, a notebook computer, a wearable computer (e.g., smartwatch or other wearable computing accessory), a mobile media player, a personal digital assistant, and other similar devices. Each of mobile device 102A and mobile device 102B include a user interface, such as user interface 104 of mobile device 102B. Mobile device 102A and mobile device 102B can communicate over one or more wired and/or wireless networks 110 to perform data communication. For example, a wireless network 112 (e.g., cellular network, Wi-Fi network) can communicate with a wide area network 114, such as the Internet, by use of a gateway 116. Likewise, an access device 118, such as a mobile hotspot wireless access device, can provide communication access to the wide area network 114. The gateway 116 and access device 118 can then communicate with the wide area network 114 over a combination of wired and/or wireless networks.

In some implementations, both voice and data communications can be established over the wireless network 112 and/or the access device 118. For example, mobile device 102A can place and receive phone calls (e.g., using VoIP protocols), send and receive e-mail messages (e.g., using POP3 protocol), and retrieve electronic documents and/or streams, such as web pages, photographs, and videos, over the wireless network 112, gateway 116, and wide area network 114 (e.g., using TCP/IP or UDP). In some implementations, mobile device 102A can place and receive phone calls, send and receive e-mail messages, and retrieve electronic documents over the access device 118 and the wide area network 114. In some implementations, mobile device 102A or mobile device 102B can be physically connected to the access device 118 using one or more cables, for example, where the access device 118 is a personal computer. In this configuration, mobile device 102A or mobile device 102B can be referred to as a "tethered" device. In one embodiment, mobile device 102A can communicate with mobile device 102B via a wireless peer-to-peer connection 120. The wireless peer-to-peer connection 120 can be used to synchronize data between the devices.

Mobile device 102A or mobile device 102B can communicate with a service provider 115 that provides or enables one or more services. Exemplary services include a telephony service 130, a messaging service 140, a media service 150, a storage service 160, and a device locator service 170 over the one or more wired and/or wireless networks 110. For example, the telephony service 130 can enable telephonic communication between mobile device 102A and mobile device 102B, or between a mobile device and a wired telephonic device. The telephony service 130 can route voice over IP (VoIP) calls over the wide area network 114 or can access a cellular voice network (e.g., wireless network 112). The messaging service 140 can, for example, provide e-mail and/or other messaging services. The media service 150 can, for example, provide access to media files, such as song files, audio books, movie files, video clips, and other media data. The storage service 160 can provide network storage capabilities to mobile device 102A and mobile device 102B to store documents and media files. The device locator service 170 can enable a user to locate a lost or misplaced device that was, at least at some point, connected to the one or more wired and/or wireless networks 110. For example, mobile device 102A can perform a location query for mobile device 102B. The device locator service 170 can also enable location queries for devices that do not have a network connection via the use of a network of finder devices, as shown below in FIG. 2-3. Other services can also be provided, including a software update service to update operating system software or client software on the mobile devices. In one embodiment, the messaging service 140, media service 150, storage service 160, and device locator service 170 can each be associated with a cloud service provider, where the various services are facilitated via a cloud services account associated with the mobile devices 102A-102B.

Figure 2:
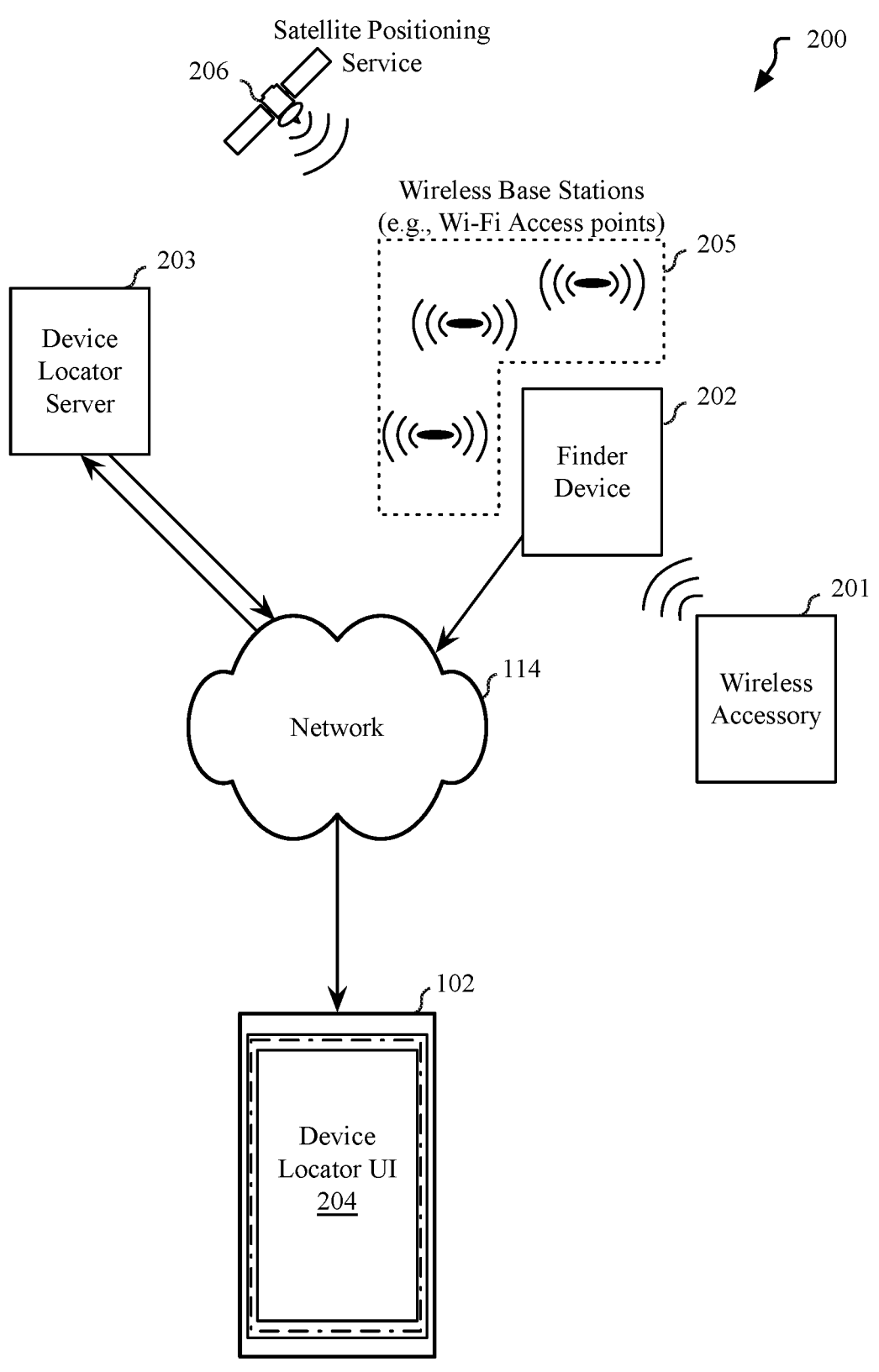
FIG. 2 illustrates a system to locate a wireless accessory that lacks access to a wide area network, according to an embodiment.

FIG. 2 illustrates a system 200 to locate a wireless accessory 201 that lacks access to a wide area network, according to an embodiment. The system 200 can also be used to locate a device that is unable to access a WAN or LAN, and thus cannot transmit the device location. In one embodiment, the wireless accessory 201 includes one or more wireless transceivers and can communicate, either directly or indirectly (e.g., through another device or computer) with a companion device (e.g., mobile device 102) over a wireless network or peer-to-peer communication link. Some examples of wireless accessory devices include but are not limited to wireless earbuds, headphones, headsets and other wearable devices (e.g., smartwatches, fitness bands, optical head-mounted displays). The wireless accessory 201 can also include other wireless devices such as game controllers or remote controls. The wireless accessory 201, in one embodiment, also includes smartphones, tablet computers, laptop computers, smart speaker devices, televisions, or television set top boxes that at least temporarily are unable to access a wide area network, such as the Internet (e.g., wide area network 114 as in FIG. 1). The wireless accessory can also be any other wireless device, including beacons or locator tags that can be attached to other devices or items to enable the tracking or locating of those devices or items. In one embodiment, the wireless accessory 201 can be paired with the mobile device 102 using a wireless technology standard, such as but not limited to Bluetooth. The wireless accessory 201 can also communicate with the mobile device 102 over wireless technologies such as Wi-Fi direct, Zigbee, or similar technologies. While the companion device to which the wireless accessory 201 is paired is generally referred to as a mobile device 102, companion devices are not limited to mobile devices. Companion devices, in some embodiments, can also include laptop or desktop devices and can additionally include some wearable accessories, such as but not limited to a smart watch device or a wearable display.

In one embodiment, the wireless accessory 201 can periodically transmit a wireless beacon signal. The wireless accessory 201 can transmit the beacon signal using one of a variety of wireless technologies described herein (e.g., Bluetooth, Wi-Fi, etc.) and in one embodiment can also beacon using an ultra-wide band (UWB) radio technology. The beacon signal can be transmitted using a single wireless technology, one of multiple selectable wireless technologies, or multiple simultaneous wireless technologies. The beacon signal can transmit a beacon identifier that includes information to specifically identify the wireless accessory 201. In one embodiment, the beacon identifier is a public encryption key associated with the device.

The beacon signal can also convey information about the wireless accessory 201, such as a beacon type, device classification, battery level. In one embodiment the beacon signal can also convey device status, such as a lost status, alarm status, or a near owner status. The beacon signal can also include information that specifies battery life, charging status, and/or other status information. The lost status can indicate that the wireless accessory 201 has determined itself to be lost or has been placed into a lost state by the owner of the device. The alarm status can indicate that the wireless accessory 201 was placed in a state that the device should trigger an alarm if moved from a current location. The near owner status can indicate that the wireless accessory 201 has detected the nearby presence of the mobile device 102 associated with the owner of the accessory.

The beacon signal can be detected by a finder device 202, which is locally proximate to the wireless accessory 201. The finder device 202 can be a similar device as the mobile device 102 and can receive and transmitting data over a wide area network 114 and receiving and transmitting using similar wireless technologies as the wireless accessory 201 (e.g., Bluetooth, etc.). Particularly, the finder device 202 can receive data using the wireless protocol over which the beacon signal is transmitted. The finder device 202 can determine a location using one or more location and/or positioning services including, but not limited to a satellite positioning service 206 or a terrestrial positioning system using RF signals received from wireless base stations 205 such as Wi-Fi access points or cell tower transmitters of a cellular telephone network. In an embodiment, the finder device 202 periodically stores its location as determined based on the one or more location and/or positioning services. The stored location can be associated with a timestamp for which the location was determined. When the finder device 202 receives a beacon signal from the wireless accessory 201, the finder device 202 can transmit a location for the finder device over the wide area network 114 to a device locator server 203. The timestamp for a determined location for the finder device 202 can be correlated with a timestamp for which a beacon signal was received to associate a geographic location with a received beacon signal. In one embodiment, the wireless accessory 201 includes location determination capability via an integrated satellite positioning service (e.g., GPS) receiver. If the wireless accessory lacks access to a network to send a location to the device locator server 203, the wireless accessory can encode encrypted location data within the beacon signal 301. Finder device 202 can then relay the encrypted location data to the device locator server 203.

Where the wireless accessory 201 provides a public key within the beacon signal, the finder device 202 can encrypt the determined location data and transmit the encrypted location data to the device locator server 203 over the wide area network 114. In one embodiment, additional data can either be encrypted and transmitted along with the location data or transmitted unencrypted to the device locator server 203. For example, a received signal strength indicator (RSSI) for the beacon signal can be transmitted along with the location data. The RSSI data can then be used to determine the distance of the wireless accessory 201 from the finder device 202 and assist in triangulation on the owner device. Where the RSSI data is transmitted in an unencrypted state, in one embodiment the server can use RSSI information to reduce noise by discarding very weak signals if other, stronger signals are present. In one embodiment, UWB ranging data can also be provided, where such data is available.

In one embodiment, the finder device 202 can behave differently upon receiving a beacon signal from a wireless accessory 201 depending upon a device status conveyed by the wireless accessory 201. For standard beacon signals, the finder device 202 can place encrypted location data into a queue and transmit the location data to the device locator server 203 during a periodic transmission window. However, if the wireless accessory 201 is indicating an alarm state, the finder device 202 can transmit the location data to the device locator server 203 immediately. Additionally, the finder device 202 may not transmit the location data to the device locator server 203 if the beacon signal of the wireless accessory 201 indicates that the accessory is near the owner of the accessory. Alternatively, the finder device 202 may delay transmission of encrypted location data.

If the owner of the wireless accessory 201 wishes to locate the wireless accessory, the owner can access a device locator user interface (e.g., device locator UI 204) on the mobile device 102. The device locator UI 204 can be associated with a device locator application that is used to locate electronic devices and accessories that are registered with an online account of the user, such as a cloud services account or another type of online account. The device owner, using the device locator UI 204, can query the device locator server 203 for location data that may have been transmitted to the device locator server by a finder device 202 of the wireless accessory 201. In one embodiment, the mobile device 102 can transmit the public encryption key associated with the wireless accessory 201 to the device locator server 203. The device locator server 203 can then return any stored location data that corresponds with the public encryption key. The location data returned to the mobile device 102 can be encrypted data that is encrypted by the finder device 202 using the public encryption key. The mobile device 102 can use an associated private key to decrypt the encrypted location data. The decrypted location data can then be processed by the mobile device 102 to determine a most probable location for the wireless accessory 201. In various embodiments, the most probable location for the wireless accessory 201 can be determined by triangulation from multiple received locations and using other data, such as a beacon signal RSSI associated with each location and timestamp or UWB ranging data included within the location data.

Figure 3:
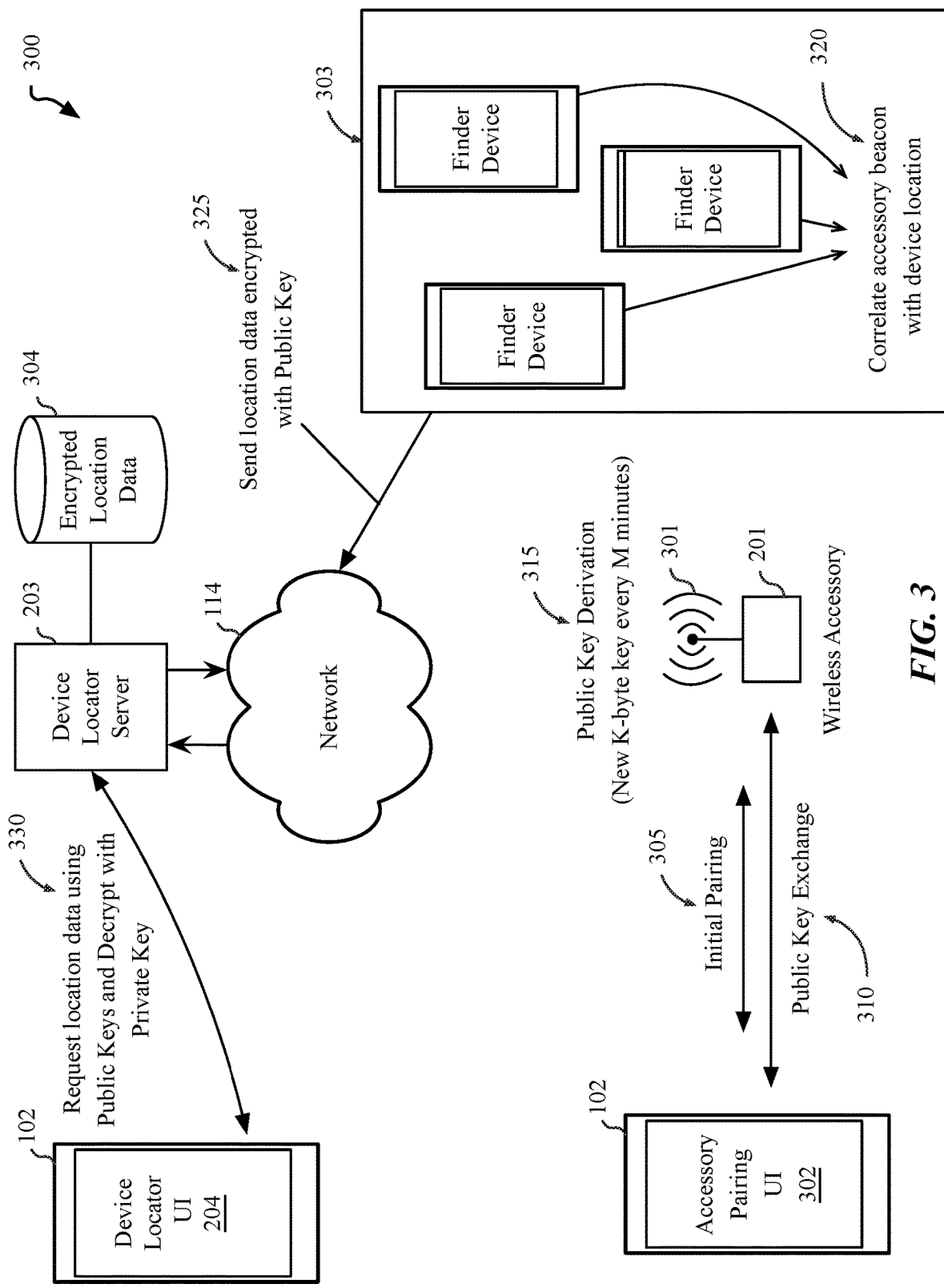
FIG. 3 illustrates a system for pairing and locating a wireless accessory, according to embodiments described herein.

FIG. 3 illustrates a system 300 for pairing and locating a wireless accessory, according to embodiments described herein. In one embodiment a mobile device 102 of a user of the wireless accessory 201 can present an accessory pairing UI 302 by which the user can pair the mobile device 102 with the wireless accessory 201. During an initial pairing (305) between the mobile device 102 and the wireless accessory, a public key exchange (310) can be performed between the mobile device and the wireless accessory. In one embodiment, during the public key exchange (310) the mobile device 102 and the wireless accessory 201 exchange public keys of public key pairs generated by the device and the accessory. In one embodiment the public key exchange (310) is a one-way transfer, in which the mobile device 102 transmits a public key of a public/private key pair to the wireless accessory 201. Alternatively, or additionally, the public key exchange (310) may be a Diffie-Hellman key exchange in which the device and the accessory establish a shared secret between two parties. In one embodiment, the public key exchange (310) additionally uses elliptic curve cryptography to establish the shared secret. For example, Elliptic-curve Diffie-Hellman (ECDH) can be used to enable the establishment of a public key pair and one or more shared secrets. In one embodiment, the one or more shared secrets include an anti-tracking secret, which can be used by the wireless accessory 201 to periodically derive additional public keys. In one embodiment, instead of using public key cryptography with a broadcasted public key, the wireless accessory can advertise a temporary identity and subsequently use identity-based encryption. With identity-based encryption, the public key is, or is derived from, some unique element of information about the identity of the user, such as an e-mail address. The entity that is to decrypt the encrypted information can obtain the decryption key from a trusted central authority.

After the wireless accessory 201 has been paired with the mobile device 102, the wireless accessory 201 can periodically broadcast a beacon signal 301 that includes device status information and a beacon identifier. In one embodiment the beacon identifier is a public key derived from a shared secret that is established during the public key exchange (310). Additionally, the wireless accessory 201 can periodically perform a public key derivation (315) to generate a new public key and begin broadcasting the new public key as the beacon identifier. The public key is a K-byte key, with a new K-byte key generated or rotated into use every M minutes. The value K and M can vary between embodiments. In one embodiment, a K value of 28 bytes is used. In one embodiment, a K value of 27 bytes is used. The value K can be determined at least in part based on the beacon length associated with the wireless protocol used to transmit the beacon signal 301. In one embodiment, the beacon signal can transmit a variant of beacon advertisement packet associated with a low-energy radio protocol, such as Bluetooth Low Energy.

The value M, in one embodiment, is 15 minutes, such that a new K-byte key is generated every 15 minutes. The public key can be derived deterministically based on a timestamp and an anti-tracking secret generated during the public key exchange 310. The public key derivation (315) process enables the wireless accessory 201 to use different keys over time, preventing the long-term association with a specific key with a specific device. The key can be derived based on an anti-tracking secret known only to the mobile device 102 and the wireless accessory 201, allowing the mobile device 102, and only the mobile device, to determine which public key will be broadcast by the wireless accessory 201 at any given timestamp. The anti-tracking secret can be generated along with an ECDH public key and transferred to the wireless accessory 201. The anti-tracking secret can then be used to enable the wireless accessory 201 to generate a sequence of public keys $P_i$. In one embodiment, the sequence of public keys $P_i = \lambda_i \cdot P$, which defines a group operation between a scalar or exponent value $\lambda_i$ and group elements, such as, for example, Elliptic Curve points P. The scalar or exponent value $\lambda = KDF(AT, i)$, where KDF is a key derivation function, AT is the anti-tracking secret, and i is a counter or timestamp.

In one embodiment, backtracking resistance can be enabled to protect the anti-tracking secret in the event the wireless accessory 201 is compromised. When backtracking resistance is enabled, the anti-tracking secret is transferred to the wireless accessory 201 but is not retained by the wireless accessory. Instead, the accessory computes a value $\lambda_{i+1} = H(\lambda_i \| time)$, with $\lambda_0 = AT$ and H being a cryptographic hash function. The wireless accessory 201 then stores $\lambda_i$ for a given time period i. If the wireless accessory 201 is compromised, only $\lambda_i$ for current and future values of i is exposed, without exposing the anti-tracking secret AT. In one embodiment, backtracking resistance is performed by periodically writing $\lambda_i$ to non-volatile memory of the wireless accessory 201. This approach is one of several that may be used. In various embodiments, other key security techniques may also be used. For example, a key generation and diversification technique as described below with respect to FIG. 15-16 may be used in one embodiment.

In one embodiment the wireless accessory 201 can transmit the beacon signal 301 every two seconds, although other beacon rates can be used, and the beacon rate can vary under certain circumstances. For example, the wireless accessory 201 can decrease a beacon rate when in a near owner state. Beacon rate can also vary based on accelerometer triggered events. For example, the wireless accessory 201 can increase the beacon rate when in an alarm state, which can be triggered by the accelerometer on the wireless accessory 201.

The wireless accessory 201 can enter the near owner state if, after transmitting the beacon signal 301, the wireless accessory 201 receives a reply from the mobile device 102 associated with the user of the accessory, which indicates that the mobile device 102 is within range of the wireless accessory. Additionally, while the wireless accessory is in the near owner state, the amount of data transmitted by the beacon signal 301 may be reduced. In one embodiment, the advertisement rate of the wireless accessory 201 may be reduced while wireless accessory is in the near owner state.

The wireless accessory 201 can enter an alarm state upon receiving a message from the mobile device 102 that indicates that the wireless accessory 201 should enter the alarm state. When in the alarm state, the wireless accessory can initially enter an armed state in which the wireless accessory 201 can reduce or cease the transmission of locator beacon signals, although other types of wireless signaling can persist. The wireless accessory 201 can remain in the armed state until the state is deactivated by the mobile device 102 or alarm is triggered. The alarm can be triggered, in one embodiment, upon detection of movement, for example, via an accelerometer within the wireless accessory 201. The alarm can also be triggered, in one embodiment, upon detection that the wireless accessory has moved out of range of the mobile device and is no longer in the near owner state. When the alarm is triggered, the rate at which the beacon signal 301 can be increased, to increase the speed by which the wireless accessory 201 can be located.

The beacon signal 301 transmitted by the wireless accessory 201 can be detected by a set of finder devices 303, which are other electronic devices that can receive the beacon signal transmitted by the wireless accessory and are transmit location and other data associated with the beacon signal 301 to the device locator server 203 via the wide area network 114. In one embodiment the set of finder devices 303 include variants of the mobile device 102 or can be other types of electronic devices. The set of finder devices 303 can include a variant of the finder device 202 of FIG. 2 and can determine similar location determination techniques. For example, the set of finder devices can perform operations (320) to correlate the beacon signal 301 received from the wireless accessory 201 with a device location associated with the finder device. As described with respect to FIG. 2, the device location can be determined via a satellite positioning service or a terrestrial positioning system that uses RF signals received from wireless base stations (e.g., Wi-Fi access points or cell tower transmitters). In one embodiment the set of finder devices 303 can also include stationary devices such as smart speaker devices, televisions, or television set top boxes that can receive the beacon signal 301.

The set of finder devices 303 can encrypt the location data with the beacon identifier (e.g., public key) received within the beacon signal 301 and send the location data (325) to the device locator server 203. The data sent by the set of finder devices 303 is sent anonymously and no identifying information for the finder devices is stored with the data sent by the finder devices.

The device locator server 203 can store encrypted location data in a data store 304, which in one embodiment can be a distributed database having multiple nodes. Hashes of the beacon identifier/public key of an accessory can be sent along with encrypted location data. The encrypted location data can be stored to a database node based on a hash of the beacon identifier. The encrypted location data can be indexed by the device locator server 203 using the hash of the beacon identifier. Sending the hash of the beacon identifier instead of the full beacon identifier prevents the storage of the full beacon identifier to the server. Other information can also be sent and stored with the location data, either in an encrypted or unencrypted state. The other information can include timestamps for when the beacon signal 301 was received, RSSI information for the received beacon, and/or ranging information determined, for example, via UWB ranging.

When the user or owner of the wireless accessory 201 wishes to locate the accessory, the user or owner can access the device locator UI 204 on the mobile device 102. The device locator UI 204 can be associated with a device locator application or feature of the mobile device 102. The device locator UI 204 may also have a web-based interface that can be accessed from the mobile device 102 or another type of electronic device, such as a laptop or desktop device. The mobile device 102, upon loading the device locator UI 204, can send a request (330) for location data to the device locator server 203. The request 330 can include a set of public key hashes, which can serve as beacon identifiers for the beacon data. The mobile device 102 can generate the set of public keys based on the secret information held by the mobile device 102 and the wireless accessory 201 and the timestamps over which the mobile device 102 wishes to receive location data. In one embodiment the set of public keys is based on the sequence of public keys $P_i$ that are generated based on the anti-tracking secret. The sequence of public keys $P_i$ corresponds to a matching sequence of private keys $d_i$. The mobile device 102 can generate the sequence of public keys, as well as the corresponding sequence of public keys $d_i$, where i is a counter or timestamp. In one embodiment, the mobile device 102 can generate and send hashes for the previous 24 hours of public keys within the request 330. If no data is found for 24 hours of public keys, the mobile device 102 can send hashed keys for an earlier period, back to a pre-determined location data retention limit.

The encrypted location data is stored and indexed based on a hash of the public key instead of the public key to prevent the provider of the location service data from storing data that can be used to tie the encrypted location data to a specific device, and thus a specific user or user account. The finder device sends the hash of the public key that is broadcast within the beacon signal 301 associated with an observation location. The owner of the device can query the device locator server 203 using a hash of the public key that is determined for a query period.

In some embodiments, if a location query is to be performed via the web-based interface from an electronic device, such as a laptop or desktop device, keys to enable the decryption of the location data may be required to be sent to the electronic device. In one embodiment, decryption keys for the location data may be sent to the server that provides the web-based interface to enable the server to decrypt location data, at least while the location data is being viewed through the web-based interface. Before location data is displayed via the web-based interface, a notice may be presented to inform the user that location decryption keys are being temporarily shared with the web-based interface server to enable location data to be decrypted and presented. In one embodiment, the sharing of the location decryption keys can be performed via an automatic and temporarily delegation of location query rights with a proxy account associated with the web-based interface.

In one embodiment, the wireless accessory 201 can be placed in a light lost mode. In the light lost mode, a set of future public keys can be generated for the wireless accessory and hashes of those public keys can be transmitted to the device locator server 203. The device locator server 203 can then notify the mobile device 102 if any location data is received that correspond with a key in the set of future public keys. In one embodiment, a finder device that sends a location for a wireless accessory that is in the light lost mode can be directed by the device locator server 203 to relay a message to the wireless accessory 201 that notifies the wireless accessory that it is in the light lost mode. A similar mechanism can be used to relay a message to the wireless accessory 201 that places the accessory in an explicit lost mode. The explicit lost mode can be enabled by the user via the device locator UI 204. In the explicit lost mode, the wireless accessory 201 cannot be paired with another device unless unlocked by the owner.

Figure 4A:
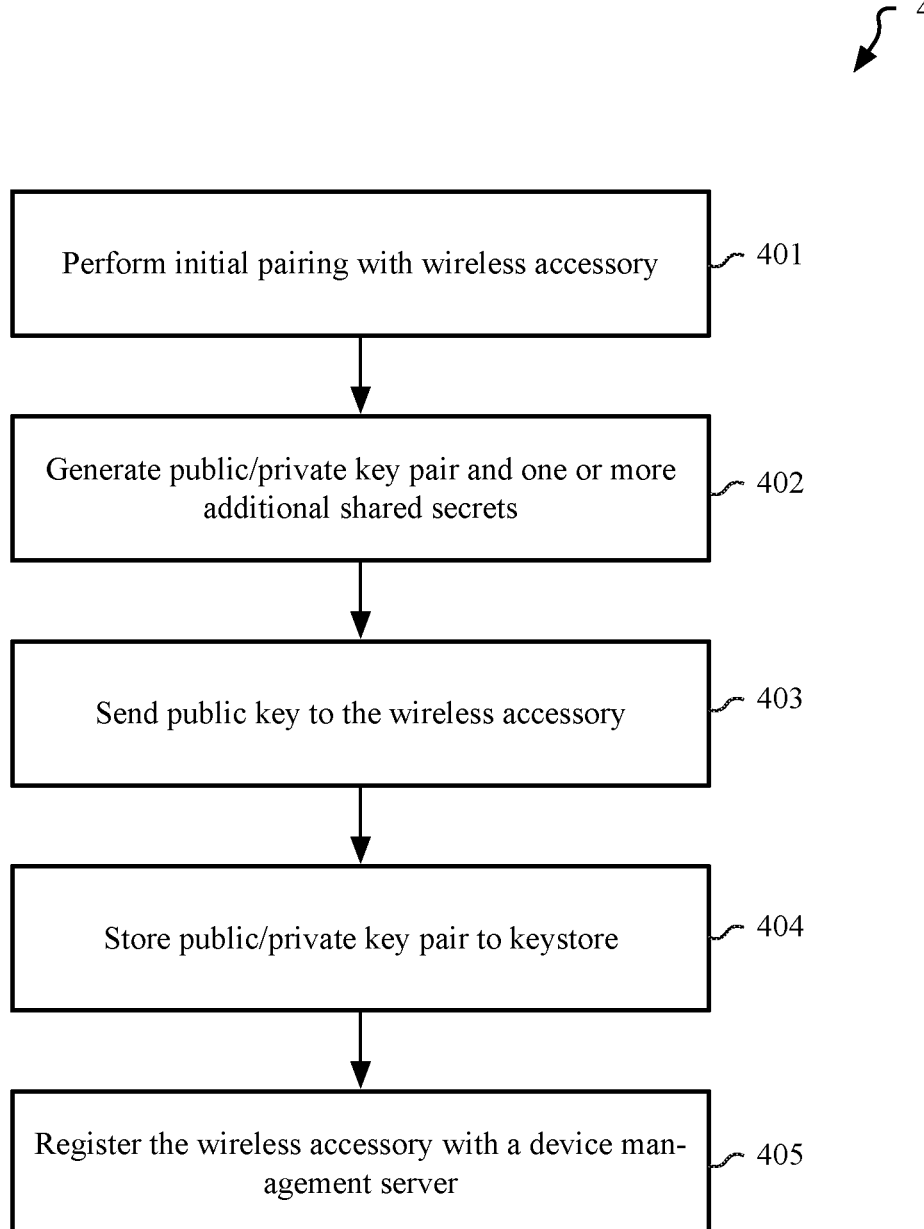
Figure 4C:
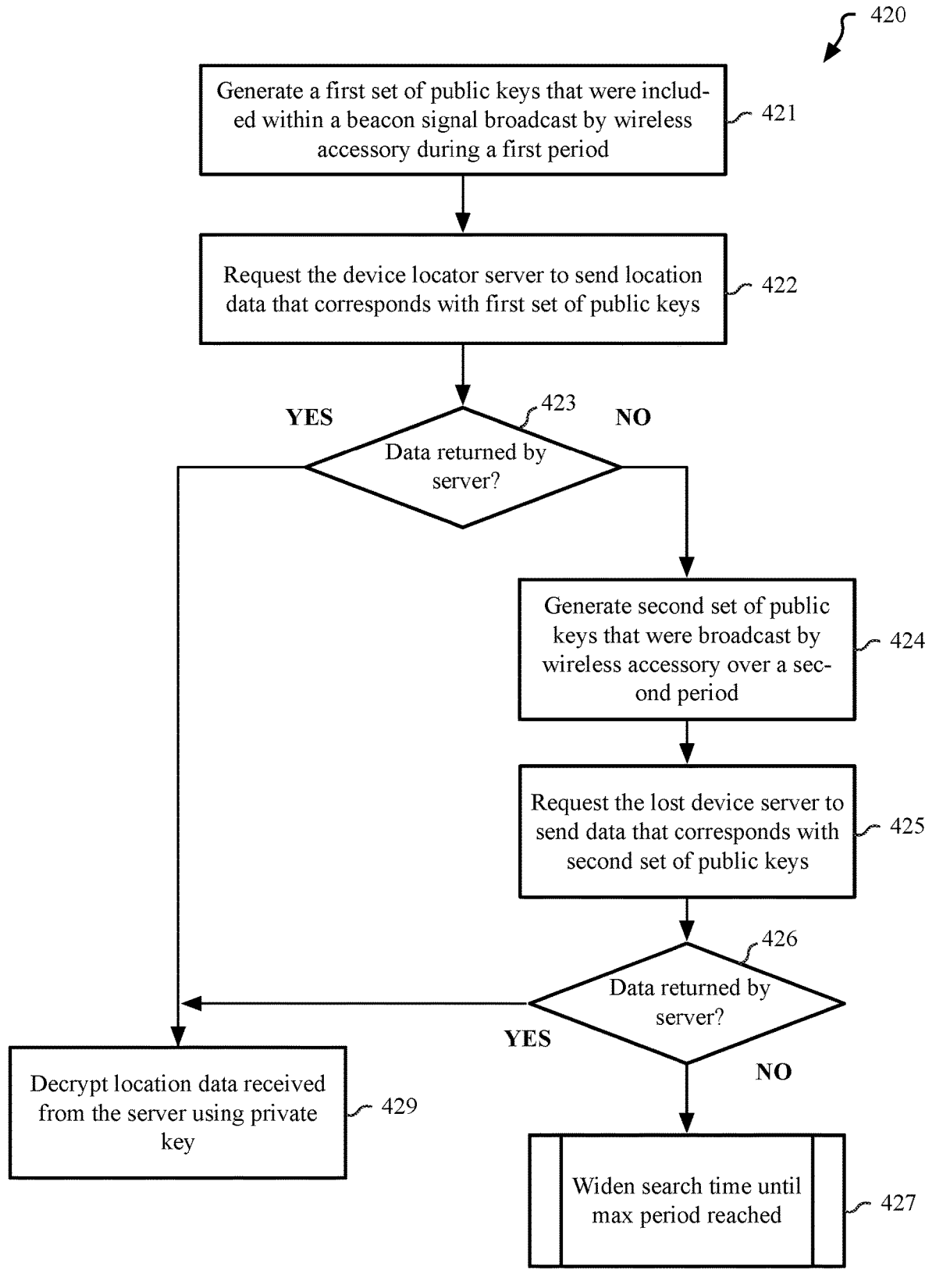

FIG. 4A-4C are flow diagrams illustrating methods for use with the device locator systems described herein. FIG. 4A illustrates a method 400 to pair a mobile device with a wireless accessory. FIG. 4B illustrates a method 410 to determine a location for a wireless accessory via a device locator server. FIG. 4C illustrates an additional method 420 to determine a location for a wireless accessory via a device locator server. Aspects of method 400, 410, and 420 are also illustrated in FIG. 2 and FIG. 3, as described above. For example, the description of the operations below refers to the mobile device 102, wireless accessory 201 and device locator server 203.

As shown in FIG. 4A, method 400 includes an operation (block 401) that performs an initial pairing with a wireless accessory. The initial pairing can be a Bluetooth pairing or another type of pairing using other wireless radio technologies. During the initial pairing, the mobile device and the wireless accessory can exchange identifiers, passkeys, or other credentials that enables a wireless data exchange to be performed between a mobile or another electronic device and the wireless accessory. On one embodiment the initial paring with the wireless accessory can include the exchange of credentials associated with the wireless protocol for which the pairing is performed, allowing all data exchanged wirelessly to have at least a first layer of encryption.

The mobile device can then generate a public/private key pair and one or more additional shared secrets (block 402). The device can then send the public key and one or more additional shared secrets to the wireless accessory (block 403). A variety of key generation techniques can be used. In one embodiment, a variant of ECDH is used to generate a public key pair for encryption. In one embodiment, the one or more additional shared secrets can include an anti-tracking secret that enables the wireless accessory to derive a new public key based on an existing public key.

After generating the public/private keypair and one or more additional shared secrets, the mobile device can store public/private key pair to a keystore (block 404). In one embodiment the keystore is a cloud-based keystore that can be synchronized with other devices associated with the same cloud services account, or family of cloud services accounts, to which the mobile device and wireless accessory are associated. The cloud-based keystore allows the wireless accessory to be located by other synchronized devices. The mobile device can then register the wireless accessory with a device management server (block 405). Registering the wireless accessory with the device management server can form an association between the wireless accessory and the cloud services account to which the mobile device is associated. The device management server can be associated with other cloud-based servers that are used to facilitate cloud-based services accessible to the mobile device, such as the device locator server 203 of FIG. 2 and FIG. 3.

As shown in FIG. 4B, method 410 includes an operation in which an electronic device launches a device locator UI (block 411). In response to launching the device locator UI, the electronic device, which can be a mobile device as described herein, or another electronic device associated with the same cloud services account as the mobile electronic device, can perform an operation to generate a set of public keys that were included within a beacon signal broadcast by a wireless accessory during a first period (block 412). The first period can be, for example, a previous 24 hours. The electronic device is aware of how often the wireless accessory is to generate or rotate to new public keys and, using a shared secret generated with the wireless accessory, can generate a set of public keys that correspond with the keys that were generated by the wireless accessory over the first period. The electronic device can then send the set of public keys within a request for the device locator server to send location data that corresponds with the set of public keys (block 413). In one embodiment, location data sent by the server in response to the request will be encrypted using the public key transmitted as the beacon identifier of the wireless accessory. The electronic device can decrypt the encrypted location data received by the server using the private key generated during the initial pairing with the wireless accessory (block 414). The electronic device can then process the location data to determine the highest probability location for the wireless accessory (block 415).

Processing the location data can include a variety of different operations. In one embodiment the location data includes latitude and longitude information along with a timestamp for which the location was determined. The electronic device can triangulate based on the timestamps and remove noise or outlier locations. In one embodiment the location data specifies the location of the finder device that detected the beacon. The location data can additionally include UWB ranging information and/or RSSI information for the beacon detected by the finder device. The electronic device can analyze the UWB ranging information and/or RSSI information in context with the device locations to develop a more accurate location for the wireless accessory.

Figure 10:
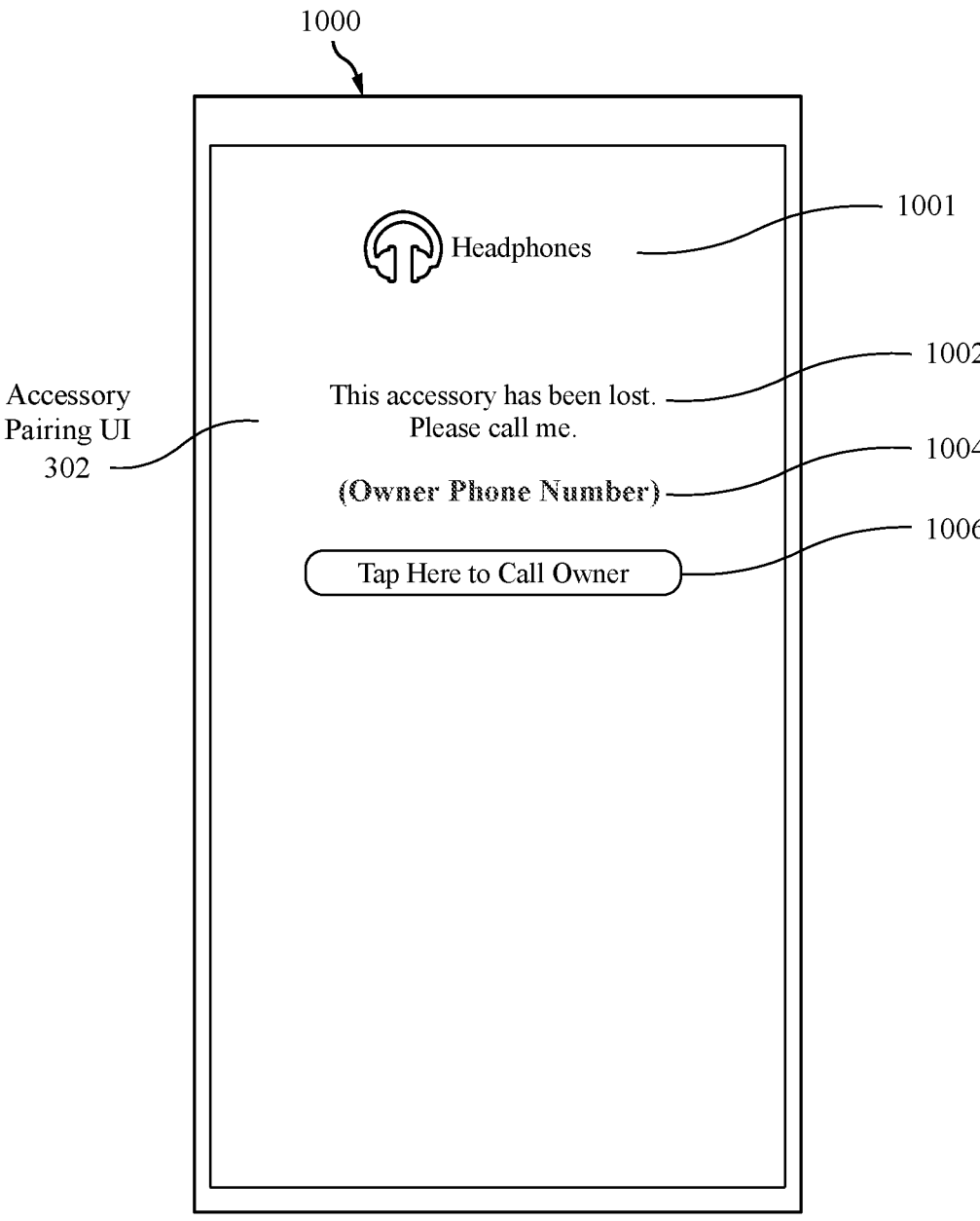
FIG. 10 illustrates an accessory pairing user interface that is displayed when attempting to pair with a lost wireless accessory, according to an embodiment.

Data that can be transmitted by a finder device and used for location processing is shown in FIG. 10 and described below.

As shown in FIG. 4C, method 420 includes operations that can be performed if the device locator server does not have location data to provide to the electronic device in response to a request. The electronic device can generate a first set of public keys that were included within a beacon signal broadcast by wireless accessory during a first period (block 421). The first period can be, for example, 24 hours, although other initial search periods can be used. The electronic device can perform a subsequent operation to request the device locator server to send location data that corresponds with first set of public keys (block 422). If the data is returned by the server (block 423, "yes"), the electronic device can decrypt the location data received from the server using the private key that corresponds with the set of public keys (block 429).

If data is not returned by the server (block 423, "no") the electronic device can generate a second set of public keys that were included within a beacon signal broadcast by the wireless accessory during a second period (block 424). The second period can be the 24, 48, or another number of hours before the first period. The electronic device can then request for the device locator server to send data that corresponds with the second set of public keys (block 425). If, in response to the request, data is returned by the server (block 426, "yes"), method 420 can proceed to block 429, in which the electronic device decrypts the received data. If data is not returned by the server (block 426, "no"), or the server sends a reply that indicates data is not available, method 420 includes for the electronic device can widen the search time by requesting successively older time periods until the max period is reached (block 427).

Figure 5:
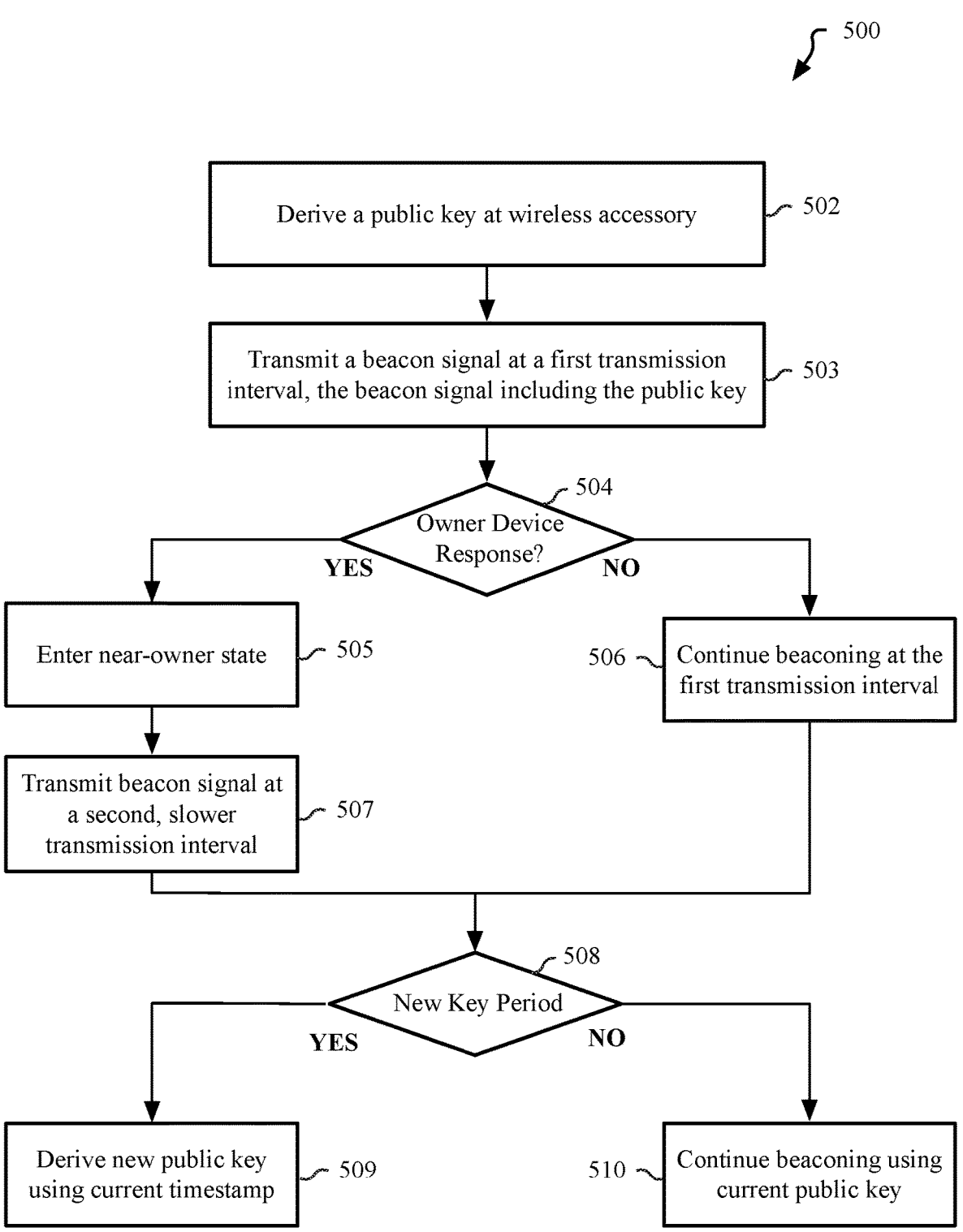
FIG. 5 is a flow diagram illustrating a method of broadcasting a signal beacon at a wireless accessory, according to an embodiment.

FIG. 5 is a flow diagram illustrating a method 500 of broadcasting a signal beacon at a wireless accessory, according to an embodiment. Aspects of method 500 are also illustrated in FIG. 2 and FIG. 3. Method 500 includes for the wireless accessory to derive a public key (block 502). The public key can be derived based on a shared secret and a timestamp determined based on a clock or time keeping device of the wireless accessory. The wireless accessory can then transmit a beacon signal at a first transmission interval, where the beacon signal includes the public key (block 503). The first transmission interval can vary, and in one embodiment is one beacon every two seconds.

After transmitting a beacon signal, the wireless accessory can listen for a response from the owner device. If the wireless signal receives a response from the owner device (block 504, "yes"), the wireless accessory can enter a near owner state (block 505) and begin to transmit the beacon signal at a second, slower transmission interval (block 507). If the wireless accessory does not receive a response from the owner device (block 504, "no"), the wireless accessory can continue beaconing at the first transmission interval (block 506).

Method 500 additionally includes for the wireless device, while beaconing, to rotate the public key every M minutes, where the value of M can vary across embodiments and/or based on the device state. Based on a timer expiration, counter, or another mechanism, the wireless accessory can determine whether the accessory has entered a new key period (block 508). While the wireless accessory has not entered a new key period (block 508, "no"), the accessory can continue beaconing using the current public key (block 510). When the wireless accessory detects that it has entered a new key period (block 508, "yes") the accessory can derive a new public key using the current timestamp (block 509). In one embodiment the new public key can be derived using an existing public key, a timestamp, and an anti-tracking secret.

Figure 6B:
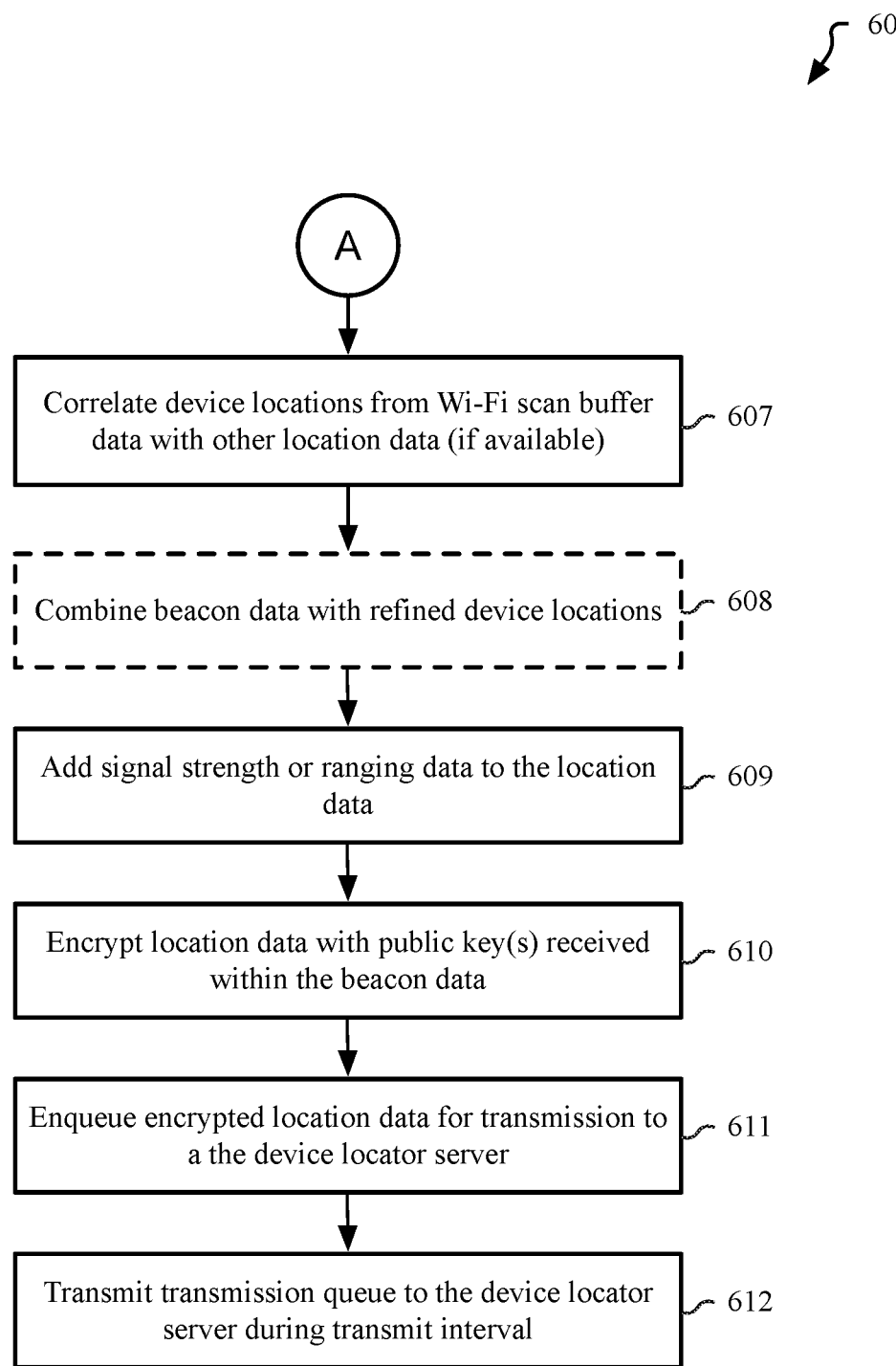

FIG. 6A-6B illustrate operations of a method 600 that can be performed by a finder device, according to embodiments described herein. Aspects of method 600 are also illustrated in FIG. 2 and FIG. 3.

As shown in FIG. 6A, method 600 includes for the finder device to perform a periodic beacon scan using a wireless baseband processor while an application processor of the finder device is in a low power mode (block 601). While the beacon scan can also be performed when the application processor is active, beacon scans can be performed by the wireless processor and a wireless radio receiver as a low power operation while the finder device is idle, inactive, or otherwise in a low power state. The finder device can store a timestamp and a beacon identifier to a beacon scan buffer for any beacon data received by the finder device (block 602). The beacon identifier, in one embodiment, is a public key that is generated by the wireless device based on a timestamp and a shared secret generated with the mobile device of the owner.

Method 600 additionally includes for the finder device to perform periodic Wi-Fi scans using the wireless processor while application processor is in a low power mode (block 603). While the Wi-Fi scans can also be performed when the application processor is active, Wi-Fi scans can be performed by the wireless processor and a wireless radio receiver as a low power operation while the finder device is idle, inactive, or otherwise in a low power state. The finder device can then store Wi-Fi service set identifiers (SSIDs) and scan timestamps to a Wi-Fi scan buffer on the finder device (block 604).

In one embodiment, the Wi-Fi scan buffer is a rolling buffer that stores the most recently detected SSIDs, while overwriting older detected SSIDs. In one embodiment the beacon scan buffer can be a fixed-size buffer having space for a pre-determined number of entries. The finder device can wake the application processor when the beacon scan buffer becomes full (block 605) and correlate those beacon scan with the most recently detected SSIDs in the Wi-Fi scan buffer. That correlation can enable the finder device to determine a set of device locations that correspond with received beacons based on Wi-Fi scan buffer data (block 606).

Method 600 continues in FIG. 6B and includes for the finder device to correlate device locations from the Wi-Fi scan buffer data with other location data if other location data is available (block 607), to generate refined device locations. If refined device locations are generated, the finder device can optionally combine the beacon data with refined device locations (block 608). The finder device can also add signal strength (RSSI) or ranging data to the location data (block 609). The signal strength and ranging data (e.g., UWB ranging data) can be gathered when the beacon signal is received by the finder device. The finder device can then encrypt the location data with one or more public keys received within the beacon data (block 610). The signal and ranging data may be encrypted along with the location data or can be send unencrypted along with the encrypted location data. The finder device can enqueue encrypted location data for transmission to the device locator server (block 611). The device locator server can be one of multiple cloud services servers to which communication is generally performed in a batched and throttled manner. A batch of encrypted data can be gathered and placed in the transmission queue until a transmit interval arrives, during which the finder device can transmit data to the cloud services servers (block 612). The encrypted data can be sent along with hashes of the beacon identifiers that correspond with the encrypted locations and the server will store the encrypted locations indexed by the hash of the beacon identifier.

Figure 7:
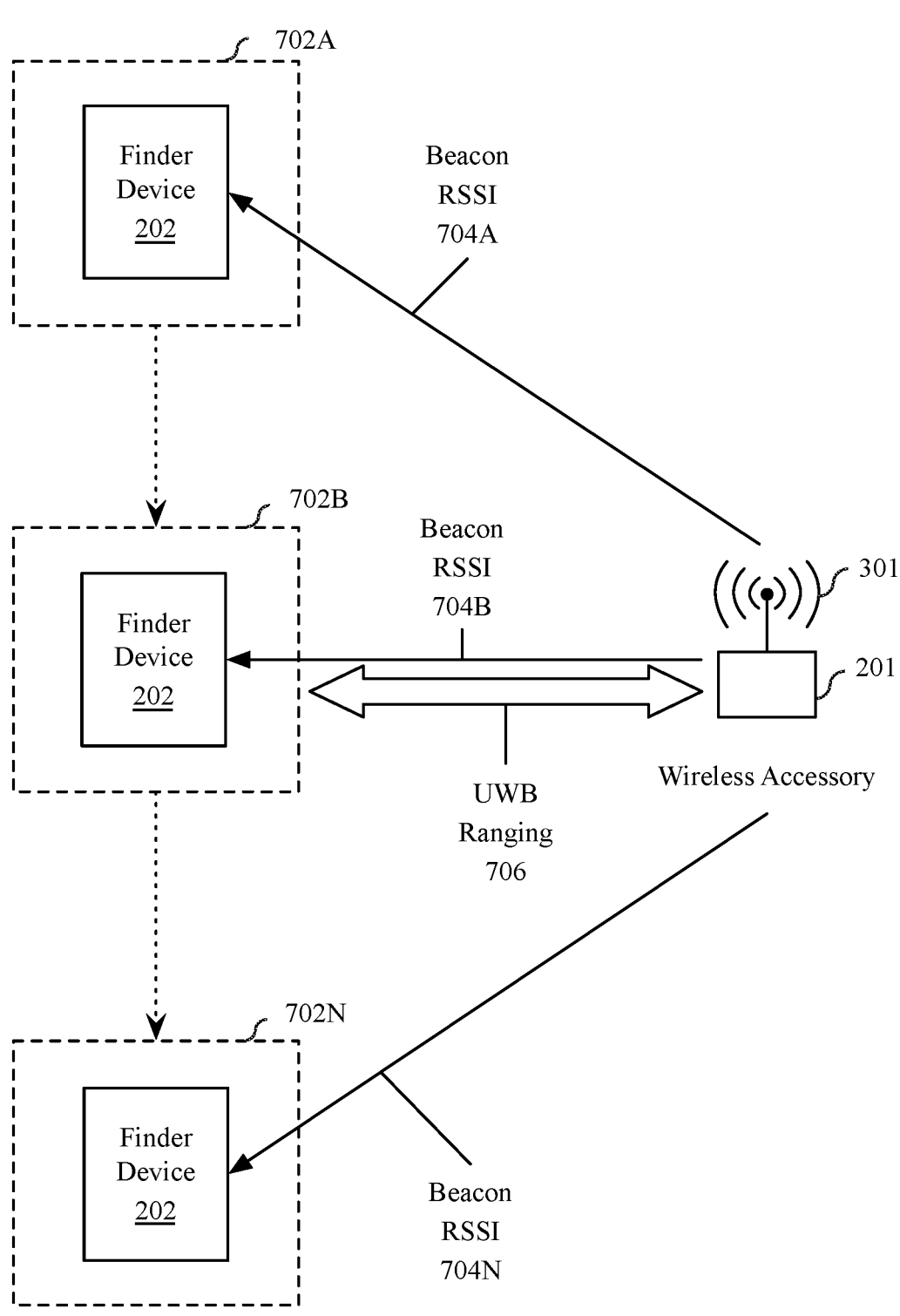
FIG. 7 illustrates the gathering of signal and ranging data by a finder device, according to an embodiment.

FIG. 7 illustrates the gathering of signal and ranging data by a finder device, according to an embodiment. In one embodiment, the finder device 202 can gather signal strength information (e.g., RSSI 704A-704N) for a beacon signal 301 received from the wireless accessory 201 across multiple locations 702A-702N. The finder device 202 can also represent multiple finder devices, such as the set of finder devices 303 in FIG. 3, where each finder device detects the beacon signal at a different location. Each finder device 202 can send different locations and signal strengths and the location and signal strength data received from the multiple finder devices will be aggregated by the device locator server. In one embodiment, where a finder device and the wireless device each include UWB radios, UWB ranging 706 can be performed if the finder device and the wireless device are within range of UWB transmissions. UWB ranging and signal strength data can be transmitted along with location data for the finder devices to the device locator server.

The owner device can retrieve the RSSI or UWB information from the device locator server along with location data, which in one embodiment is provided the form of latitude and longitude information, along with timestamps for which the locations were determined. The owner device can then use the location data, timestamps, and signal information to triangulate a most probable location for the wireless accessory 201.

Figure 8:
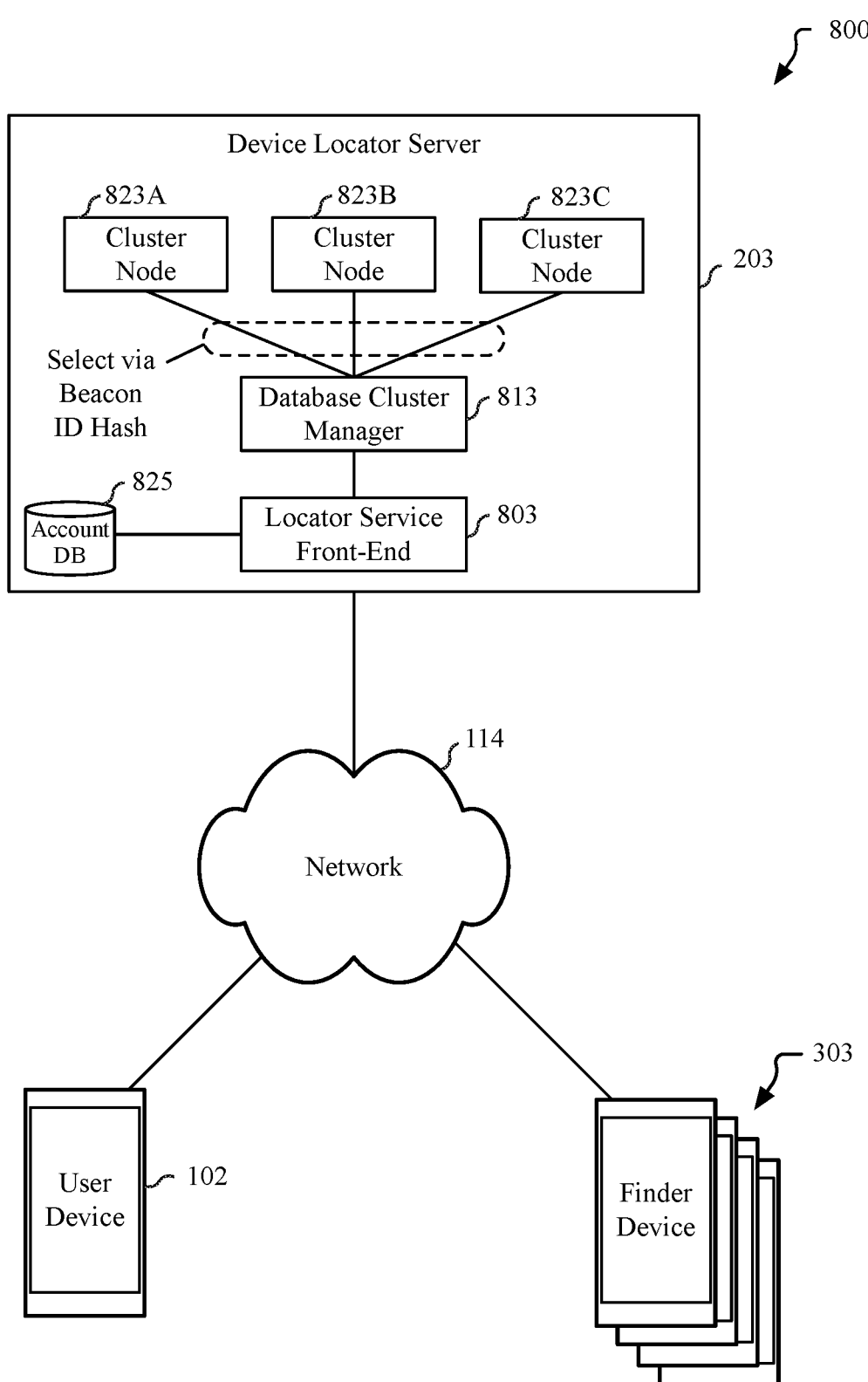
FIG. 8 illustrates a networked system for locating devices and wireless accessories, according to an embodiment.

FIG. 8 illustrates a networked system 800 for locating devices and wireless accessories, according to an embodiment. The system 800 also illustrates an exemplary server architecture for the device locator server 203, according to an embodiment. In one embodiment the device locator server 203 is a cluster of interconnected server devices, which may be physical or virtual servers within a single datacenter or distributed across multiple datacenters and/or geographic locations. As described above, the device locator server 203 can communicate with a mobile device 102 of an accessory owner or user and the set of finder devices 303 over a wide area network 114. The mobile device 102 includes a UI provided by a local or web application that enables the location of a wireless accessory and the finder devices 303 receive beacon signals from wireless accessories and transmits location data associated with the received signals to the device locator server 203.

In one embodiment the device locator server 203 includes a locator service front-end 803, an account database 825, a database cluster manager 813, and a set of database cluster nodes 823A-823C. The locator service front-end 803 is a front-end interface to which the mobile device 102 and the set of finder devices 303 can communicate. The account database 825 stores account profile data for accounts of a cloud service provider to which the mobile device 102 and the finder devices 303 are associated. The database cluster manager 813 can configure the database cluster nodes 823A-823C as a distributed location database that can store location, signal, and ranging data in association with beacon identifiers for signal beacons received by the set of finder devices 303.

In one embodiment, the account database 825 can contain a list of devices that are associated with each cloud services account. In response to a request to locate a given device, including a wireless accessory as described herein, the account database 825 can verify that the request is coming from a device that is authorized to request the location of the given device. In one embodiment, when a user launches a device locator UI and communicates with the locator service front-end 803, the locator service front-end can communicate with the account database 825 and provide a current or last known location for each device that is associated with a requesting user, including devices and/or wireless accessories associated with other users that are in a family of accounts associated with the requesting user.

In one embodiment, the database cluster manager 813 can select a database cluster node 823A-823C to which beacon data is to be stored by hashing the beacon ID associated with a set of location data. Each database cluster node 823A-823C can be associated with a range of hash values. The database cluster manager can then store location data to the cluster node that corresponds with the range of hash values associated with the hash of a given beacon ID. Although three database cluster nodes are illustrated, embodiments are not limited to any specific number of nodes and greater or fewer nodes may be used.

Figure 9A:
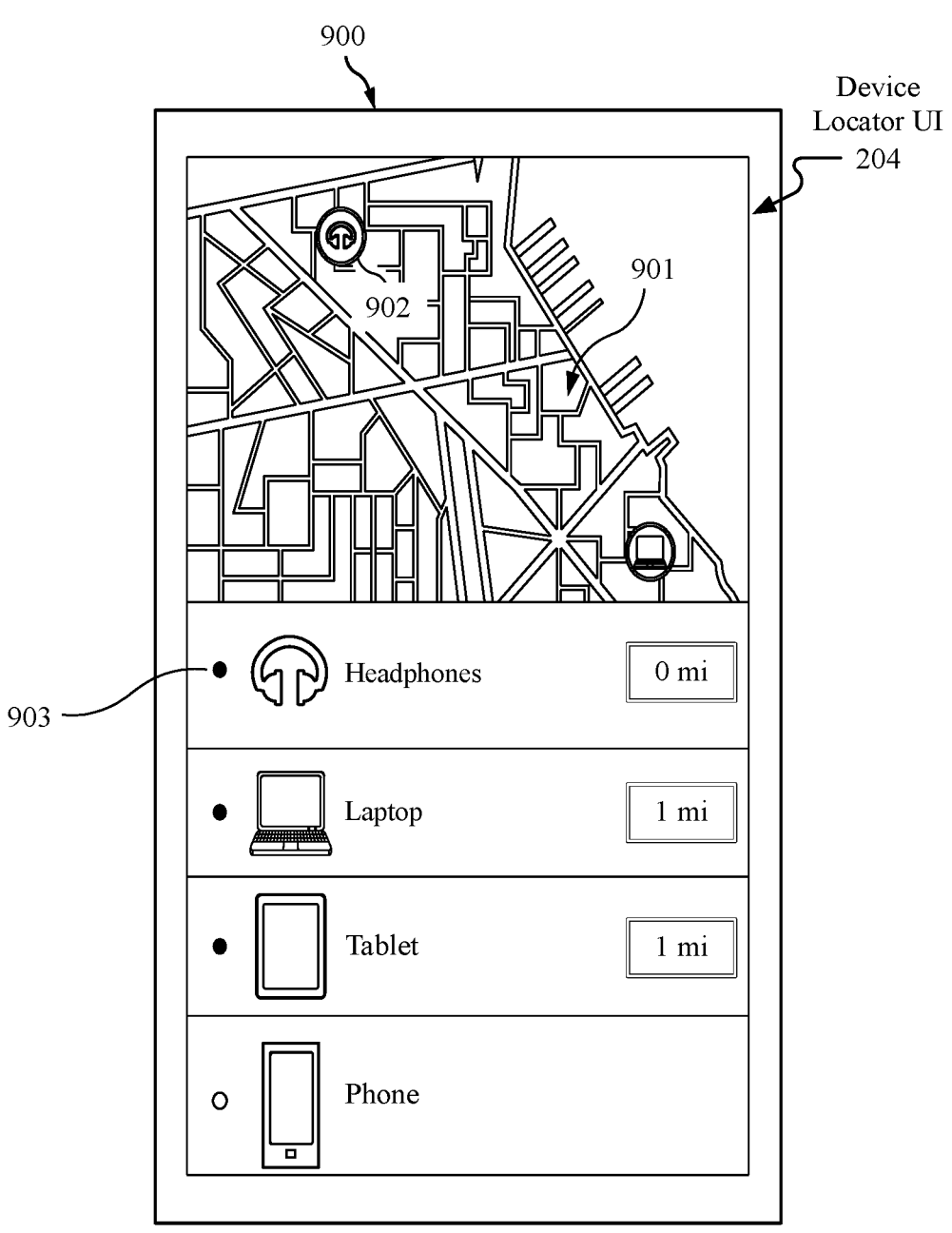
FIG. 9A-9C illustrate a device locator user interface, according to an embodiment.
Figure 9B:
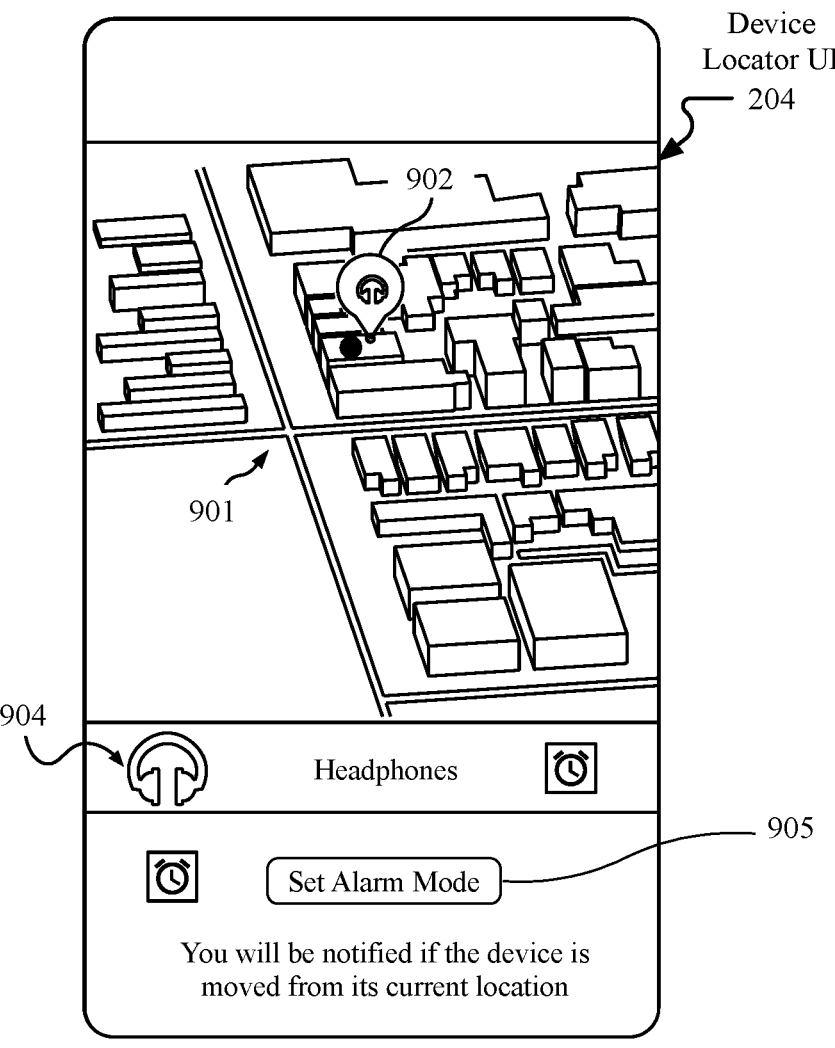
Figure 9C:
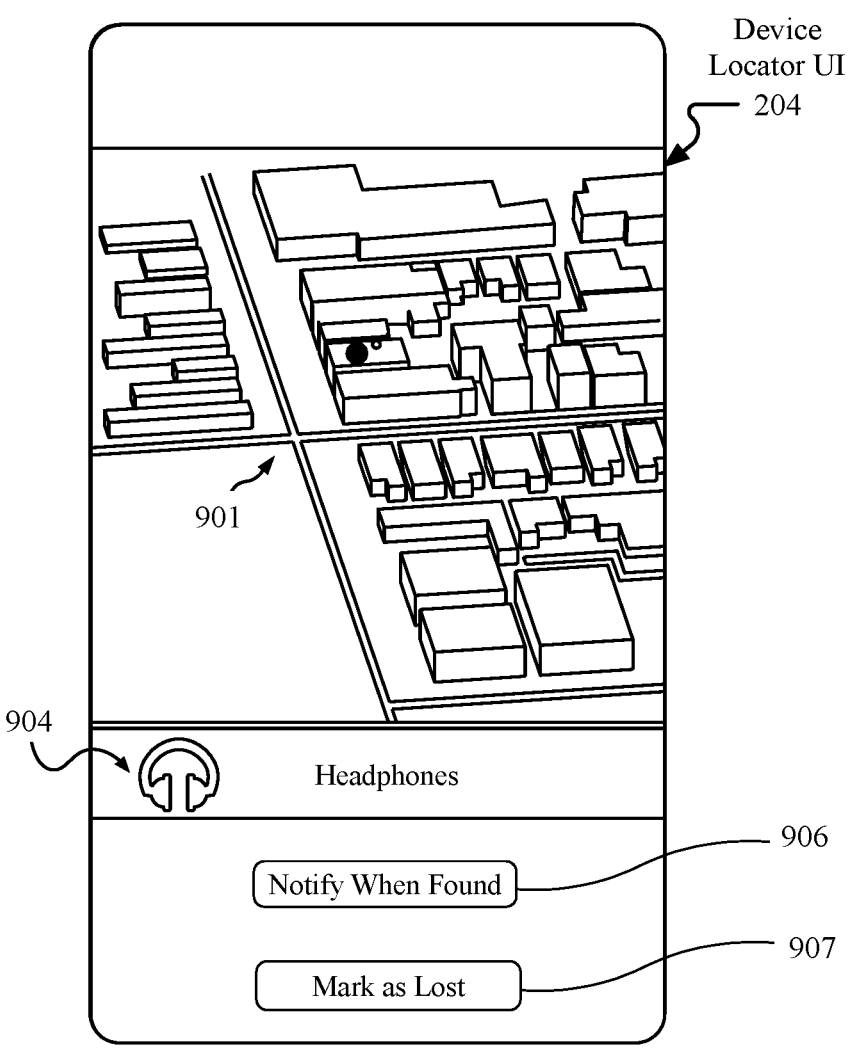

FIG. 9A-9C illustrate a device locator UI 204, according to an embodiment. FIG. 9A shows a first graphical user interface of the device locator UI 204, according to an embodiment, which shows a location for various electronic devices and wireless accessories of a user. FIG. 9B shows a second graphical user interface of the device locator UI 204, according to an embodiment, which enables a wireless accessory to be set to an alarm mode. FIG. 9C shows a third graphical user interface of the device locator UI 204, according to an embodiment, which enables a wireless accessory to be set to a lost mode.

As shown in FIG. 9A, the device locator UI 204 can be displayed on an electronic device 900, which can be a mobile device, or any other type of electronic device described herein. The device locator UI 204 can present a unified graphical interface through which multiple different types of devices and accessories can be located, including wireless devices with network or cellular access and wireless accessories without native network access. The device locator UI 204 can include a map 901 with a marker 902 that shows the current or last known location of a wireless device or accessory. The marker 902 can be an icon, image, graphic or any other user interface element that identifies the accessory and conveys a location for the accessory. A selectable element 903 in the device locator UI can present a description or name of the wireless device or accessory and can show an estimated distance between the wireless device or accessory and the current location of the electronic device 900.

As shown in FIG. 9B, the device locator UI 204 can present a second user interface that enables a wireless accessory to be set to an alarm mode. The second user interface can be displayed, in one embodiment, in response to the selection of the selectable element 903 shown in FIG. 9A. The second user interface can present a user interface element 904 that represents and/or describes the wireless accessory in question, as well as the map 901 and marker 902 that show the current or last known location of the wireless accessory. In one embodiment, the device locator UI 204 can present a selectable element 905, such as a button or another user interface element, that allows a user of the device locator UI 204 to place a selected wireless accessory into an alarm mode. While in the alarm mode, the wireless accessory can be configured to trigger a notification to the user if the wireless accessory is moved from its current location.

In one embodiment the wireless accessory can detect movement via an accelerometer or another type of motion sensor within the wireless accessory. The notification can be initiated by the wireless accessory by setting a flag in the data packet transmitted by the beacon signal of the wireless accessory that indicates the wireless accessory alarm has been triggered. In various embodiments, other trigger or notification modes can be used. In one embodiment, the alarm can optionally be triggered by the mobile device upon detection that the wireless accessory has moved out of range of the mobile device and is no longer in the near owner state. In one embodiment, the alarm can optionally be triggered when the wireless accessory is out of range of, or otherwise cannot be located by, any of the devices associated with the account or family of user accounts to which the wireless accessory is associated.

As shown in FIG. 9C, the device locator UI 204 can present a third graphical user interface that enables a wireless accessory to be set to a lost mode. In one embodiment, when a wireless accessory cannot be located via the device locator UI 204, the map 901 will not display a marker that indicates a location for the accessory. The device locator UI 204 can present the user interface element 904 that represents and/or describes the wireless accessory in question and a set of selectable user interface elements. One selectable user interface element 906 can present the option to notify the user when the accessory is found. When notify when found is enabled, in one embodiment the wireless accessory can be placed into a light lost mode. The electronic device associated with the device locator UI 204 can generate a set of public keys that the wireless accessory will broadcast with the beacon signal during a future time period (e.g., next 24 hours, next 48 hours, etc.). If a signal is detected by a finder device using one of the future keys, the device locator server can notify one or more electronic devices associated with the user.

Another selectable user interface element 907 can place the wireless accessory into an explicit lost mode. When explicitly placed into lost mode, the wireless accessory will be unable to be paired with other devices until the accessory is unlocked by the user or owner that places the device into lost mode. When sending a request to place a wireless accessory into lost mode, the requesting user can be required to enter authenticating information to ensure that the requesting user is authorized to request that lost mode be initiated on the lost accessory. The authenticating information can include a username or password associated with an account of a user, such as a cloud services account to which the user, electronic device, and wireless accessory are associated. The authenticating information can also include biometric information, such as a fingerprint or facial recognition data, voice recognition, iris recognition, and other biometric identification information.

In one embodiment, a message and contact information provided by the requesting user can be displayed on the user device to alert a person who finds the lost wireless accessory on how to contact the requesting user. In one embodiment, the message and contact information can be displayed when another user attempts to pair another electronic device with the lost accessory.

FIG. 10 illustrates an accessory pairing UI 302 that is displayed when attempting to pair with a lost wireless accessory, according to an embodiment. In one embodiment, when an electronic device 1000 that is different from the electronic device 900 of FIG. 9 and is not associated with the registered user or owner of a wireless accessory attempts to pair with a lost wireless accessory, the accessory pairing UI of the electronic device can be displayed as shown in FIG. 10. In one embodiment, the accessory pairing UI 302 can display a name or description 1001 associated with the wireless accessory, as well as a message 1002 entered by the user of the accessory upon placing the accessory into lost mode. Contact information 1004 can also be displayed, along with a user interface element 1006, such as a button, that enables the electronic device 1000 to contact the requesting user by using the provided contact information 1004.

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call.

Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embodiment, call APIs from different providers such as a set of APIs from an OS provider and another set of APIs from a plug-in provider and another set of APIs from another provider (e.g., the provider of a software library) or creator of another set of APIs.

FIG. 11 is a block diagram illustrating an exemplary API architecture, which may be used in some embodiments of the invention. As shown in FIG. 11, the API architecture 1100 includes the API-implementing component 1110 (e.g., an operating system, a library, a device driver, an API, an application program, software or other module) that implements the API 1120. The API 1120 specifies one or more functions, methods, classes, objects, protocols, data structures, formats and/or other features of the API-implementing component that may be used by the API-calling component 1130. The API 1120 can specify at least one calling convention that specifies how a function in the API-implementing component receives parameters from the API-calling component and how the function returns a result to the API-calling component. The API-calling component 1130 (e.g., an operating system, a library, a device driver, an API, an application program, software or other module), makes API calls through the API 1120 to access and use the features of the API-implementing component 1110 that are specified by the API 1120. The API-implementing component 1110 may return a value through the API 1120 to the API-calling component 1130 in response to an API call.

It will be appreciated that the API-implementing component 1110 may include additional functions, methods, classes, data structures, and/or other features that are not specified through the API 1120 and are not available to the API-calling component 1130. It should be understood that the API-calling component 1130 may be on the same system as the API-implementing component 1110 or may be located remotely and accesses the API-implementing component 1110 using the API 1120 over a network. While FIG. 11 illustrates a single instance of the API-calling component 1130 interacting with the API 1120, it should be understood that other API-calling components, which may be written in different languages (or the same language) than the API-calling component 1130, may use the API 1120.

The API-implementing component 1110, the API 1120, and the API-calling component 1130 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 12:
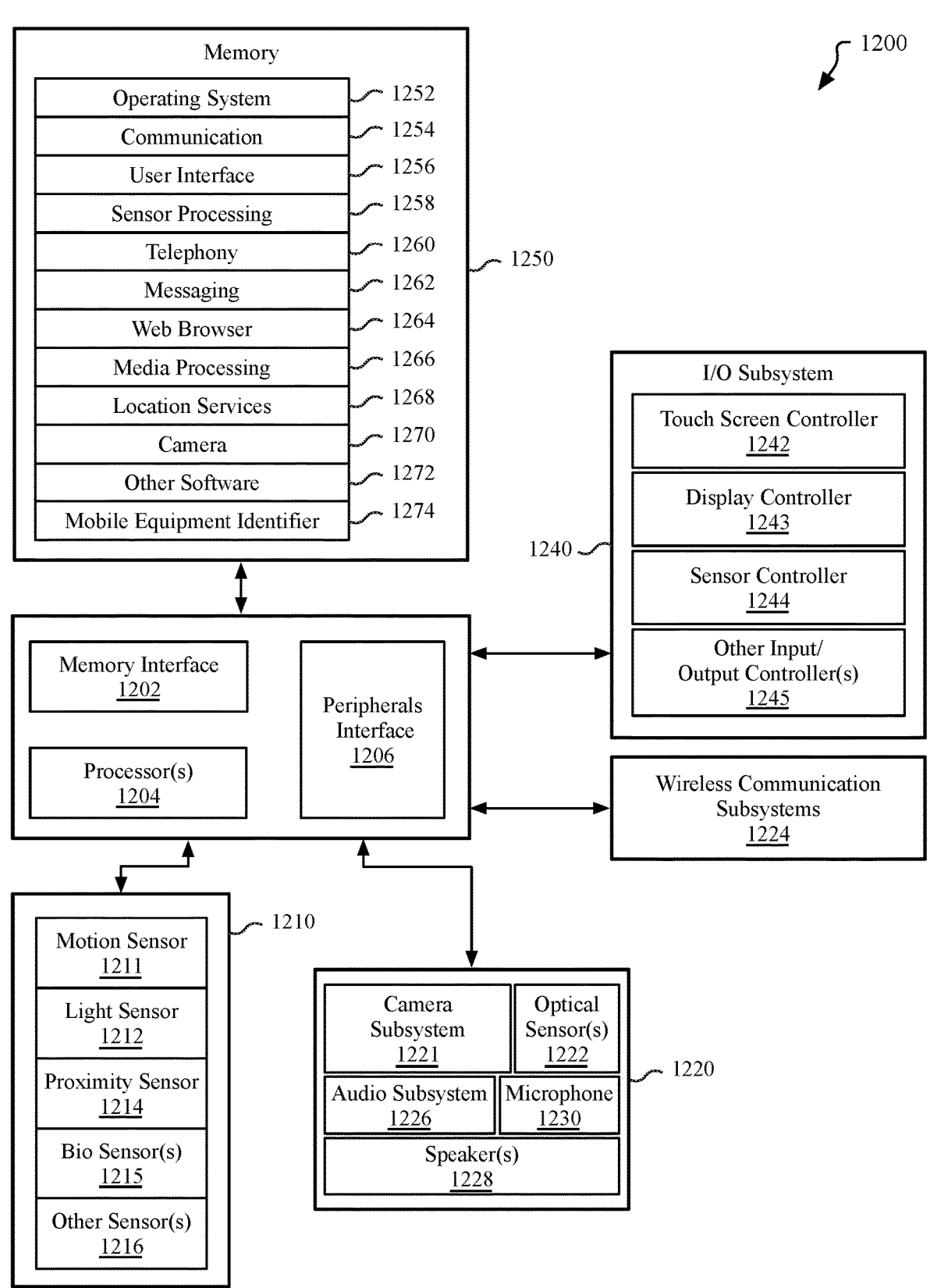
FIG. 12 is a block diagram of a device architecture for a mobile or embedded device, according to an embodiment.

FIG. 12 is a block diagram of a device architecture 1200 for a mobile or embedded device, according to an embodiment. The device architecture 1200 includes a memory interface 1202, one or more processors 1204 (e.g., data processors, image processors and/or graphics processors), and a peripherals interface 1206. The various components can be coupled by one or more communication buses or signal lines. The various components can be separate logical components or devices or can be integrated in one or more integrated circuits, such as in a system on a chip integrated circuit.

The memory interface 1202 can be coupled to memory 1250, which can include high-speed random-access memory such as static random-access memory (SRAM) or dynamic random-access memory (DRAM) and/or non-volatile memory, such as but not limited to flash memory (e.g., NAND flash, NOR flash, etc.).

Sensors, devices, and subsystems can be coupled to the peripherals interface 1206 to facilitate multiple functionalities. For example, a set of sensors 1210 including a motion sensor 1211, a light sensor 1212, and a proximity sensor 1214 can be coupled to the peripherals interface 1206 to facilitate the mobile device functionality. One or more biometric sensor(s) 1215 may also be present, such as a fingerprint scanner for fingerprint recognition or an image sensor for facial recognition. Other sensors 1216 can also be connected to the peripherals interface 1206, such as a positioning system (e.g., GPS receiver), a temperature sensor, or other sensing device, to facilitate related functionalities.

The device architecture 1200 additionally includes an audio/video system 1220. A camera subsystem 1221 and an optical sensor 1222, e.g., a charged coupled device (CCD) or a complementary metal-oxide semiconductor (CMOS) optical sensor, can be utilized to facilitate camera functions, such as recording photographs and video clips. An audio subsystem 1226 can be coupled to a speaker 1228 and a microphone 1230 to facilitate voice-enabled functions, such as voice recognition, voice replication, digital recording, and telephony functions. In smart media devices described herein, the audio subsystem 1226 can be a high-quality audio system including support for virtual surround sound.

Communication functions can be facilitated through one or more wireless communication subsystems 1224, which can include radio frequency receivers and transmitters and/or optical (e.g., infrared) receivers and transmitters. The specific design and implementation of the wireless communication subsystems 1224 can depend on the communication network(s) over which a mobile device is intended to operate. For example, a mobile device including the illustrated device architecture 1200 can include wireless communication subsystems 1224 designed to operate over a GSM network, a CDMA network, an LTE network, a Wi-Fi network, a Bluetooth network, or any other wireless network. In particular, the wireless communication subsystems 1224 can provide a communications mechanism over which a media playback application can retrieve resources from a remote media server or scheduled events from a remote calendar or event server.

The I/O subsystem 1240 can include a touchscreen controller 1242 and/or other input controller(s) 1245. For computing devices including a display device, the touchscreen controller 1242 can be coupled to a touch sensitive display system 1246 (e.g., touchscreen). The touch sensitive display system 1246 and touchscreen controller 1242 can, for example, detect contact and movement and/or pressure using any of a plurality of touch and pressure sensing technologies, including but not limited to capacitive, resistive, infrared, and surface acoustic wave technologies, as well as other proximity sensor arrays or other elements for determining one or more points of contact with a touch sensitive display system 1246. Display output for the touch sensitive display system 1246 can be generated by a display controller 1243. In one embodiment, the display controller 1243 can provide frame data to the touch sensitive display system 1246 at a variable frame rate.

In one embodiment, a sensor controller 1244 is included to monitor, control, and/or processes data received from one or more of the motion sensor 1211, light sensor 1212, proximity sensor 1214, or other sensors 1216. The sensor controller 1244 can include logic to interpret sensor data to determine the occurrence of one of more motion events or activities by analysis of the sensor data from the sensors.

In one embodiment, the I/O subsystem 1240 includes other input controller(s) 1245 that can be coupled to other input/control devices 1248, such as one or more buttons, rocker switches, thumb-wheel, infrared port, USB port, and/or a pointer device such as a stylus, or control devices such as an up/down button for volume control of the speaker 1228 and/or the microphone 1230.

In one embodiment, the memory 1250 coupled to the memory interface 1202 can store instructions for an operating system 1252, including portable operating system interface (POSIX) compliant and non-compliant operating system or an embedded operating system. The operating system 1252 may include instructions for handling basic system services and for performing hardware dependent tasks. In some implementations, the operating system 1252 can be a kernel.

The memory 1250 can also store communication instructions 1254 to facilitate communicating with one or more additional devices, one or more computers and/or one or more servers, for example, to retrieve web resources from remote web servers. The memory 1250 can also include user interface instructions 1256, including graphical user interface instructions to facilitate graphic user interface processing.

Additionally, the memory 1250 can store sensor processing instructions 1258 to facilitate sensor-related processing and functions; telephony instructions 1260 to facilitate telephone-related processes and functions; messaging instructions 1262 to facilitate electronic-messaging related processes and functions; web browser instructions 1264 to facilitate web browsing-related processes and functions; media processing instructions 1266 to facilitate media processing-related processes and functions; location services instructions including GPS and/or navigation instructions 1268 and Wi-Fi based location instructions to facilitate location based functionality; camera instructions 1270 to facilitate camera-related processes and functions; and/or other software instructions 1272 to facilitate other processes and functions, e.g., security processes and functions, and processes and functions related to the systems. The memory 1250 may also store other software instructions such as web video instructions to facilitate web video-related processes and functions; and/or web shopping instructions to facilitate web shopping-related processes and functions. In some implementations, the media processing instructions 1266 are divided into audio processing instructions and video processing instructions to facilitate audio processing-related processes and functions and video processing-related processes and functions, respectively. A mobile equipment identifier, such as an International Mobile Equipment Identity (IMEI) 1274 or a similar hardware identifier can also be stored in memory 1250.

Each of the above identified instructions and applications can correspond to a set of instructions for performing one or more functions described above. These instructions need not be implemented as separate software programs, procedures, or modules. The memory 1250 can include additional instructions or fewer instructions. Furthermore, various functions may be implemented in hardware and/or in software, including in one or more signal processing and/or application specific integrated circuits.

Figure 13:
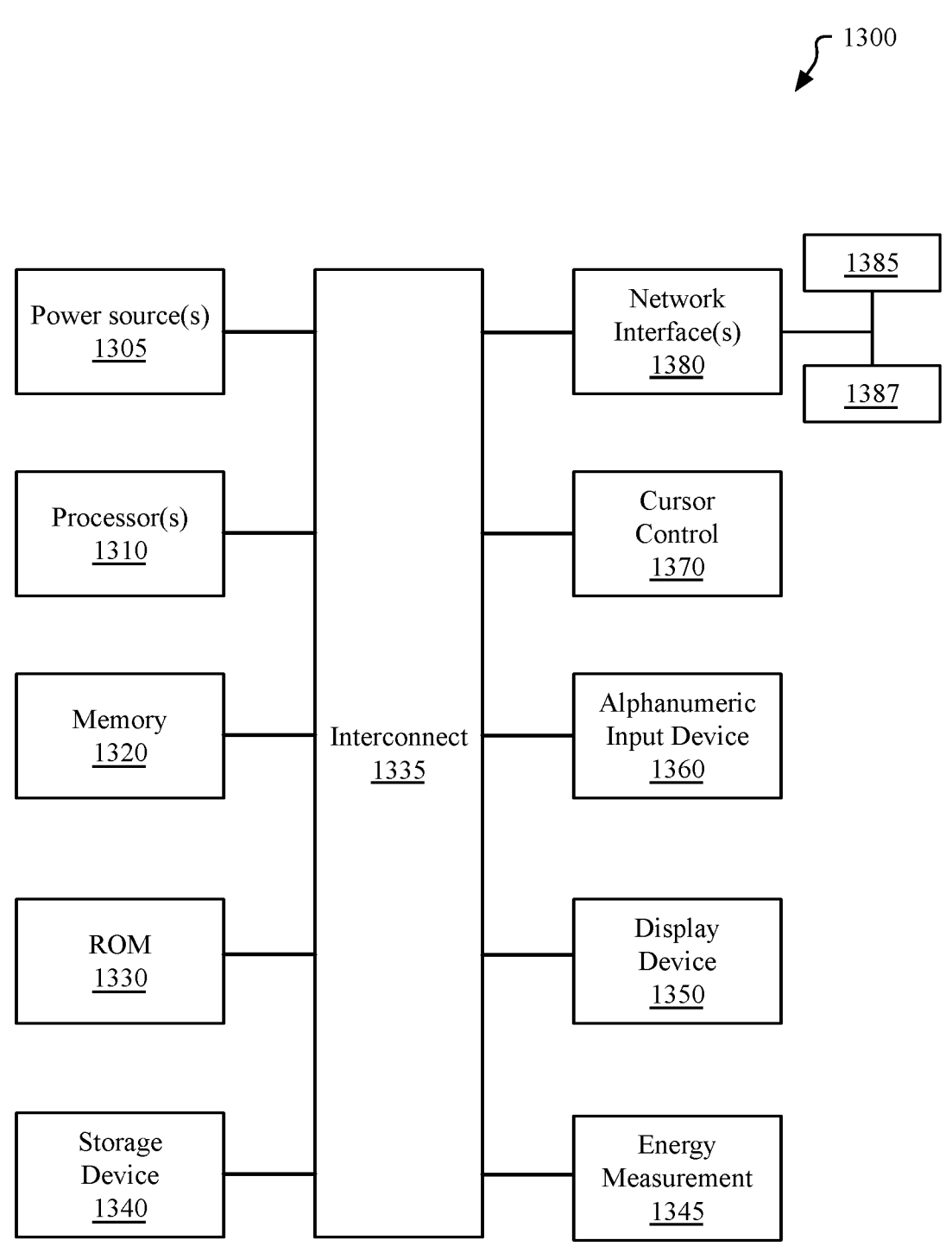
FIG. 13 is a block diagram of a computing system, according to an embodiment.

FIG. 13 is a block diagram of a computing system 1300, according to an embodiment. The illustrated computing system 1300 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 1300 can be used to provide the computing device and/or a server device to which the computing device may connect.

The computing system 1300 includes an interconnect 1335 (e.g., bus, fabric) to enable communication between components of the computing system 1300. One or more processor(s) 1310 can coupled with the interconnect 1335. The computing system 1300 further may include memory 1320 in the form of random-access memory (RAM) or other dynamic storage device coupled to the interconnect 1335. The memory 1320 may store information and instructions that may be executed by processor(s) 1310. The memory 1320 may also be main memory that is used to store temporary variables or other intermediate information during execution of instructions by the processor(s) 1310.

The computing system 1300 may also include read only memory (ROM) 1330 and/or another data storage device 1340 coupled to the interconnect 1335 that may store information and instructions for the processor(s) 1310. The data storage device 1340 can be or include a variety of storage devices, such as a flash memory device, a magnetic disk, or an optical disc and may be coupled to computing system 1300 via the interconnect 1335 or via a remote peripheral interface.

The computing system 1300 may also be coupled, via the interconnect 1335, to a display device 1350 to display information to a user. The computing system 1300 can also include an alphanumeric input device 1360, including alphanumeric and other keys, which may be coupled to interconnect 1335 to communicate information and command selections to processor(s) 1310. Another type of user input device includes a cursor control 1370 device, such as a touchpad, a mouse, a trackball, or cursor direction keys to communicate direction information and command selections to processor(s) 1310 and to control cursor movement on the display device 1350. The computing system 1300 may also receive user input from a remote device that is communicatively coupled via one or more network interface(s) 1380.

The computing system 1300 further may include one or more network interface(s) 1380 to provide access to a network, such as a local area network. The network interface(s) 1380 may include, for example, a wireless network interface having antenna 1385, which may represent one or more antenna(e). The computing system 1300 can include multiple wireless network interfaces such as a combination of Wi-Fi, Bluetooth®, near field communication (NFC), and/or cellular telephony interfaces. The network interface(s) 1380 may also include, for example, a wired network interface to communicate with remote devices via network cable 1387, which may be, for example, an Ethernet cable, a coaxial cable, a fiber optic cable, a serial cable, or a parallel cable.

In one embodiment, the network interface(s) 1380 may provide access to a local area network, for example, by conforming to IEEE 802.11 wireless standards and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1380 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 1300 can further include one or more power sources 1305 and one or more energy measurement systems 1345. Power sources 1305 can include an AC/DC adapter coupled to an external power source, one or more batteries, one or more charge storage devices, a USB charger, or other power source. Energy measurement systems include at least one voltage or amperage measuring device that can measure energy consumed by the computing system 1300 during a predetermined period of time. Additionally, one or more energy measurement systems can be included that measure, e.g., energy consumed by a display device, cooling subsystem, Wi-Fi subsystem, or other frequently used or high-energy consumption subsystem.

Location Data Harvesting and Pruning

Figure 14:
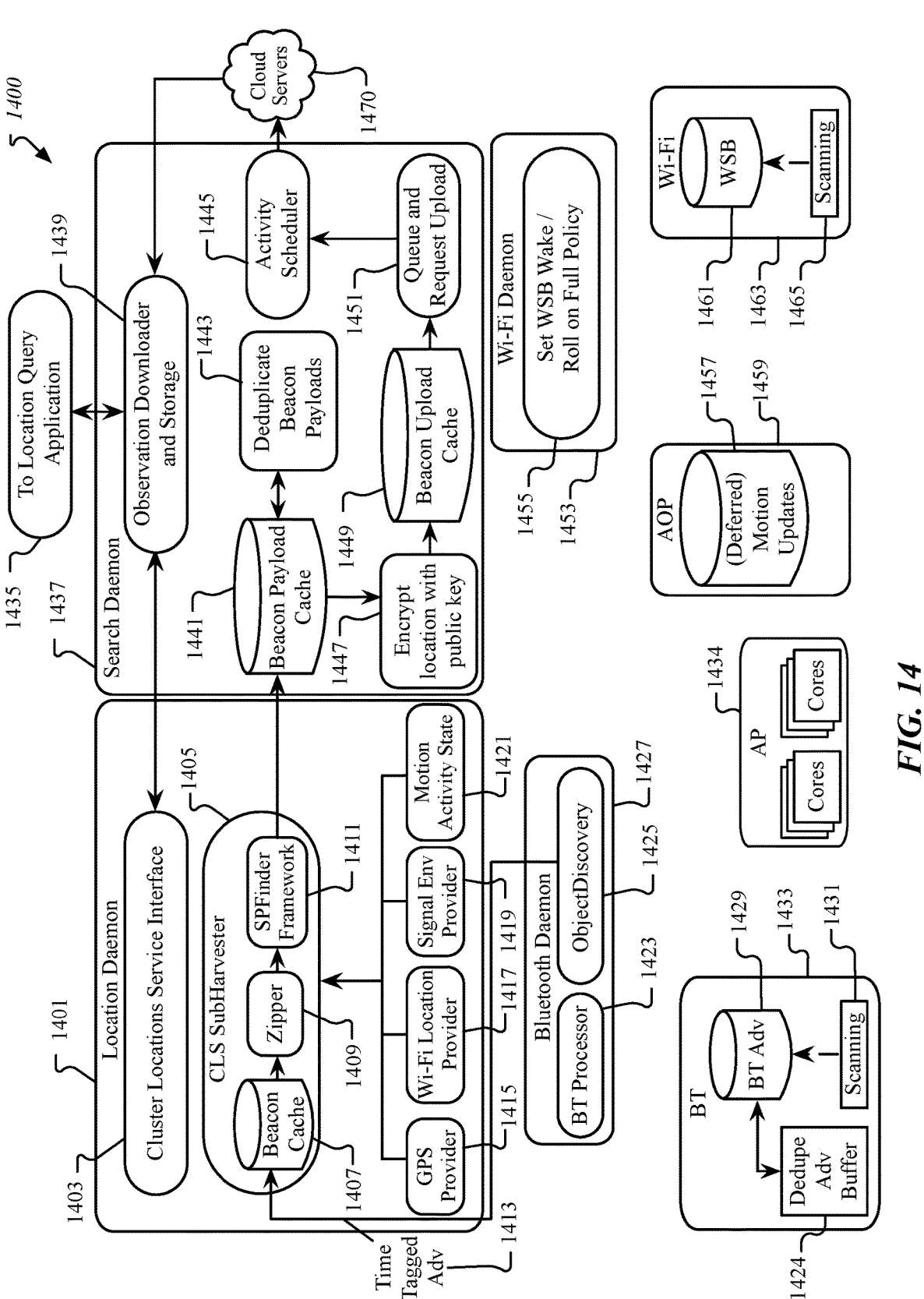
FIG. 14 illustrates a system for detecting and processing beacon data from wireless accessories.

FIG. 14 illustrates a system 1400 in which a finder device can harvest and prune location information for detected wireless beacon signals, according to an embodiment. The system 1400 includes hardware components such as a Bluetooth controller 1433, an always on processor (AOP) 1459, a Wi-Fi controller 1463, as well as an application processor 1434. The application processor 1434, which can be a multi-core application processor, can execute the illustrated operating system daemons that facilitate location determination for detected wireless beacon signals. In one embodiment, operating system components include a Bluetooth daemon 1427, Wi-Fi daemon 1453, a location daemon 1401, and a search daemon 1437. While Bluetooth beacon signals are described, the techniques are not limited to Bluetooth advertisements and other types of wireless advertisements from wireless accessories can be used to for crowdsourced location determination of wireless accessories and devices.

The Bluetooth controller 1433 can perform include a low power scanner 1431 that performs operations while the controller is active. The low power scanner 1431 can be used to detect the presence of nearby Bluetooth (e.g., Bluetooth Low Energy) devices that are broadcasting advertisements using a wireless radio signal. Specific configuration details for the Bluetooth controller 1433 can be determined by the Bluetooth daemon 1427, which includes Bluetooth processor logic 1423 and object discovery logic 1425. The Bluetooth processor logic 1423 can control operations of the Bluetooth controller 1433. The object discovery logic 1425 can forward time-tagged advertisements 1413 detected by the Bluetooth controller 1433 to the location daemon 1401 for further processing. In one embodiment, not all detected advertisements are forwarded for processing. Instead only advertisements that include a bit or flag that indicates that a location for the broadcasting device should be determined and uploaded to the cloud servers 1470, with other advertisements being disregarded for the purposes of the illustrated system 1400. In one embodiment, the Bluetooth controller 1433 is configured to filter scanned advertisements based on the type of advertisement and may store only the advertisements that include the bit or flag that indicates that a location for the broadcasting device should be determined and uploaded to the cloud servers 1470.

In one embodiment, the Bluetooth controller 1433 can perform scanning and processing operations while the application processor 1434 is in a low power state. Instead of continuously interrupting the application processor when advertisements are detected, the Bluetooth controller 1433 can buffer detected advertisements in a Bluetooth advertisement buffer 1429. The Bluetooth controller 1422 can include logic 1424 to deduplicate the Bluetooth advertisement buffer 1429 so that the buffer does not fill with the same advertisement. During a wake event for the application processor 1434, the Bluetooth advertisement buffer 1429 can be opportunistically unloaded. The Wi-Fi controller 1463 can perform scanning operations (1465) and store information related to detected Wi-Fi signals in the Wi-Fi scan buffer 1461. The application processor 1434, via the location daemon 1401, can attempt to match the detected advertisements to Wi-Fi signal data stored in a Wi-Fi scan buffer 1461 within the Wi-Fi controller 1463.

In one embodiment the Wi-Fi scan buffer 1461 is a rolling buffer that stores the most recently detected SSIDs, while overwriting older detected SSIDs. In one embodiment the Wi-Fi scan buffer can be a fixed-size buffer having space for a pre-determined number of entries. The Wi-Fi Daemon may configure the Wi-Fi controller 1463 to wake the application processor 1434 when the scan buffer becomes full or to simply overwrite older detected SSIDs based on the WSB wake/roll on full policy 1455 configured for the Wi-Fi daemon 1453.

The location daemon 1401 includes a cluster locations service interface 1403 and a cluster locations service sub-harvester 1405. The clusters location service interface 1403 is a service provider interface that enables the search daemon 1437 to query for location information, including information on wireless accessories that are tracked by the location query application 1435. The cluster locations service sub-harvester 1405 harvests time-tagged advertisements 1413 and correlates them with location information. The cluster locations service sub-harvester 1405 receives the time-tagged advertisements 1413 and stores the advertisements to a beacon cache 1407. Zipper logic 1409 uses data associated with a GPS provider 1415, Wi-Fi location provider 1417, signal environment provider 1419, and motion activity state 1421 to correlate time-tagged location data with the time-tagged advertisements 1413. This correlated data is provided to a service provider finder framework 1411, which delivers the correlated beacon data to a beacon payload cache 1441 within the search daemon 1437.

In one embodiment, the GPS provider 1415 provides location data that is determined via signals received from a GPS device in communication with a set of satellite associated with a global positioning or global navigation system (e.g., global positioning system, global navigation satellite system, BeiDou-2, Galileo global navigation satellite system, etc.). In general, where GPS in particular, and satellite-based positioning services in general, are described herein, it will be understood that the described satellite positioning techniques can be performed using any global navigation satellite system (GNSS). Location can also be determined via a Wi-Fi location provider that estimates a device location based on detected Wi-Fi SSID and/or media access control (MAC) addresses. Location estimates can be further refined based on the RSSI associated with the detected signals. The signal environment provider 1419 can provide classification data on, for example, whether GPS or Wi-Fi location is most optimal for a given geographic region. The signal environment provider 1419 can use an on-device classifier that estimates the likely accuracy of Wi-Fi location based on the number of detected Wi-Fi signals.

The motion activity state 1421 provides information on whether the finder device is stationary or in motion. The motion activity state 1421 can be determined based in part on motion updates 1457 provided by the AOP 1459. The AOP 1459 remains powered while other processors within the finder device are in a low power state. The AOP 1459 can collect data from motion sensors and defer the motion updates 1457 until the application processor 1434 or other processor wakes for the low power state. Operations performed by the cluster locations service sub-harvester 1405 are described further in FIG. 15.

The search daemon 1437 communicates with a location query application 1435 that can be used to present a device locator UI 204. The search daemon 1437 also communicates with a set of cloud servers 1470 via a network (e.g., device locator server 203 via network 114). The search daemon 1437 can process observations provided by the location daemon 1401 and provide those observations to the set of cloud servers 1470. The search daemon 1437 can also include an observation downloader and storage unit 1439 that downloads and stores location data for accessories and devices that are tracked by the location query application 1435. Location data can be downloaded from the cloud servers 1470 and queried from the location daemon 1401 via the cluster location service interface 1403.

The search daemon 1437 receives beacon data from the service provider finder framework 1411 and stores the beacon data in the beacon payload cache 1441. The search daemon 1437 includes deduplication logic 1443 to deduplicate the beacon payloads. The location data within the deduplicated beacon payloads is encrypted (1447) using the public key (e.g., beacon ID) that is broadcast with the beacon. The beacon data and associated encrypted locations can be stored in a beacon upload cache 1449 before being uploaded to the cloud servers 1470. When beacons data is ready to be uploaded, the search daemon 1437 can activate queue and request upload logic 1451. The queue and request upload logic 1451 can communicate with an activity scheduler 1445 to upload the data to the cloud servers 1470 during the next server upload interval. The number of beacons that are uploaded to the cloud servers 1470 can be limited. Additionally the data may be sent opportunistically when other unrelated data is to be transmitted over the network.

The uploaded beacon data includes the location associated with the beacon, which is encrypted using the public key transmitted as the beacon identifier, a timestamp associated with when the beacon was detected, and a hash of the public key used to encrypt the location data. The cloud servers 1470 can index the encrypted location data and timestamp using the hash of the public key. Using the hash of the public key prevents the cloud servers 1470 from gaining direct knowledge of the owner of the accessory associated with the stored data, while allowing the owner of the accessory to query for the device location using the hash of the public key, which is known to the owner of the accessory.

Figure 15:
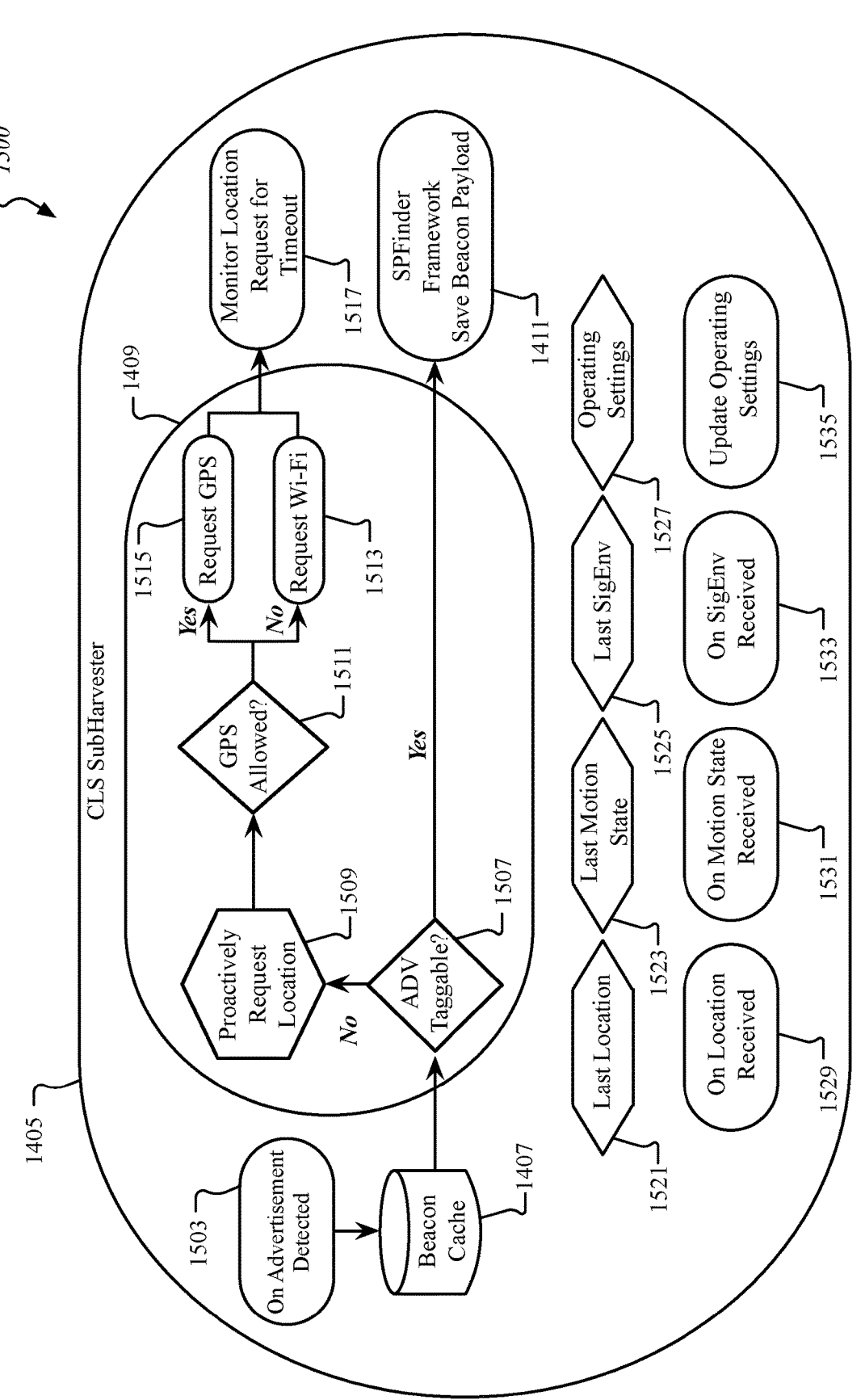
FIG. 15 illustrates a system to correlate detected beacon advertisements with a location, according to an embodiment.

FIG. 15 illustrates a system 1500 to correlate detected beacon advertisements with a location, according to an embodiment. The system 1500 includes the cluster locations services sub-harvester 1405 described above, which includes the beacon cache 1407, zipper logic 1409, and service provider finder framework 1411 described above. The cluster locations services sub-harvester 1405 also includes context data including a last location 1521, a last motion state 1523, a last signal environment state 1525, and at least a subset of the current operating settings 1527 of the device. The context data is updated upon receipt or detection of various events. Last location 1521 is updated based upon an on location received event 1529. Last motion state 1523 is updated based upon an on motion state received event 1531. Last signal environment 1525 is updated based upon an on signal environment received event 1533. The operating settings 1527 are updated in response to an update operating settings event 1535.

In one embodiment the zipper logic 1409, when a new advertisement is received at the beacon cache 1407, can determine (1507) if the advertisement is taggable with a location. The zipper logic 1409 can examine the last location 1521 and a timestamp associated with the last location. If the time of the last location determination was over a threshold number of seconds after the time in which the beacon advertisement was detected, a location may not be able to be reliably determined for the beacon advertisement. In that case, the beacon advertisement may be discarded. If the time of last location determination is over a threshold number of seconds before the beacon advertisement was detected, the location may be stale and the zipper logic 1409 can proactively request a location (1509). If the last location 1521 is within a threshold number of seconds of when the timestamp associated with the beacon advertisement, the advertisement is determined to be taggable with a location. A location is attached with the beacon advertisement and saved as the beacon payload by the service provider finder framework 1411.

If the zipper logic 1409 is to proactively request a location (1509), the logic can determine whether GPS is allowed (1511). Use of GPS may be allowed or disallowed for various reasons, such as if the last signal environment 1525 indicates that GPS may be inaccurate or that Wi-Fi may be more accurate. Use of GPS may also be determined based on operating settings 1527. If GPS is allowed, the zipper logic 1409 can request a location via GPS (1515) using the GPS provider 1415 shown in FIG. 14. If GPS is not allowed, the zipper logic 1409 can request a location using the Wi-Fi location service (1513) using the Wi-Fi location provider 1417 shown in FIG. 14. A request for a Wi-Fi location determination, in some embodiments, can also make use of location techniques based on RF signals received from other wireless base stations, such as cellular or mobile network towers. After the request, cluster locations services sub-harvester 1405 can perform an operation (1517) to monitor the location request for a timeout. If a location is received, an on location received event 1529 will fire and the last location 1521 will be updated. If the location is received within the threshold number of seconds of the indicated advertisement time, the location can be associated with the advertisements.

The specific threshold used to determine if a location can be attached to an advertisement can change based on the last motion state 1523 of the finder device, or historical motion state data stored by the device. If the finder device is moving, the threshold is reduced, such that the time between advertisement detection and location determination will be relatively small (e.g., 45 seconds) before the location is associated with the advertisement. However, if the device is not moving the threshold can be increased (e.g., 600 seconds), as the location data for the finder device over the period of time is more likely to be accurate and is not changing.

When a location is determined for a beacon advertisements, a confidence score can also be assigned to the location. The confidence score allows the search daemon 1437 to deduplicate and refine beacon payloads. The confidence score also allows the cloud servers 1470 to refine the location estimates received for an accessory or device across multiple finders that may be sending location data for the accessory or device.

The confidence score can be determined based on the uncertainty value associated with a location. The degree of uncertainty can be determined based on an assessment of the accuracy of a location determined for an advertisement. In particular, the locations determined for the finder device are the location of the device. Additional calculations are performed to attempt to determine a location of the beaconing device relative to the finder device as the finder device or wireless accessory pass into and out of range of one another. In one embodiment, beacon RSSI or UWB ranging can be used, as shown in FIG. 7. The cluster locations service can take a cluster of locations and the certainty associated with those locations and refine the cluster of locations into a one or more locations that are the best estimate for the location of the object during the time in which the object was detected.

To refine the cluster of locations, the list of potential locations for a detected advertisement can be sorted by time. The list of locations can be traversed from latest to earliest and each location can be analyzed to determine if the location is consistent with the previous reading. If the locations appear consistent, a weighted average of the locations is taken and used as the location for the beacon, with the weights for the averaging being the uncertainty metric for the location. If there is a single location that is not consistent, that location may be discarded. However, if multiple locations are detected that indicates that the beaconing object is moving, the averaging process is stopped and multiple locations may be reported for the object. Using these analysis techniques, the cluster locations service can determine, for example whether the beaconing object is in motion past a stationary finder device, the beaconing object is stationary as the finder device moves past, or whether the beaconing object and the finder device are in motion relative to one another. This determination can be used to further refine the location data and produce one or more estimated locations for a beaconing object, rather than simply a set of locations of the finder device while the beaconing object is detected.

FIG. 16 illustrates a method 1600 to gather beacon advertisements while a finder device is in a low power state. The method 1600 can be performed by a device having a system similar to system 1400 of FIG. 14. In one embodiment, method 1600 includes to scan for beacon advertisements using wireless processor while application processor is in a low power state (block 1601). The advertisement scan is performed by a wireless controller, such as but not limited to a Bluetooth controller (e.g., Bluetooth controller 1433) that includes an advertisement buffer (e.g., Bluetooth advertisement buffer 1429) that can store detected advertisements while an application processor (e.g., application processor 1434) is in a low power state. The wireless controller can store beacons and timestamps in the beacon advertisement buffer as beacon advertisements are detected (block 1602). The wireless controller can also include logic that performs operations that process the beacon advertisement buffer to remove duplicate entries (block 1603). When the application processor wakes from the low power state, the wireless controller can transfer buffer entries to the application processor (block 1604). The application processor can then correlate beacon advertisements with stored location data to determine a location estimate for a device associated with the beacon advertisement (block 1605).

Figure 17A:
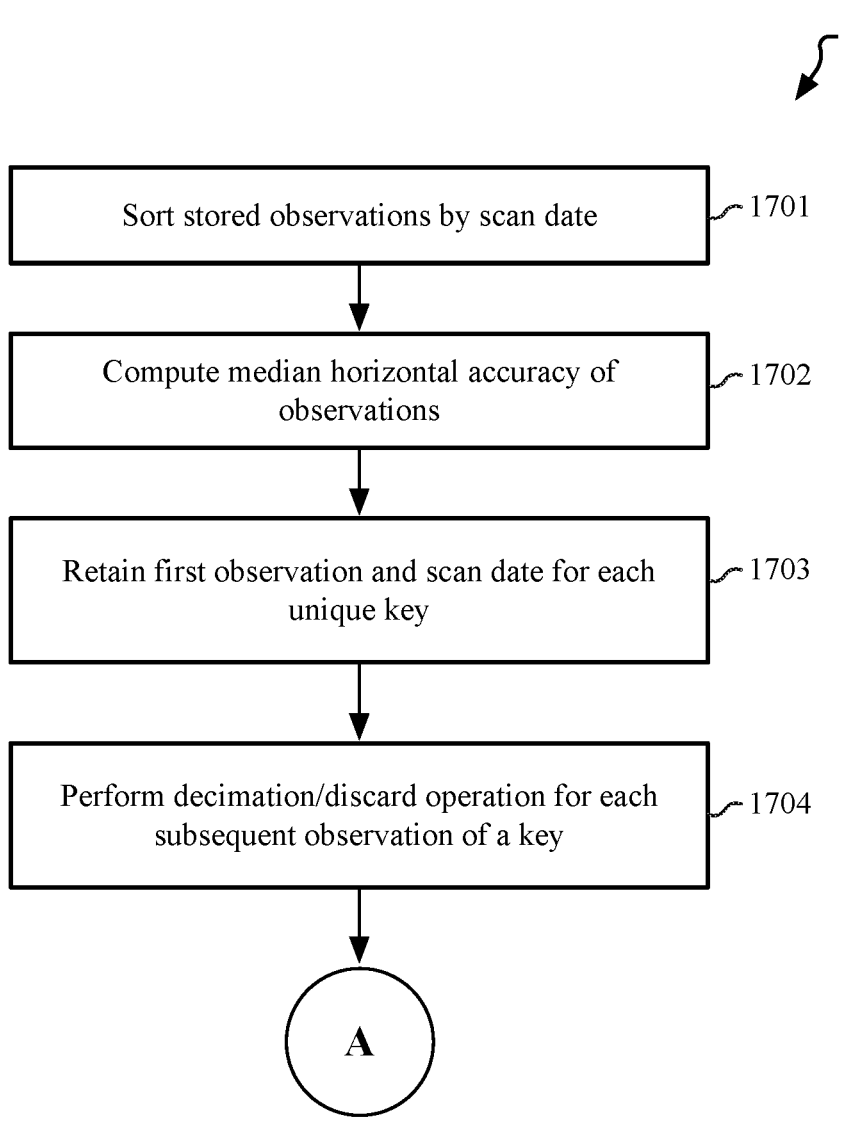
FIG. 17A-17B illustrates a method of pruning locations that are detected for an object.
Figure 17B:
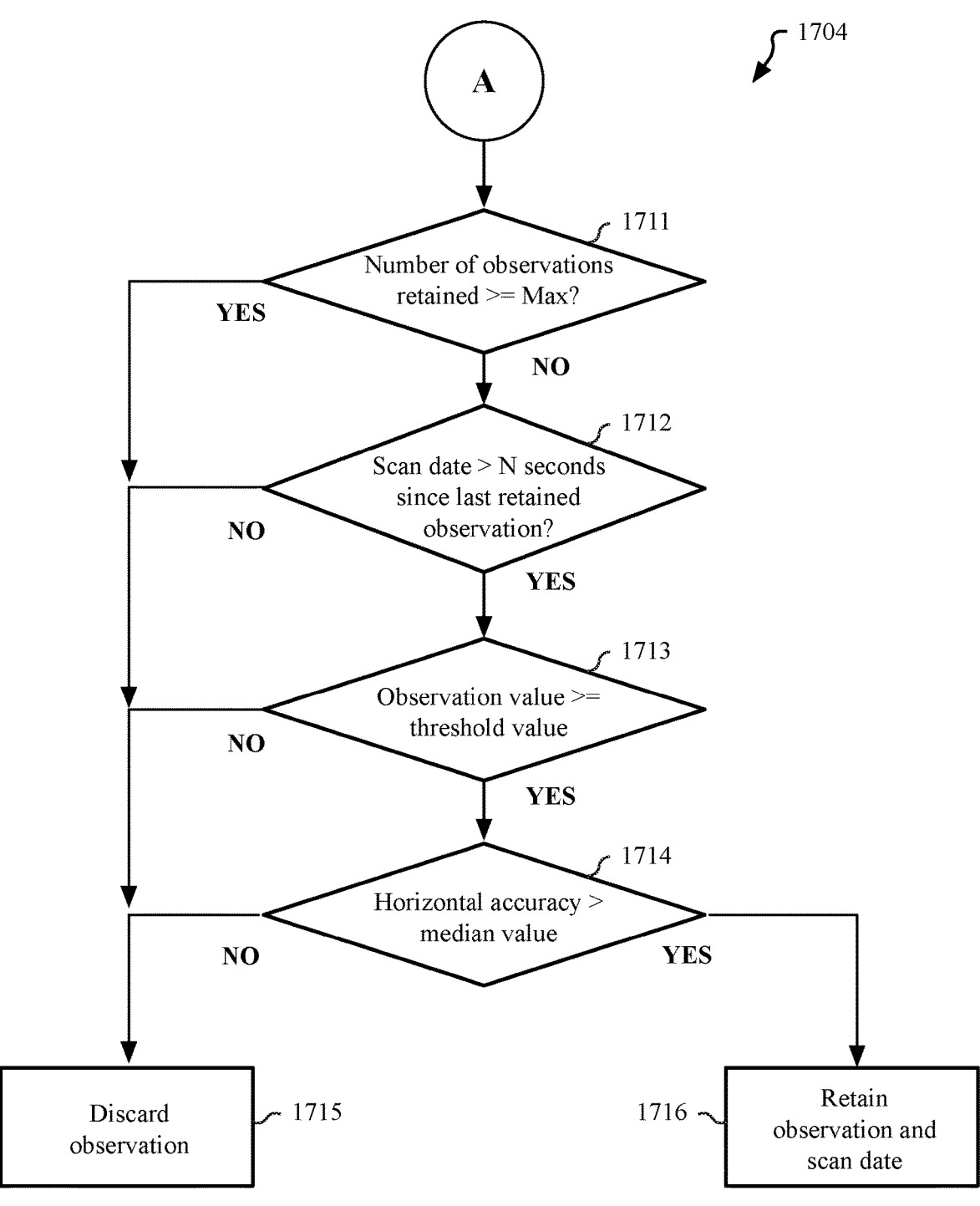

FIG. 17A-17B illustrates a method 1700 of pruning locations that are detected for an object. In one embodiment, method 1700 can be performed by a search daemon 1437 on data stored in the beacon upload cache 1449. In one embodiment, method 1700 can be performed by deduplication logic 1443 during deduplication of data stored in the beacon payload cache 1441.

As shown in FIG. 17A, method 1700 includes operations to sort stored observations by scan date (block 1701). Observations for separate beaconing objects can be sorted separately. Method 1700 additionally includes operations to compute median horizontal accuracy of the observations (block 1702). A separate median horizontal accuracy can be computed for each separate object that is observed. Method 1700 additionally includes operations to retain the first observation and scan date for each unique key (block 1703). Each unique key within a privacy period can represent a separate object that is detected. For subsequent observations having the same key, method 1700 includes to perform a decimation/discard operation on that observation (block 1704). Method 1700 continues in FIG. 17B.

As shown in FIG. 17B, for each observation and for each object, a decimation/discard operation 1704 can be performed that includes multiple sub-operations. In one embodiment, the sub-operations include a sub-operation to determine whether the number of observations currently retained for an object is greater than the configured maximum number of observations (block 1711). The maximum number of observations for an object can be a pre-determined number of can vary dynamically. If the maximum number of observations have already been retained, the observation is discarded (block 1715).

An additional sub-operation includes determining whether the scan date of an observation is greater than N number of seconds since the last retained observation (block 1712), as it may not be beneficial to retain multiple observations for the same object when those observations are very close in time. If the scan date is not greater than N seconds since the last retained observation of the object, the observation is discarded (block 1715).

An additional sub-operation includes determining an observational value for the observation and determining whether the observational value is greater than a threshold value (block 1713). In one embodiment an observation can be given an observational value (e.g., high, medium, low) based on a variety of factors including the confidence score of the location associated with the observation. An observational value can also be based on factors such as the RSSI associated with an observation, as an observation based on a weak/distant signal may be considered lower value than one based on a stronger/closer signal. If the observational value is not greater than or equal to the threshold observational value (e.g., medium), the observation may be discarded (block 1715).

With reference to the operation at block 1702 to compute a median horizontal accuracy of observations for an object, an additional sub-operation is performed to determine if the horizontal accuracy of the observation is greater than the median horizontal accuracy of the currently retained observations (block 1714). If the horizontal accuracy of the observation is not greater than the median value, the observation may be discarded (block 1715). If the observation passes review of the sub-operation at block 1714, as well as the previous sub operations (block 1711, block 1712, block 1713), the observation and the associated scan date (e.g., timestamp) is retained (block 1716). Retained observations may be further processed for upload to the cloud servers (e.g., cloud servers 1470) that store finder-submitted locations for wireless objects and beacons.

Figure 18:
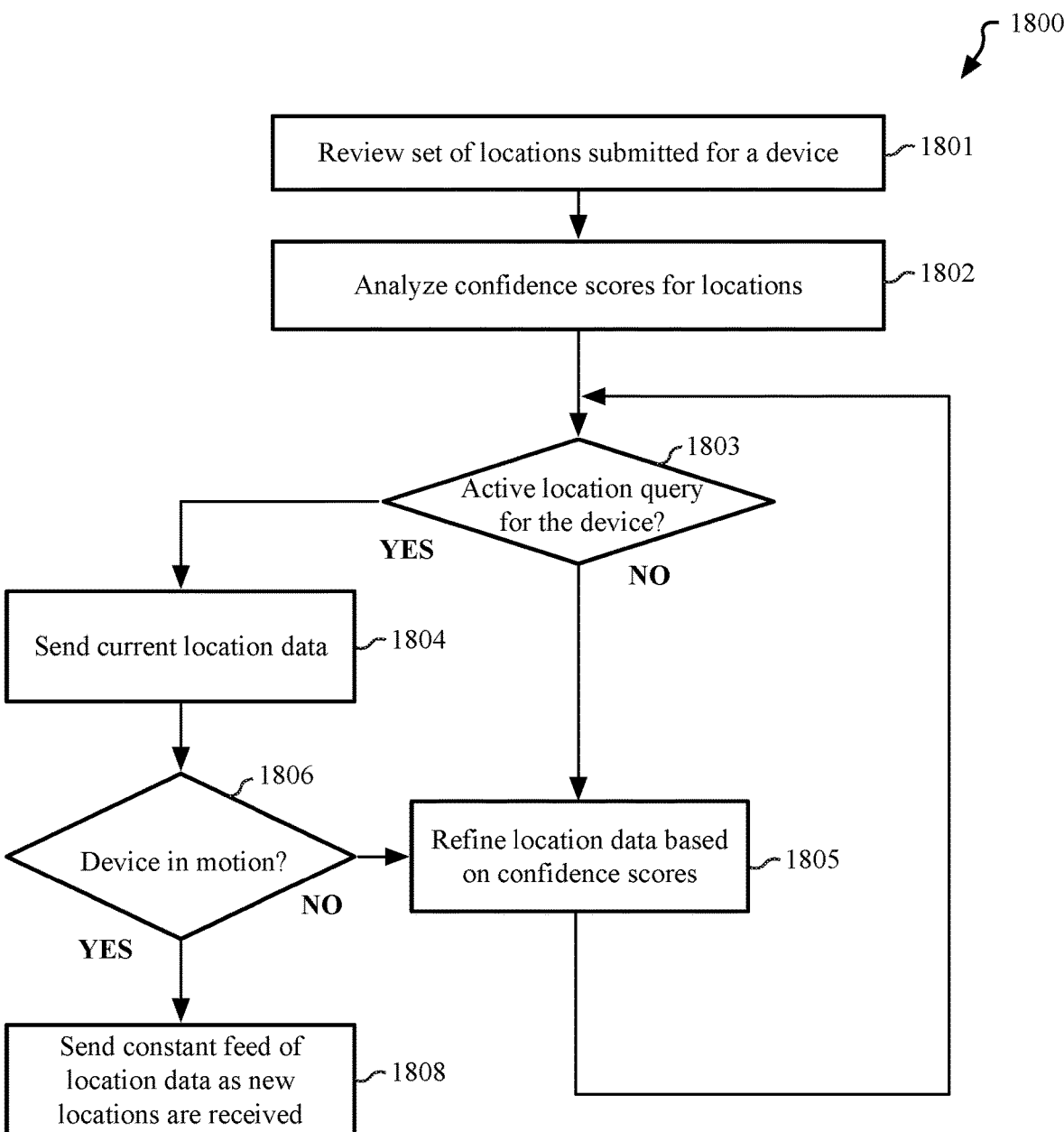
FIG. 18 is a method of handling device location data on a server, according to an embodiment.

FIG. 18 is a method 1800 of handling device location data on a server, according to an embodiment. Method 1800 can be performed by a device location server, such as device location server 203 and/or cloud servers 1454. Method 1800 includes operations to review set of locations submitted for a device (block 1801). The observations for a single device or accessory are reviewed, including all observations submitted from multiple finder devices. For example, if a wireless accessory or device is beaconing in a crowded area, multiple devices may send a location for the accessory or device. The server can then review the locations for the device that are submitted by the multiple finder devices to further define the location data for a device. Reviewing the locations can include analyzing the confidence scores for the various locations (block 1802).

If the server detects that there is an active location query for the device for which location data is being refined (block 1803), the server can bypass some steps of the refinement process and send the current location data to a client device in response to the location query (block 1804). If no location queries are pending for the device, the server can take additional time to refine the location data based on the confidence scores for the locations (block 1805). Refining the data can include, for example, determining an estimated location for a device or accessory based on the locations reported by multiple finder devices. In one embodiment, refining the location data based on confidence scores can include further weighted averaging operations across the locations submitted by multiple finders, with the averages weighted based on confidence score. If at any point during refinement a location query is received (block 1803), the server can send the current location data in response to the query (block 1804).

If after sending the current location data, the server receives an indication that the device is in motion (block 1806), the server can be configured to send a constant feed of location data as new location data is received (block 1808). As the location data may be encrypted, the server will not have direct knowledge of whether the device or accessory in question is in motion. However, the various finder devices may be able to determine that the device or accessory being observed is in motion and can send a motion state flag to the server. If the device is not in motion, the server can continue to refine the location data based on the confidence scores (block 1805).

Figures 19A, 19B:
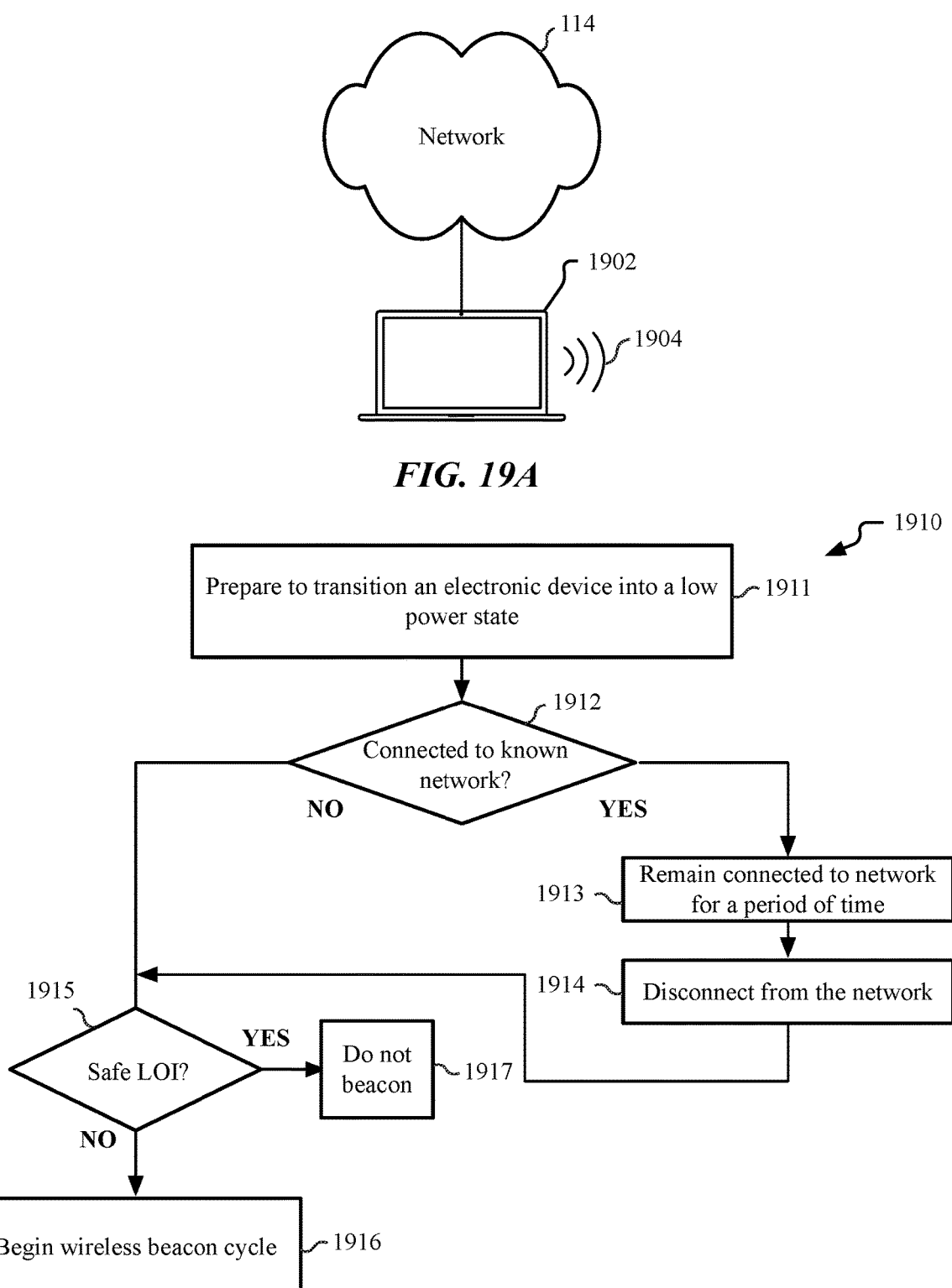

FIG. 19A-19C illustrate a system and methods of advertisement beaconing on a laptop device. The crowdsourced location determination based on beacon advertisements as described herein can be used for multiple different types of devices and accessories, including wireless devices with network or cellular access and wireless accessories without current or native network access. Generally a laptop device will be able to access the network via a Wi-Fi access point and send location updates to a device location server. In one embodiment, when a laptop device is not connected to a network, the device can begin broadcasting a wireless advertisement, such as a Bluetooth Low Energy advertisement, that can be used to determine the location of the device via nearby finder devices.

As shown in FIG. 19A, an electronic device 1902 such as a laptop or tablet computer, can connect a network 114 via a wireless networking protocol (e.g., Wi-Fi), mobile wireless network (e.g., cellular) or via a wired network connection (e.g., Ethernet). Location updates for the device can be sent over the network 114 to enable the device to be located. If for any of a variety of reasons the laptop device 1902 becomes disconnected from the network 114, the laptop device 1902 can begin broadcasting a beacon advertisement 1904 via a wireless radio that allows nearby finder devices to determine the location of the electronic device 1902 and upload that location to the device location server. A method 1910 of enabling the advertisement beacon is shown in FIG. 19B. A method 1920 of cycling the advertisement beacon for privacy and power-saving purposes is shown in FIG. 19C.

As shown in FIG. 19B, method 1910 includes to prepare an electronic device, such as a laptop device or tablet computer, into a low power state (block 1911). For example, the electronic device can be prepared to be placed a sleep state in which portions of the device are turned off or placed into a low power state, while the memory of the device remains at least partially powered to retain application and system state. In some embodiments, data in memory can be written to non-volatile storage and the electronic device can enter a standby state in which a greater number of components of the electronic device, including the memory storing the device state, can be powered off. Standby state may be entered after the device spends a period of time in the sleep state.

When the electronic device initially prepares to transition into a low power (sleep or standby) state, the electronic device can determine if a connection exists to a known network (block 1912). For example, the electronic device can determine if the device is connected to a known Wi-Fi access point or a switch/router having a known MAC address. In one embodiment a known network is a network to which the electronic device was previously connected. In one embodiment, a known network is a network to which the electronic device was previously connected and is configured to auto-join. In one embodiment, a known network can be a network at a pre-configured location, such as a home or work network. In one embodiment, a known network is a network at a location of interest that is frequently visited and that the electronic device is configured to auto-join.

If the electronic device is connected to a known network, then the electronic device can remain connected to the network for a period of time (block 1913). After the period of time, the electronic device may disconnect from the network (block 1914). The electronic device may disconnect from the network, for example, in response to entering a deeper sleep state (e.g., standby). The electronic device may also remain in a sleep state (e.g., with memory powered) but disconnect from the network to preserve power. The period of time can be a pre-determined period of time (e.g., 12 hours) or can vary based on a battery state of the electronic device. In one embodiment if the electronic device is connected to a power source, the device may remain connected to the network indefinitely. Depending on the power configuration of the device, the electronic device may also disconnect from the network after a pre-determined period of time to reduce overall power consumption even if the electronic device is connected to an external power source.

When the electronic device disconnects from the network, the electronic device can determine if the current location of the device is a safe location of interest (block 1915). In one embodiment, multiple safe locations of interest can be configured. By default, the "home" location of the user is a default location of interest. If the electronic device disconnects from the network while in a safe location of interest, the user is likely aware of the location of the device or will attempt to locate the device before the electronic device disconnects from the network. In such scenario, the electronic device will not beacon (block 1917).

If after disconnecting from a network (block 1914) or immediately upon entering the low power state if not connected to a known network (block 1912), when not in a safe location of interest (block 1915), the electronic device can begin a wireless beacon cycle (block 1916). During the wireless beacon cycle, a beacon advertisement is broadcast by the device to enable the presence of the device to be detected by finder devices. The finder devices can then upload a location for the electronic device to the device location server as described above. The wireless beacon cycle can be implemented via method 1920 of FIG. 19B.

As shown in FIG. 19B, method 1920 includes for the electronic device to configure a wireless controller on the electronic device to broadcast a beacon identifier based on a set of keys (block 1921). The wireless controller can be, but is not limited to a Bluetooth or Bluetooth Low Energy controller. In some embodiments, other types of low-power wireless protocols may be used. The wireless controller can be configured by the electronic device while active and the electronic device can enter a low power state while the wireless controller broadcasts the beacon advertisement. The beacon identifier is based on a set of keys that includes a public key associated with the electronic device. The electronic device can broadcast the beacon identifier for a first period of time (block 1922). In one embodiment, the first period of time can be a first privacy period, during which the advertisement will be broadcast based on a public key. After which, the electronic device can use an anti-tracking secret, as described above, to generate a new set of keys, including a new public key that can be used as the next beacon identifier.

The electronic device can then configure the wireless controller to broadcast the next beacon identifier based on the new set of keys (block 1923). The electronic device can then broadcast the next beacon identifier for a second period of time (block 1924). The electronic device can continue cycling beacon identifiers until a broadcast timeout is reached (block 1925). Once the broadcast timeout is reached, the electronic device can stop broadcasting for a third period of time (block 1926). The electronic device can stop broadcasting to preserve batter life or reduce the power consumption of the electronic device. Depending on the location and time, the electronic device can also stop broadcasting during periods where it is unlikely that finders will be nearby to detect the device.

The electronic device can also periodically re-configure the broadcast schedule (block 1927) before resuming broadcast (block 1921). When resuming broadcast, the electronic device can broadcast using a different beacon identifier than previously advertised. When re-configuring the broadcast schedule, the electronic device can change the times in which the beacon is advertised and/or the number of times during a 24 hour period in which the beacon is advertised.

In one embodiment, the wireless controller is directly controlled by the application processor of the electronic device and the electronic device temporarily wakes from the sleep state to change the advertisement that is broadcast by the wireless controller. In such embodiment, the electronic device may broadcast more often during a first day of broadcasting and broadcast less often during a second day of broadcasting. For example, during a first day of advertisement broadcasting, the electronic device may broadcast for two hours, with the beacon identifier cycled every 15 minutes. The electronic device may then stop broadcasting for three hours before resuming broadcasting for two hours. During the second day, the electronic device may broadcast twice a day, with a one hour broadcast for each broadcast period.

In one embodiment, the wireless controller includes a buffer that can include multiple pre-generated key sets and beacon identifiers. The wireless controller can then be configured to automatically cycle the beacon identifiers without requiring the electronic device to wake from the low power state.

Detection of Beacon Advertisements Broadcast by Known Devices

Embodiments described herein provide a wireless beacon device that can be used to track or locate items to which the wireless beacon device is attached. A wireless beacon device and a companion device can be cryptographically associated using a public key exchange (310), as in FIG. 3, or via a collaborative key generation process. During the collaborative key generation process, the companion device and the wireless beacon device can work in concert to generate a set of base keys. The collaborative key generation algorithm enables the companion device and wireless beacon device, after an exchange of baseline cryptographic material, to separately generate the set of base keys. Each device can then use the base keys to generate additional diversified keys. The diversified keys can be used to determine the wireless hardware broadcast addresses (e.g., MAC addresses) that are used by the wireless beacon device. The diversified keys can also be used to derive cryptographic keys that enable the establishment of an encrypted communication link between the companion device and the wireless beacon device.

The collaboratively generated keys can be used to configure a wireless hardware address for a beacon that is advertised by a wireless beacon device. A companion device can detect known devices by searching for beacon advertisements that have hardware addresses that match a public key for the known device. A variety of different mobile device classes (e.g., mobile phones, laptop devices, tablet computers, locator tags etc.) may be configured to broadcast beacons (e.g., wild mode beacons) that enable finder devices to detect the presence of those devices and upload an estimated location for the device to device locator servers. A wireless beacon device can also be configured to beacon in a near owner mode when the device is within wireless communication range of its companion device, or for a period of time after an encrypted communication session between the companion device and the wireless beacon device is terminated. The wireless beacon device can be configured to transition into beaconing in a wild mode state after the device has beaconed in near owner mode for a threshold period of time.

Figure 20:
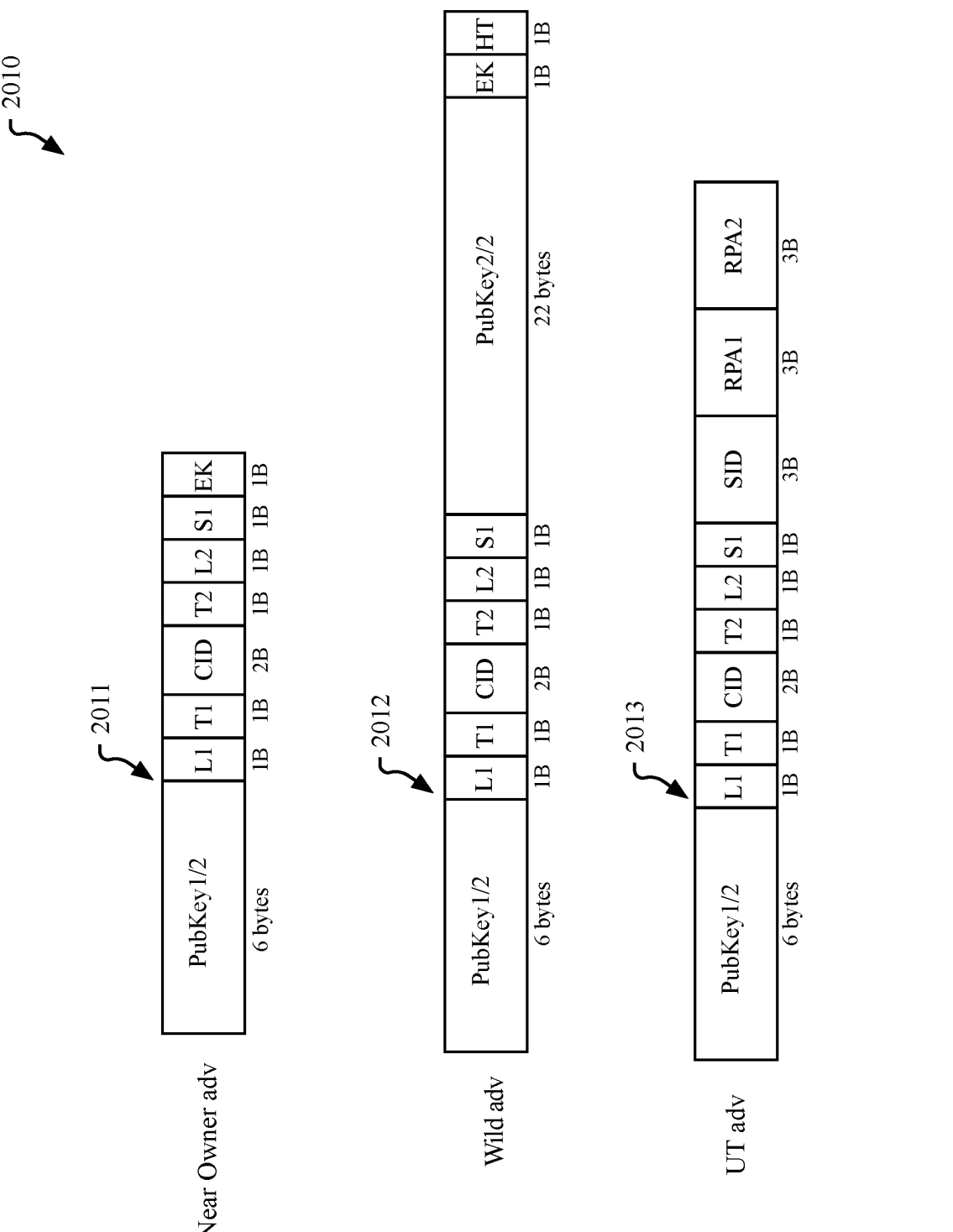
FIG. 20 illustrates advertisement beacon packets for a wireless accessory.
Figure 21:
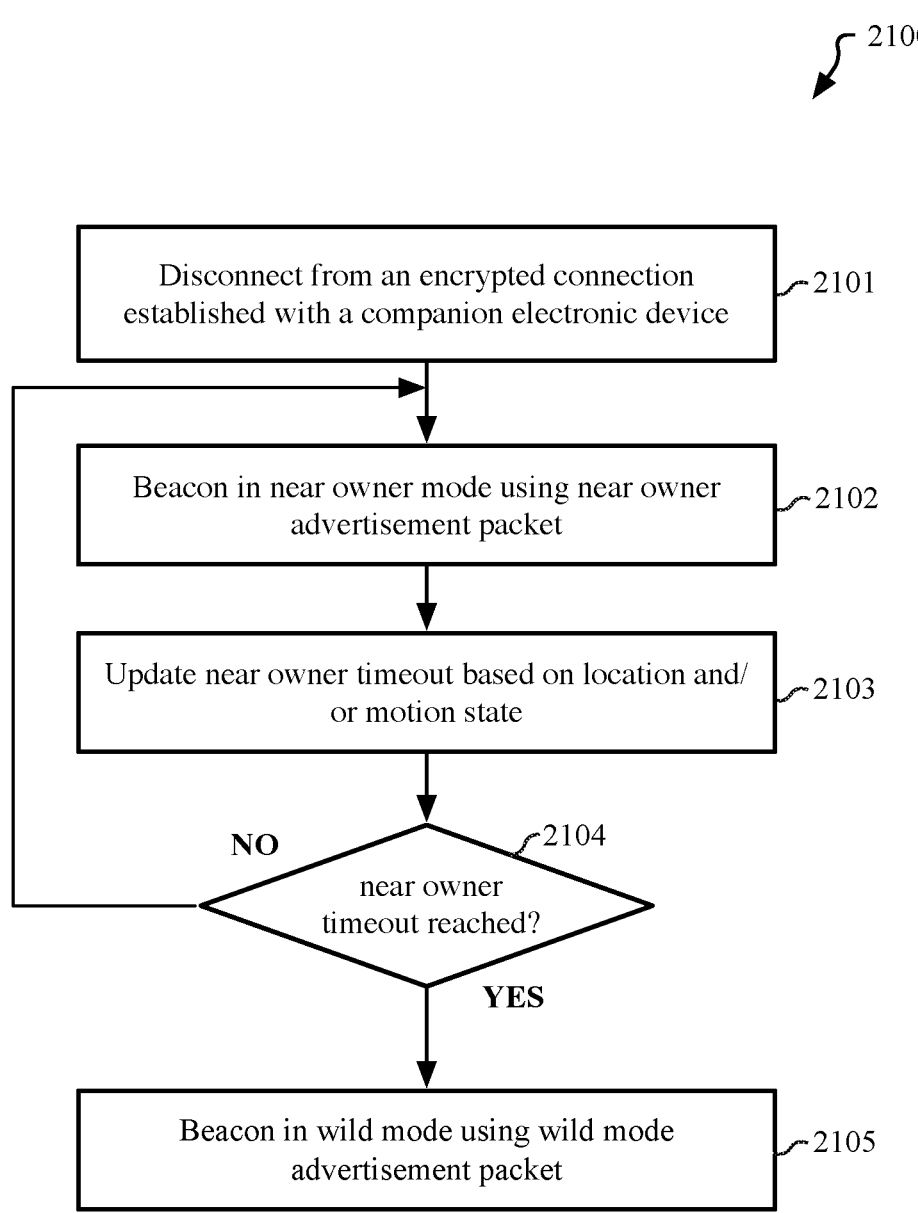
FIG. 21 illustrates a method to enable transition from a near owner advertisement mode to a wild advertisement mode.

The advertisement packets that are broadcast by a wireless beacon device can differ depending on the advertisement mode of the device. Near owner and wild mode advertisement packets are illustrated in FIG. 20. A method to transition from near owner mode to wild mode is shown in FIG. 21. Depending on the type of packet that is detected for a beaconing device, the matching process that is performed to determine if the beaconing device is a known device can occur in real time or be deferred to a later time period. In one embodiment, real time matching is performed for a device that is beaconing in near owner mode, while matching for a device in wild mode can be deferred until a beacon publication event.

FIG. 20 illustrates advertisement beacon packets 2010 for a wireless accessory. Advertisement packets that are broadcast by a wireless accessory can vary based on whether the accessory is in a near owner mode (packet 2011), in a wild beaconing state (packet 2012), or advertising unwanted tracking determination or suppression data (packet 2013). In one embodiment the advertisement packets may be Bluetooth Low Energy advertisement packets. However, embodiments are not limited as such. Additionally, the packet formats may differ from standard wireless protocol advertisement packets.

In one embodiment the near owner advertisement packet 2011 includes a first public key portion (PubKey1/2) for use as an advertisement address. The first public key portion can include the first six bytes of the current public key for the wireless accessory. In one embodiment, the most significant bits of the advertisement address are constrained to the value 0b11, which specifies a static device address. The actual address bits are instead stored in the EK (extra key) field, along with bits that define a tag type for the wireless accessory if the wireless accessory is a wireless beacon tag. The near owner packet can additionally include fields L1, T1, CID, T2, L2, and S1. L1 is the length of the advertisement type field, T1 is the advertisement type field, CID is the company ID field, T2 is the payload type (e.g., object discovery), L2 is the length of the object discovery field, and S1 is a status flag field. The length of the object discovery payload can vary depending on whether the wireless accessory is in near owner or wild mode. The status flag field can include, for example, the battery state and additional device type flags, such as, for example, whether the wireless accessory is a wireless beacon tag.

In one embodiment the wild mode advertisement packet 2012 can include similar fields as the near owner advertisement packet 2011. The wild mode advertisement packet 2012 can additionally include a second public key portion (PubKey2/2) that includes additional bits of the public key. In one embodiment, the additional bits of the public key or the combined public key (PubKey1/2, PubKey2/2, EK) can be used as a static identifier for the wireless accessory that allows unwanted tracking notifications to be suppressed. In one embodiment the combined public key can also be used as an encryption key by finder devices to encrypt an observed location of the wireless beacon when an observation is uploaded to a device locator server.

In one embodiment, a wireless accessory is configured to broadcast a separate UT advertisement packet 2013 in an alternating sequence with a wild mode advertisement packet 2012 while the accessory is in wild mode. The UT advertisement packets 2013 can include RPA1 and RPA2 values, which can be used to ignore or suppress notifications until the end of day or indefinitely. The RPA1 and RPA2 values are based on a diversified public key, which rolls every privacy period (e.g., every 15 min) and an IRK value. In one embodiment, IRK_EOD rolls every 24 hours, while IRK_INDEF does not roll and unless the wireless accessory undergoes a factory reset. The wireless accessory may be factory reset in response to unpairing the accessory from a companion device.

The UT advertisement packet 2013 is optional. In one embodiment, the UT advertisement packet 2013 can be excluded and suppression can be performed by using one or more static identifies associated with the wireless accessory. The static identifier can be configured to roll every 24 hours, allowing an unwanted tracking notification to be suppressed for an accessory each day. For example, in one embodiment the diversified public key for the device can continue to roll internally for an accessory while in wild mode, while the wild mode advertisement address is configured to roll at, for example, midnight local time for the wireless accessory. During the key roll, the currently active internal public key can be configured as the advertisement address for the beacon advertisement. To assist the owner device is re-connecting to the accessory while in wild mode, the wild mode advertisement packet 2012 can include a hint field HT that contains a set of bits (e.g., set of least significant bits) of the public key that is in current use by the accessory. The owner device can use that information to generate the proper owner key, owner token, and/or connection key to place the wireless accessory into near owner mode. Once in near owner mode, the wireless accessory can begin advertising using the near owner advertisement packet 2011.

FIG. 21 illustrates a method 2100 to enable transition from a near owner advertisement mode to a wild advertisement mode. Method 2100 can be performed by any wireless device, wireless accessory, or wireless accessory device as described herein. In one embodiment, after a wireless device disconnects from an encrypted connection that is established with an electronic device (block 2101), the wireless device can beacon in near owner mode using near owner advertisement packet (block 2102). The near owner advertisement packet can be a variant of the near owner mode packet 2011 of FIG. 20. The wireless device can also configure or update a near owner timeout based on location and/or motion state (block 2103). The near owner timeout can be increased from a default value when the wireless device is in a home location or point of interest, or another location or point of interest that has been designated as a safe location. The near owner timeout can be reduced from a default value when the wireless device is not at a safe location, is in motion, and/or has recently been in motion. The near owner timeout can be configured after the wireless device disconnects from the encrypted connection with the companion device. The near owner timeout can also be configured during the connection with the companion device based on context information determined by the wireless device during the connection or based on status information received from the companion device. Reducing the near owner timeout period reduces the amount of time that may be required for a potentially lost wireless device to be detected by other devices that are configured to report the detection of wild mode beacons.

After a period of time, the wireless device can determine if the near owner timeout has been reached (block 2104). If the near owner timeout has not been reached (NO at block 2104), the wireless device can continue beaconing in near owner mode. If the near owner timeout has been reached (YES at block 2104), the wireless device can then beacon in wild mode using wild mode advertisement packet (block 2105). While in the wild mode, the wireless device broadcasts a wild mode advertisement packet that is discoverable to finder devices that are in wireless range of the wireless accessory. The wild mode advertisement packet can be a variant of the wild mode advertisement packet 2012 of FIG. 20B. The beacon rate of the wireless device may be increased relative to the beacon rate while in near owner mode. Nearby finder devices, upon detection of a wild mode advertisement, can attempt to determine or estimate a location of the wireless device relative to the finder device and upload the determined or estimated location to a device location sever, with the determined or estimated location indexed on the device location server by a hash of the wild mode address broadcast by the wireless device.

A privacy period key roll can continue to be performed for each privacy period while the wireless device is in wild mods. The privacy period key roll result in a change in the encryption key that is to be used to establish a connection with the wireless. In one embodiment, unlike while in near owner mode, the advertisement address for the device in wild mode is not updated for each key roll. The advertisement address can instead be updated every R key rolls, resulting in an advertisement address change between, for example, every 24-36 hours. Maintaining the same advertisement address for a period of time while in wild mode can facilitate the suppression or ignoring of unwanted tracking warnings for a period of time, without requiring cryptographic techniques to determine whether multiple wild mode addresses for a wireless device resolve to the same device.

To reconnect with a wireless device in near owner mode, the companion device can attempt to establish a connection with the wireless device using the current advertisement address of the wireless device, as well as the current encryption key for the wireless device. The companion device can maintain an estimate of a counter value on the wireless device that is used to generate new keys during each key roll. The companion device can connect to the wireless device in wild mode using the wild mode advertisement address and the privacy period key, which can be generated by the companion device based on the counter estimate. In one embodiment, a block of key can be pre-generated by the companion device for a period of time (e.g., 24 hours) and additional keys can be periodically generated to maintain a set of keys for the time period.

Figure 22A:
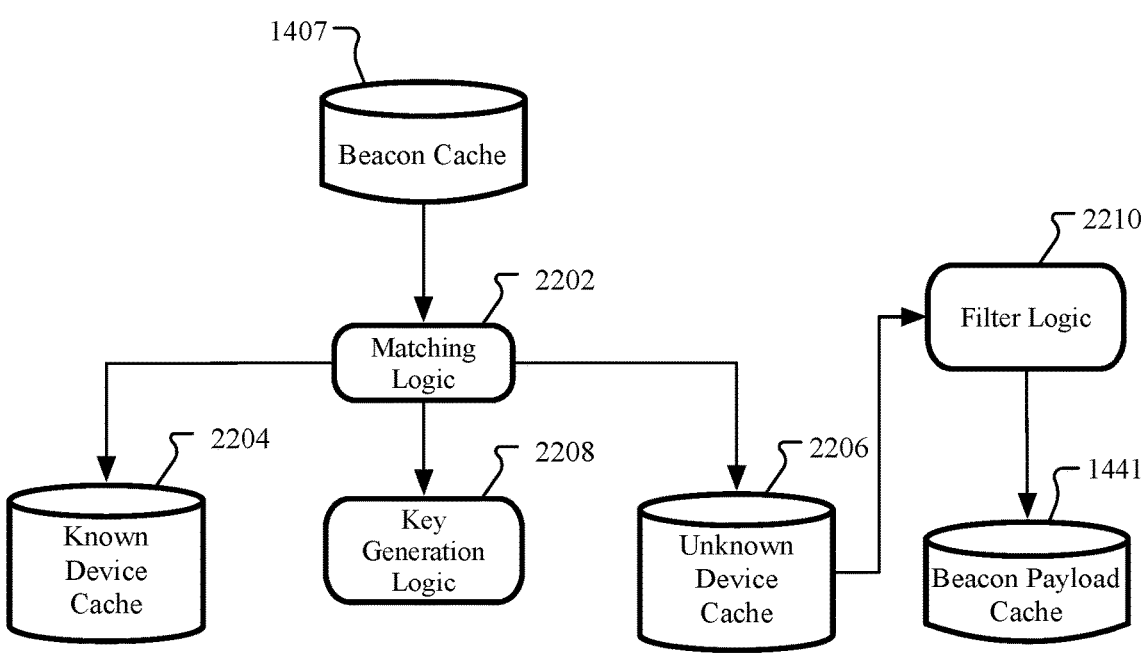
FIG. 22A-22B illustrate systems to perform real-time and deferred key matching to detect beacons of known devices, according to embodiments.
Figure 22B:
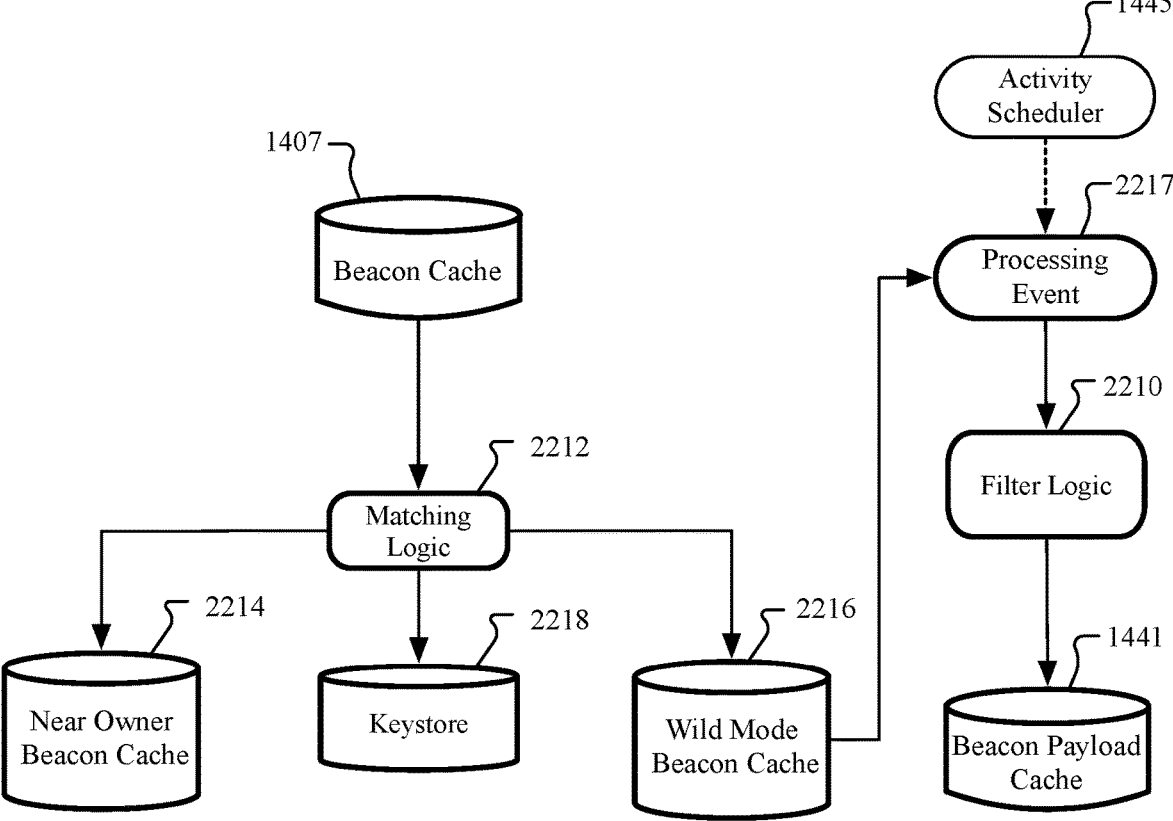

FIG. 22A-22B illustrate systems to perform real-time and deferred key matching to detect beacons of known devices, according to embodiments. FIG. 22A illustrates a system in which key matching to detect known devices is performed in real time. FIG. 22B illustrates a system in which key matching to detect known devices is performed in real time for devices in near owner mode and deferred for devices in wild mode.

As shown in FIG. 22A, entries in the beacon cache 1407 that stores beacon advertisements can be read by matching logic 2202. In one embodiment the matching logic 2202 is configured to perform real-time detection of beacon advertisements for known devices that are broadcasting in near owner mode and wild mode by performing key matching operations. The matching logic 2202 can use keys generated by key generation logic 2208 to detect beacons in the beacon cache 1407 that broadcast by known devices. Beacons can be sorted in to a known device cache 2204 and an unknown device cache 2206. The known device cache 2204 can store a set of observations for devices that are known to the detecting electronic device. Devices that are known to the detecting electronic device include devices that cryptographically associated with the detecting electronic device, such that the detecting electronic device is, for example an owner device (e.g., companion device) of the detected wireless device, or a device that has been delegated rights to interact with the detected wireless device. Locations can be determined for beacon entries in the known device cache and those entries can be used to perform location updates for those devices. Entries in the unknown device cache 2206 can be processed by filter logic 2210 to enhance location estimates determined for those beacons before the beacons and estimated locations are stored to the beacon payload cache 1441.

A known device in near owner mode can be detected by matching a set of bytes that are broadcast as the wireless address for the wireless device. For example, a wireless device that is in near owner mode can broadcast a near owner advertisement packet 2011 as in FIG. 20, which includes a first public key portion (PubKey1/2) for use as an advertisement address. The first public key portion (PubKey1/2) can include, for example, the first six bytes of the current public key in use for the wireless device, although the specific number of bytes can vary. The current public key in use for the wireless device can rotate every M minutes and the current public key can be computed in real time by the key generation logic 2208.

A wireless device that is in wild mode can also be detected by matching a set of bytes that are broadcast as the wireless address for the wireless device. The number of bytes in the set of bytes to be matched for wild mode is larger relative to near owner mode. For example, a wild mode advertisement packet 2012, as in FIG. 20, can include the first public key portion (PubKey1/2), as well as a second public key portion (PubKey2/2). The public key in use for the wireless device can continue to rotate every M minutes while the wireless device is in wild mode. However, the first public key portion (PubKey1/2) and second public key portion (PubKey2/2) that are advertised in the wild mode advertisement packet 2012 may not be updated during every key roll. Instead, one or more portions of the advertised public key may remain static over a pre-determined number of public key rolls. Accordingly, the number of public keys that may be checked for a wireless device in wild mode may be larger than the number of keys that may be checked for a wireless device in near owner mode. The key generation logic 2208 has knowledge of the address update schedule and can generate multiple potential public keys for a wireless device that can be compared to entries in the beacon cache 1407 to determine if any of the entries are associated with a known device that is beaconing in wild mode.

Some embodiments described herein may be configured as illustrated in FIG. 22B, in which matching logic 2202 is configured to match entries in the beacon cache 1407 to perform known device detection for wireless devices that are beaconing in near owner mode. Beacons that are detected for known devices in near owner mode can be added as entries in a near owner beacon cache 2214. In one embodiment, near owner beacons can be detected based on the specific structure of the near owner advertisement packet 2011 relative to the wild mode advertisement packet 2012. A key matching operation can then be performed by the matching logic 2212 to determine if the detected near owner beacon was broadcast by a known device.

Beacons for wireless devices that are beaconing in near owner mode are detected in real time, for example, to facilitate the performance of maintenance operations on those devices. The maintenance operations can include periodic counter update operations to prevent counter drift, adjustment of near owner mode timeout values, and/or configuring the wild mode address update time and update intervals. Beacons that are detected for devices that are beaconing in wild mode can be placed in the wild mode beacon cache 2216 without making a determination as to whether any of the detected devices in wild mode are known devices. The larger number of potential keys and the more complex matching operations that are performed to detect known devices in wild mode devices cause wild mode matching to be more processor intensive than near owner mode matching. Thus, some embodiments defer key matching operations for wild mode beacons. Matching operations can be deferred until a time when processor resources are in low demand, such that processor resource demand is below a threshold. In one embodiment, key matching operations for wild mode beacons can be bypassed entirely, with wild mode observations for known devices retrieved from the cloud servers 1470 using a device location query.

As described above, matching logic 2212 can perform key matching for detected near owner beacons by comparing a specific set of bytes in the address field of a near owner beacon advertisement packet with associated bytes a cryptographic key (e.g., public key) associated with a wireless device. In one embodiment, instead of real-time key generation using key generation logic 2208 as in FIG. 22A, a block of keys that will be active over a pre-determined period of time for the set of known devices can be pre-generated (e.g., via the key generation logic 2208) stored in the keystore 2218. The block of keys stored in the keystore 2218 can be periodically refreshed to ensure that keys are available for a pre-determined range of time, which can extend across a specified time period before and after the current time.

For each detected beacon advertisement in the beacon cache 1407, the matching logic 2212 can request the appropriate key for each device in a set of known devices for the period of time in which the beacon advertisement was detected. If the bits in the appropriate key for a device match the bits in the address field (and/or another appropriate fields in some embodiments) of the near owner beacon advertisement, the beacon advertisement can be determined to be a near owner beacon and stored in the near owner beacon cache 2214.

Beacons that are detected that do not match as near owner beacons can be stored in the wild mode beacon cache 2216. In one embodiment, known device matching for wild mode beacons can be deferred and performed in response to a processing event or another triggering event. For example, known device determination can be performed for beacons in the wild mode beacon cache 2216 in response to a processing event 2217 that is scheduled by the activity schedule 1445. The processing event can be a trigger for the filter logic 2210 to perform location estimates for beacons, enhance location estimates determined for those beacons, perform known device matching, or other activities that are performed before the beacons and estimated locations are stored to the beacon payload cache 1441. Known device determination can be performed in response to the launching of a device locator application for the device locator service and/or the presentation of a device locator user interface 204 on a mobile device 102. Known device determination can also be performed for beacons in the wild mode beacon cache 2216 during the location estimation process of detected beacons or during publication events in which beacon payloads are uploaded to the set of cloud servers 1470. In one embodiment, known device matching for wild mode beacons can be bypassed and all wild mode beacons can be filtered without performing a determination as to whether the wild mode beacons are associated with a known device. Location data for known devices that are in wild mode can then be determined by querying the cloud servers 1470 via the device locator user interface 204.

Figure 23:
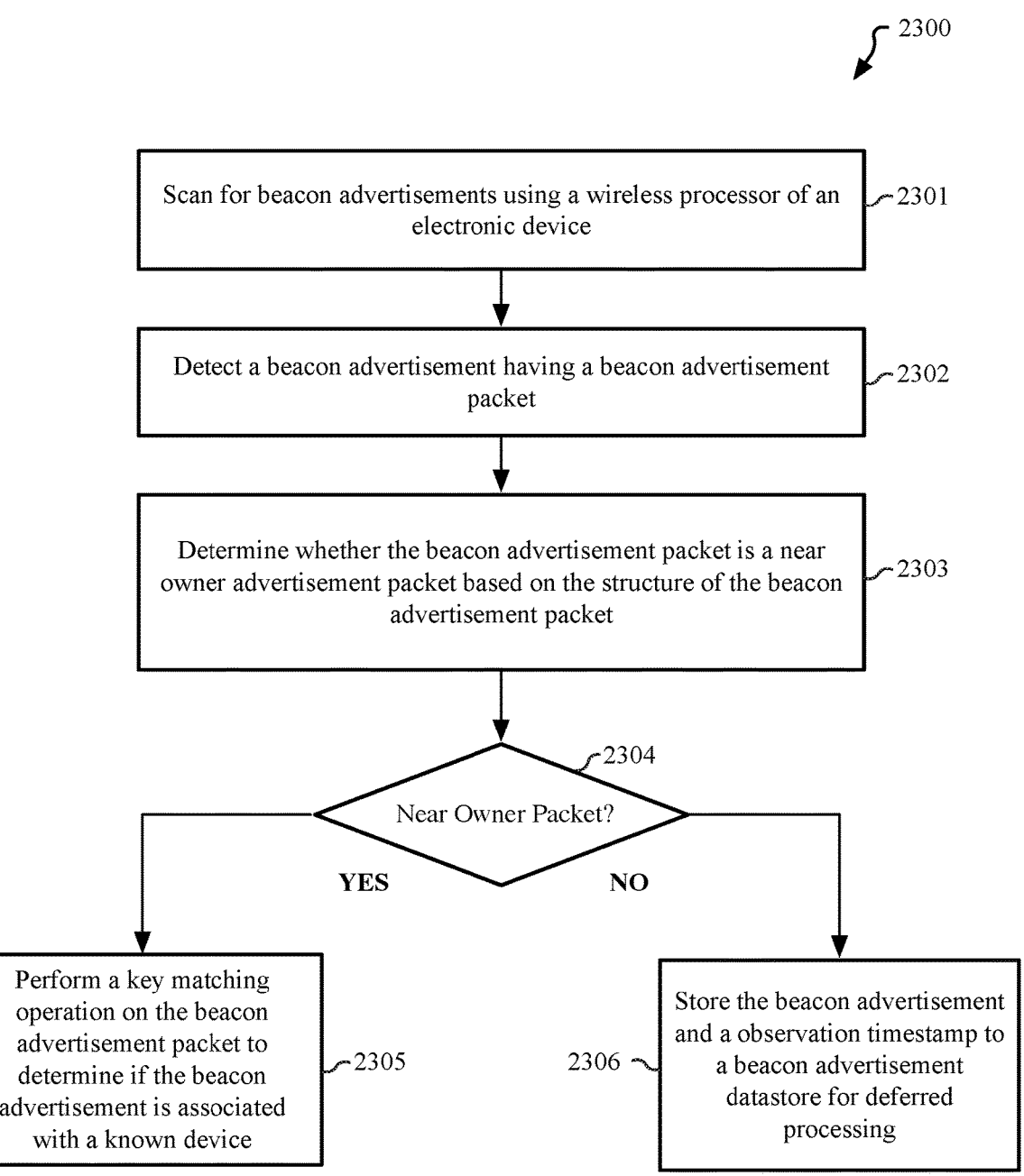
FIG. 23 illustrates a method of performing matching for near owner beacon advertisements, according to an embodiment.

FIG. 23 illustrates a method 2300 of performing matching for near owner beacon advertisements, according to an embodiment. The method 2300 can be performed on an electronic device that is a companion device to wireless devices, including wireless beacon devices. In one embodiment, an electronic device can scan for beacon advertisements using wireless processor of an electronic device (block 2301). The electronic device can then detect a beacon advertisement having a beacon advertisement packet (block 2302). The electronic device can then determine whether the beacon advertisement packet is a near owner advertisement packet based on the structure of the beacon advertisement packet (block 2303). If the electronic device determines that the beacon advertisement packet is a near owner packet (block 2304), the device can perform a key matching operation on the beacon advertisement packet to determine if the beacon advertisement is associated with a known device (block 2305). Otherwise, the device can store the beacon advertisement and a timestamp to a beacon advertisement datastore for deferred processing (block 2306). In one embodiment, if the beacon advertisement is associated with a known device, the electronic device can determine whether to establish a connection with the known device to perform a periodic maintenance operation as described above.

Horizontal Accuracy Adjustment for Detected Beaconing Devices

As described above, the horizontal accuracy associated with location determinations can be used to refine and filter location estimates that are determined for a detected wireless device. In one embodiment a location estimation for a detected wireless device can be determined based on a location estimate for the finder device and an estimate of a range and direction between the finder device and the detected wireless device. Depending on the location determination technique (e.g., satellite positioning service 206 or a terrestrial positioning system using RF signals received from wireless base stations 205, as shown in FIG. 2), the horizontal accuracy or location uncertainty for the wireless device can vary.

With reference to FIG. 14, in one embodiment the location daemon 1401 can provide a horizontal accuracy value to the cluster locations service sub-harvester 1405 along with a location estimate for the electronic device. Based on an on-device classifier associated with the signal environment provider 1419, the location daemon 1401 can request a location via the GPS provider 1415 or the Wi-Fi location provider 1417. The received location includes geographic coordinates (e.g., latitude and longitude) and an associated horizontal accuracy estimate that represents an uncertainty for the geographic coordinates. The horizontal accuracy can be used by a finder device to filter beacon observations and refine location estimates for beacon observations. The horizontal accuracy for a location of a beacon observation can also be used by the set of cloud servers 1470 to refine, filter, and combine beacon observations reported for the same beacon identifier by multiple finder devices.

In one embodiment, location determinations for a finder device can be performed asynchronously with the detection of beacon advertisements. A location for the finder device will not be proactively determined unless the latest location data determined for the finder device is outside of a threshold of time before or after the detection of a beacon advertisement, with the threshold of time being reduced when the finder device is in motion. For example, the zipper logic 1409 in the cluster locations service sub-harvester 1405, can determine whether an advertisement can be tagged with a location determined by the finder device base in the timestamps associated with the detection of the beacon advertisement and the determination of the location estimate for the finder devices.

Figure 24:
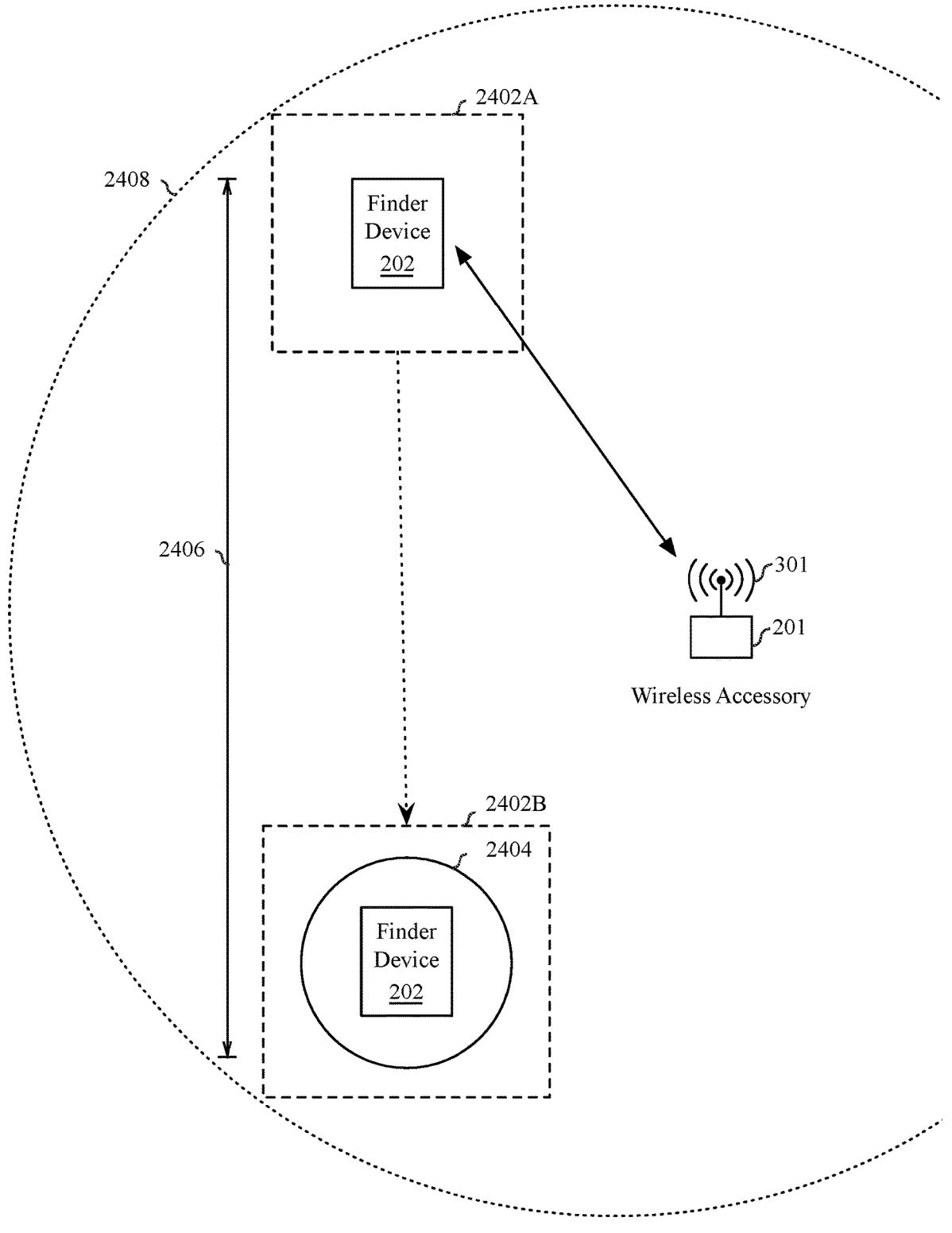
FIG. 24 illustrates adjustment of horizontal accuracy for a moving finder device.

FIG. 24 illustrates adjustment of horizontal accuracy for a moving finder device. A wireless accessory 201 can periodically broadcast a beacon signal 301 that includes device status information and a beacon identifier (e.g., public key). The finder device 202 can detect the beacon signal and cache advertisement packets received via the beacon signal 301. Location determinations for the finder device 202 can occur asynchronously with the detection of a beacon signal 301. For example, when the finder device 202 is moving, the device may detect a beacon from the wireless accessory 201 at a first location 2402A and the location subsystem of the finder device 202 may determine a location estimate for the diner device at a second location 2402B. The location determination at the second location 2402B can have an associated horizontal accuracy value (e.g., X meters) that allows an uncertainty range 2404 to be determined for the location estimate. However, in this scenario the uncertainty range 2404 associated with the finder device 202 does not accurately reflect the true degree of uncertainty of the beacon observation for the wireless accessory 201.

In one embodiment, the horizontal accuracy associated with the beacon observation can be determined by adjusting the horizontal accuracy of the location estimate of the finder device based on the distance in which the finder device has travelled between time of the beacon observation and the time of the location determination, to arrive at an adjusted horizontal accuracy 2406. The travel distance can be estimated based on an estimate of the velocity of the finder device 202 during the interval between beacon detection and location determination. Various velocity estimation techniques may be applied, as described with respect to FIG. 25 below.

The adjusted horizontal accuracy 2406 can be provided as input to beacon location estimation logic, along with an estimate of a distance and angle between the finder device 202 and the wireless accessory 201 at the time in which the beacon signal 301 was detected. The estimate of the distance and angle can be determined via techniques such as RSSI analysis or UWB ranging, as described herein. The beacon location estimation logic can then estimate a location of the detected beacon, which can have an associated beacon uncertainty range 2408.

While the beacon signal 301 is illustrated as being detected before the location estimate that is associated with the beacon is determined, locations determinations that occur within a threshold period of time before the detection of the beacon signal 301 may also be used. In one embodiment, if multiple locations are determined within the threshold before and after the detection of the beacon signal 301, the multiple location determinations can be used to refine the estimated location of the wireless accessory.

Figure 25:
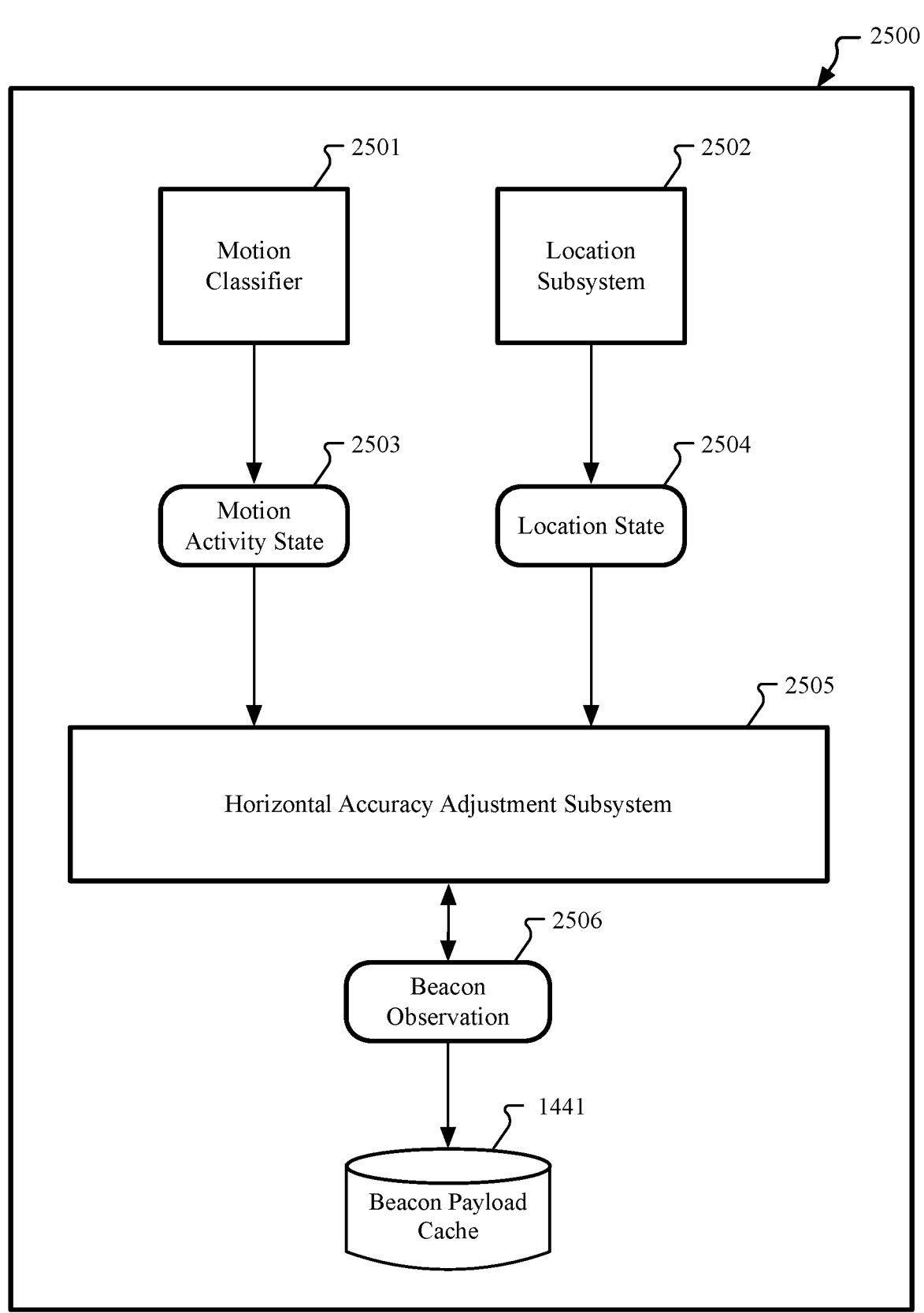
FIG. 25 illustrates a system that can be used on a finder device to perform horizontal accuracy adjustment for detected beaconing devices.

FIG. 25 illustrates a system 2500 that can be used on a finder device to perform horizontal accuracy adjustment for detected beaconing devices. In one embodiment the system 2500 includes a motion classifier 2501, a location subsystem 2502, and a horizontal accuracy adjustment subsystem 2505. The horizontal accuracy adjustment subsystem 2505, based on a motion activity state 2503 received from the motion classifier 2501 and a location state 2504 received from the location subsystem, can determine an adjusted horizontal accuracy for a beacon observation 2506 that is to be stored in the beacon payload cache 1441. The components of the system and the techniques and processes performed by those components will be described in the context of a finder device, which is any electronic device that is configured to detect beacon signals (e.g., wild mode beacons) broadcast by wireless devices, wireless accessories, and/or wireless accessory devices described herein, and upload an estimated location for the detected devices to servers (e.g., cloud servers 1470, device location server 203), associated with a crowdsourced device location system.

The motion activity state 2503 can be the same or similar to the motion activity state 1421 of FIG. 14, and provides information on whether the finder device is stationary or in motion. The motion classifier 2501 can determine the motion activity state based on motion context determined by measurements provided by a motion sensor (e.g., motion sensor 1210 as in FIG. 12). The motion sensor can include multiple sensors such as an accelerometer or a gyroscope. Data from other sensors (e.g., magnetometers, gravity sensors, etc.) can also be used to define a motion context for a device. The motion classifier 2501 can determine an estimate of a type of motion being performed by a finder device.

The type of motion can be a motion activity that is being performed by a user that is carrying the device. For example, the motion classifier 2501 can analyze sensor data to determine, based on motion context data whether a user that is carrying or wearing the finder device is walking, running, cycling, skiing, swimming, or moving via another means. The motion classifier 2501 can also determine whether the finder device 202 is in a moving vehicle. Such determinations can be included in the motion activity state 2503. The motion activity state 2503 can also include a speed, which can be an average speed determined for the finder device while the device is in the motion state, or can be a default speed that is associated with the determined motion state when a speed for the device cannot be determined.

The location subsystem 2502 includes hardware and software components that can determine a location estimate for an electronic device using location determination systems. In one embodiment the location subsystem 2502 includes logic to determine or estimate a device position based on a satellite positioning service 206 or a terrestrial positioning system using RF signals received from wireless base stations 205, as shown in FIG. 2, for example, the location determination components illustrated in FIG. 14. The location subsystem 2502 can maintain a location state 2504 that includes a most recently determined location for the finder device, along with a horizontal accuracy associated with the determine location. In some embodiments, the location state 2504 also includes an instantaneous speed or velocity metric. For example, if the location state is determined based on data from a satellite positioning service, the speed determined via the satellite positioning data may be included in the location state 2504.

In one embodiment the horizontal accuracy adjustment subsystem 2505 includes hardware and software logic that adjusts the initial horizontal accuracy of a beacon observation 2506 to account for the interval between beacon observation and location determination. In one embodiment, the horizontal accuracy of a beacon observation 2506 can be input to the horizontal accuracy adjustment subsystem 2505, along with a location determination interval that specifies the amount of time between detection of the beacon advertisement associated with the beacon observation and the location estimate used to tag the beacon observation. One or more speeds associated with one or more instances of the motion activity state 2503 during the interval can be analyzed in concert with speed data from the location state 2504 to estimate an average velocity of the finder device during the location determination interval. The average velocity can then be multiplied by the duration of the location determination interval to determine an adjustment amount to use to adjust the horizontal accuracy of the location determination to generate the adjusted horizontal accuracy. The adjusted horizontal accuracy can be stored to the beacon observation 2506, which may then be stored to the beacon payload cache 1441. In one embodiment, horizontal accuracy adjustments can be performed before a beacon observation is stored in the beacon payload cache 1441. In one embodiment, beacon observations can be stored to the beacon payload cache and horizontal accuracy adjustments can be performed asynchronously.

FIG. 26 illustrates a method 2600 of horizontal accuracy adjustment for detected beaconing devices. The method 2600 can be performed by an electronic device (e.g., finder device) to adjust the horizontal accuracy metric for beacon observations that are detected while the finder device is in motion.

The finder device can detect a beacon advertisement from a beaconing wireless device (block 2601). The finder device can then correlate the beacon advertisement with a location estimate determined by the electronic device (block 2602). The finder device can then sample motion state data for the electronic device for the location determination interval, which is the interval between the detection of the beacon advertisement and determination of the correlated location estimate (block 2603). If location state information for the finder device during the location determination interval includes velocity data (YES at block 2604), the finder device can adjust the horizontal accuracy of location estimate based on a comparison of the velocity data and a speed determined via motion state (block 2605). In one embodiment, the velocity data includes speed and direction data determined via a satellite-based positioning and navigation system (e.g., GPS).

In one embodiment, the adjustment is based on the greater of the magnitude of the velocity indicated by the velocity data and the speed indicated for a motion state. The speed indicated for the motion state can be a sensor-based speed calculation or can be a default speed associated with each motion state. In one embodiment, the adjustment can be based on other calculations, such as a weighted averaging of instantaneous speed determined via the velocity data and the speed associated with the motion state. If no velocity data is available (NO at block 2604), the finder device can adjust the horizontal accuracy of location estimate based entirely on the speed determined via the motion state data (block 2606). The adjustment of the horizontal accuracy improves the accuracy of downstream location filtering and processing, both on the finder device and after beacon observations are uploaded to the servers of the device locator service.

Reference herein to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow can be performed by processing logic that comprises hardware (e.g. circuitry, dedicated logic, etc.), software (as instructions on a non-transitory machine-readable storage medium), or a combination of both hardware and software. Reference will be made in detail to various embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used herein is for the purpose of describing particular embodiments only and is not intended to be limiting as to all embodiments. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Computing devices, user interfaces for such devices, and associated processes for using such devices are described herein. In some embodiments, the computing device is a portable communications device such as a mobile telephone that also contains other functions, such as PDA and/or music player functions. In the description and figures of this application, where a wireless device, wireless accessory, or wireless accessory device is described or illustrated, unless stated otherwise the described or illustrated attributes can generally be applied to any type of wireless device, wirelesses accessory, or wireless accessory device that is capable of broadcasting a wireless beacon.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

Embodiments described herein provide for an electronic device comprising a wireless processor coupled with a wireless radio, memory to store instructions, and one or more processors to execute the instructions. When executed by the one or more processors, the instructions cause the one or more processors to scan for an beacon advertisement using the wireless processor, store the beacon and a timestamp in a beacon advertisement buffer in response to detection of the beacon via the wireless processor, correlate a beacon advertisement with stored location data to determine a location estimate for a device associated with the beacon advertisement, encrypt the location estimate for the beacon advertisement using a beacon identifier broadcast with the beacon identifier, and transmit a hash of the beacon identifier and an encrypted location estimate for the beacon advertisement to a device locator server. In one embodiment the one or more processors can scan for a beacon advertisement using the wireless processor while an application processor of the one or more processors is in a low power state.

One embodiment provides for a non-transitory machine-readable medium storing instructions to cause one or more processors of an electronic device to perform operations comprising scanning for a beacon advertisement using a wireless processor of the electronic device while an application processor of the electronic device is in a low power state, storing the beacon advertisement and a timestamp as an entry in a beacon advertisement buffer in response to detecting the beacon advertisement via the wireless processor, transferring buffer entries to the application processor when the application processor wakes from the low power state, and correlating beacon advertisements with stored location data to determine a location estimate for a device associated with the beacon advertisement.

One embodiment provides for a method comprising, on an electronic device having a wireless processor coupled with a wireless radio, scanning for a beacon advertisement using a wireless processor of the electronic device while an application processor of the electronic device is in a low power state, storing the beacon advertisement and a timestamp as an entry in a beacon advertisement buffer in response to detecting the beacon advertisement via the wireless processor, processing the beacon advertisement buffer to remove duplicate entries, transferring buffer entries to the application processor when the application processor wakes from the low power state, and correlating beacon advertisements with stored location data to determine a location estimate for a device associated with the beacon advertisement.

Embodiments described herein also provide techniques for known device matching and horizontal accuracy adjustment during location data harvesting for wireless accessory devices. One embodiment provides for a method comprising, on an electronic device having a wireless processor coupled with a wireless radio, scanning for a beacon advertisement using a wireless processor of the electronic device and detecting a beacon advertisement and having a beacon advertisement packet. The beacon advertisement packet can be an advertisement packet of a first type or an advertisement packet of a second type. The advertisement packet of the first type is broadcast by a device that has connected with a companion device within a threshold period of time and the advertisement packet of the second type is broadcast by a device that has not connected with a companion device within a threshold period of time. The method additionally comprises determining whether the beacon advertisement packet is an advertisement packet of the first type based on the structure of the beacon advertisement packet and in response to determining that the beacon advertisement packet is an advertisement packet of the first type, performing a first key matching operation on the beacon advertisement packet to determine if the beacon advertisement is associated with a known device. The first key matching operation can include comparing keys in a set of keys with an advertisement address in the beacon advertisement packet and determining that the beacon advertisement is associated with a known device when a set of bits in the advertisement addresses matches a corresponding set of bits in a key in the set of keys. The method additionally includes, in response to determining that the beacon advertisement packet is an advertisement packet of the second type, storing the beacon advertisement and an observation timestamp to a beacon advertisement datastore for deferred processing.

One embodiment provides for a method comprising, on an electronic device having a wireless processor coupled with a wireless radio, detecting a beacon advertisement from a beaconing wireless device, correlating the beacon advertisement with a location estimate determined by the electronic device, sampling motion state data for the electronic device for an interval between detection of the beacon advertisement and determination of the location estimate correlated with the beacon advertisement, and adjusting a horizontal accuracy of the location estimate based on a speed determined via the motion state data. The speed determined via the motion state data can be a default speed for a determined motion state. The method can additionally comprise determining if velocity data is available for the electronic device for the interval between detection of the beacon advertisement and the determination of the location estimate correlated with the beacon advertisement and in response to determining that the velocity data is available, determining a magnitude of the velocity of the electronic device during the interval between detection of the beacon advertisement and the determination of the location estimate correlated with the beacon advertisement. In one embodiment, adjusting the horizontal accuracy of the location estimate based on a speed determined via the motion state data additionally includes adjusting the horizontal accuracy based on a comparison of the speed determined via the motion state data and the magnitude of the velocity determined via the velocity data. The comparison can be to determine a greater value of the magnitude of the velocity and the speed determined via the motion state and adjusting the horizontal accuracy based on that greater value.

The velocity data can be determined based on satellite positioning data. One embodiment provides a data processing system including means to perform a method as described herein.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. An electronic device comprising:

a wireless processor coupled with a wireless radio;

memory to store instructions; and one or more processors to execute the instructions, wherein the instructions cause the one or more processors to:

scan for a beacon advertisement using the wireless processor while an application processor of the one or more processors is in a low power state;

store the beacon advertisement and a timestamp as an entry in a beacon advertisement buffer in response to detection of the beacon advertisement using the wireless processor;

cause the application processor to transition from the low power state to a high power state in accordance with a wake policy;

transfer buffer entries to the application processor in response to the application processor transitioning to the high power state; and correlate the beacon advertisement within at least one buffer entry of the buffer entries with stored location data to determine a location estimate for a device associated with the beacon advertisement.

2. The electronic device as in claim 1, wherein the one or more processors are additionally to process the beacon advertisement buffer to remove duplicate entries.

3. The electronic device as in claim 1, wherein the beacon advertisement buffer is a circular buffer.

4. The electronic device as in claim 1 wherein the wireless processor is to filter the beacon advertisement and other beacon advertisements based on an advertisement type associated with a respective beacon advertisement.

5. The electronic device as in claim 4, wherein to filter the beacon advertisement and the other beacon advertisements includes to determine if the respective beacon advertisement includes an indicator that a location for the device associated with the beacon advertisement is to be determined.

6. The electronic device as in claim 1, wherein the stored location data includes location data determined based on a Wi-Fi scan, the Wi-Fi scan performed while the application processor of the one or more processors is in the low power state.

7. The electronic device as in claim 1, wherein the stored location data includes location data determined based on data received from a satellite-based positioning service.

8. The electronic device as in claim 1, wherein the one or more processors are additionally to:

encrypt the location estimate for the device associated with the beacon advertisement using a beacon identifier broadcast with the beacon advertisement; and transmit a hash of the beacon identifier and an encrypted location estimate for the beacon advertisement to a device locator server.

9. The electronic device of claim 1, wherein the timestamp is associated with when the beacon advertisement was detected.

10. The electronic device of claim 1, wherein the buffer entries comprise the beacon advertisement and the timestamp.

11. The electronic device of claim 1, wherein the beacon advertisement comprises a public key that is generated by the device based on the timestamp and a shared secret generated by the electronic device.

12. A non-transitory machine-readable medium storing instructions to cause one or more processors of an electronic device to perform operations comprising:

scanning for a beacon advertisement using a wireless processor of the electronic device while an application processor of the electronic device is in a low power state;

storing the beacon advertisement and a timestamp as an entry in a beacon advertisement buffer in response to detecting the beacon advertisement using the wireless processor;

causing the application processor to transition from the low power state to a high power state in accordance with a wake policy;

transferring buffer entries to the application processor when the application processor transitions from the low power state to the high power state; and correlating the beacon advertisement within at least one buffer entry of the buffer entries with stored location data to determine a location estimate for a device associated with the beacon advertisement.

13. The non-transitory machine-readable medium as in claim 12, the operations additionally comprising processing the beacon advertisement buffer to remove duplicate entries.

14. The non-transitory machine-readable medium as in claim 12, the operations additionally comprising configuring the wireless processor to filter based on an advertisement type, wherein filtering based on the advertisement type includes determining whether the beacon advertisement includes an indicator that a location for the device associated with the beacon advertisement is to be determined.

15. The non-transitory machine-readable medium as in claim 12, wherein the stored location data includes location data determined based on a Wi-Fi scan, the Wi-Fi scan performed while the application processor of the one or more processors is in the low power state.

16. The non-transitory machine-readable medium as in claim 12, wherein the stored location data includes location data determined based on data received from a satellite-based positioning service.

17. The non-transitory machine-readable medium as in claim 12, the operations additionally comprising:

encrypting the location estimate for the device associated with the beacon advertisement using a beacon identifier broadcast with the beacon advertisement; and transmitting a hash of the beacon identifier and an encrypted location estimate for the beacon advertisement to a device locator server.

18. A method comprising:

on an electronic device having a wireless processor coupled with a wireless radio:

scanning for a beacon advertisement using the wireless processor of the electronic device while an application processor of the electronic device is in a low power state;

storing the beacon advertisement and a timestamp as an entry in a beacon advertisement buffer in response to detecting the beacon advertisement using the wireless processor;

processing the beacon advertisement buffer to remove duplicate entries;

causing the application processor to transition from the low power state to a high power state in accordance with a wake policy;

transferring buffer entries to the application processor when the application processor transitions from the low power state to the high power state; and correlating the beacon advertisement within at least one buffer entry of the buffer entries with stored location data to determine a location estimate for a device associated with the beacon advertisement.

19. The method as in claim 18, additionally comprising configuring the wireless processor to filter based on an advertisement type, and wherein filtering based on the advertisement type includes determining if the beacon advertisement includes an indicator that a location for the device associated with the beacon advertisement is to be determined.

20. The method as in claim 18, additionally comprising:

encrypting the location estimate for the device associated with the beacon advertisement using a beacon identifier broadcast with the beacon advertisement; and transmitting a hash of the beacon identifier and an encrypted location estimate for the beacon advertisement to a device locator server.

* * * * *